(12) United States Patent
    Pazan

(10) Patent No.: US 10,640,405 B2
(45) Date of Patent: May 5, 2020

(54) DEHYDRATOR SYSTEM AND METHODS OF USING THE SAME

(71) Applicant: Q'Max Solutions Inc., Calgary (CA)

(72) Inventor: Herbert Raza Pazan, Villahermosa OT (MX)

(73) Assignee: Q'Max Solutions Inc. (CA)

(*) Notice: Subject to any disclaimer, the term of this patent is extended or adjusted under 35 U.S.C. 154(b) by 0 days.

(21) Appl. No.: 16/113,821

(22) Filed: Aug. 27, 2018

(65) Prior Publication Data
    US 2019/0169052 A1    Jun. 6, 2019

Related U.S. Application Data

(63) Continuation-in-part of application No. 15/275,064, filed on Sep. 23, 2016, now Pat. No. 10,086,316,
    (Continued)

(30) Foreign Application Priority Data

Mar. 19, 2015 (EC) .................................. 2015-10430

(51) Int. Cl.
    *B01D 21/00*    (2006.01)
    *B01D 21/08*    (2006.01)
    (Continued)

(52) U.S. Cl.
    CPC ........ *C02F 1/5227* (2013.01); *B01D 21/0045* (2013.01); *B01D 21/01* (2013.01);
    (Continued)

(58) Field of Classification Search
    None
    See application file for complete search history.

(56) References Cited

U.S. PATENT DOCUMENTS 4,136,012 A    1/1979  Louboutin et al.
4,526,687 A    7/1985  Nugent
                       (Continued)

FOREIGN PATENT DOCUMENTS

EC    2013-12783        11/2013
SU         1445754 A1 * 12/1988

OTHER PUBLICATIONS

Shvarts, Irina et al—SU 1445754 Machine Translation—Espacenet (Year: 1988).*
(Continued)

*Primary Examiner* — Bradley R Spies
(74) *Attorney, Agent, or Firm* — Nielsen IP Law LLC

(57) ABSTRACT

Provided herein are solids removal systems for dehydrator systems comprising a large rotating paddle, a small rotating paddle, and a drive shaft. The dehydrator system also includes a core dehydrator and a mixing unit. The core dehydrator comprises a plurality of small deflector plaques in fluidic communication with a plurality of large deflector plaques. The mixing unit includes a rapid mixing manifold in fluidic communication with a plurality of vertical flocculators and the core dehydrator. The large rotating paddle and the small rotating paddle of the solids removal system are connected to the drive shaft and configured to remove solids from the core dehydrator.

15 Claims, 52 Drawing Sheets

Related U.S. Application Data which is a continuation-in-part of application No. PCT/EC2015/000001, filed on Mar. 26, 2015.

(51) Int. Cl.
| | |
|---|---|
| *B01D 21/24* | (2006.01) |
| *B01F 1/00* | (2006.01) |
| *B01F 7/00* | (2006.01) |
| *C02F 1/00* | (2006.01) |
| *C02F 1/52* | (2006.01) |
| *C02F 11/121* | (2019.01) |
| *B01D 21/01* | (2006.01) |
| *C02F 1/56* | (2006.01) |
| *E21B 21/06* | (2006.01) |

(52) U.S. Cl.
CPC ........... *B01D 21/08* (2013.01); *B01D 21/245* (2013.01); *B01F 1/0011* (2013.01); *B01F 7/00341* (2013.01); *B01F 7/00641* (2013.01); *C02F 1/5281* (2013.01); *B01F 2215/0052* (2013.01); *C02F 1/56* (2013.01); *C02F 11/121* (2013.01); *C02F 2001/007* (2013.01); *C02F 2301/022* (2013.01); *C02F 2301/024* (2013.01); *E21B 21/066* (2013.01)

(56) References Cited

U.S. PATENT DOCUMENTS

| | | | |
|---|---|---|---|
| 4,889,624 | A | 12/1989 | Soriente et al. |
| 4,927,543 | A | 5/1990 | Bablon et al. |
| 5,143,625 | A | 9/1992 | Ballard |
| 6,174,435 | B1 | 1/2001 | Kaltchev |
| 7,527,726 | B2 | 5/2009 | Slough et al. |
| 7,964,101 | B2 | 6/2011 | Slough et al. |
| 2007/0170117 | A1 | 7/2007 | Slough et al. |
| 2011/0036772 | A1 | 2/2011 | Banerjee et al. |
| 2013/0037494 | A1 | 2/2013 | Cook et al. |

OTHER PUBLICATIONS

English Translation of International Search Report for International Application No. PCT/EC2015/000001 dated Mar. 28, 2016.

English Translation of Written Opinion for International Application No. PCT/EC2015/000001 dated Mar. 28, 2016.

English Translation of Ecuadorian Patent Application SMU-2013-12783 filed Jul. 19, 2013 and published Nov. 2013.

\* cited by examiner

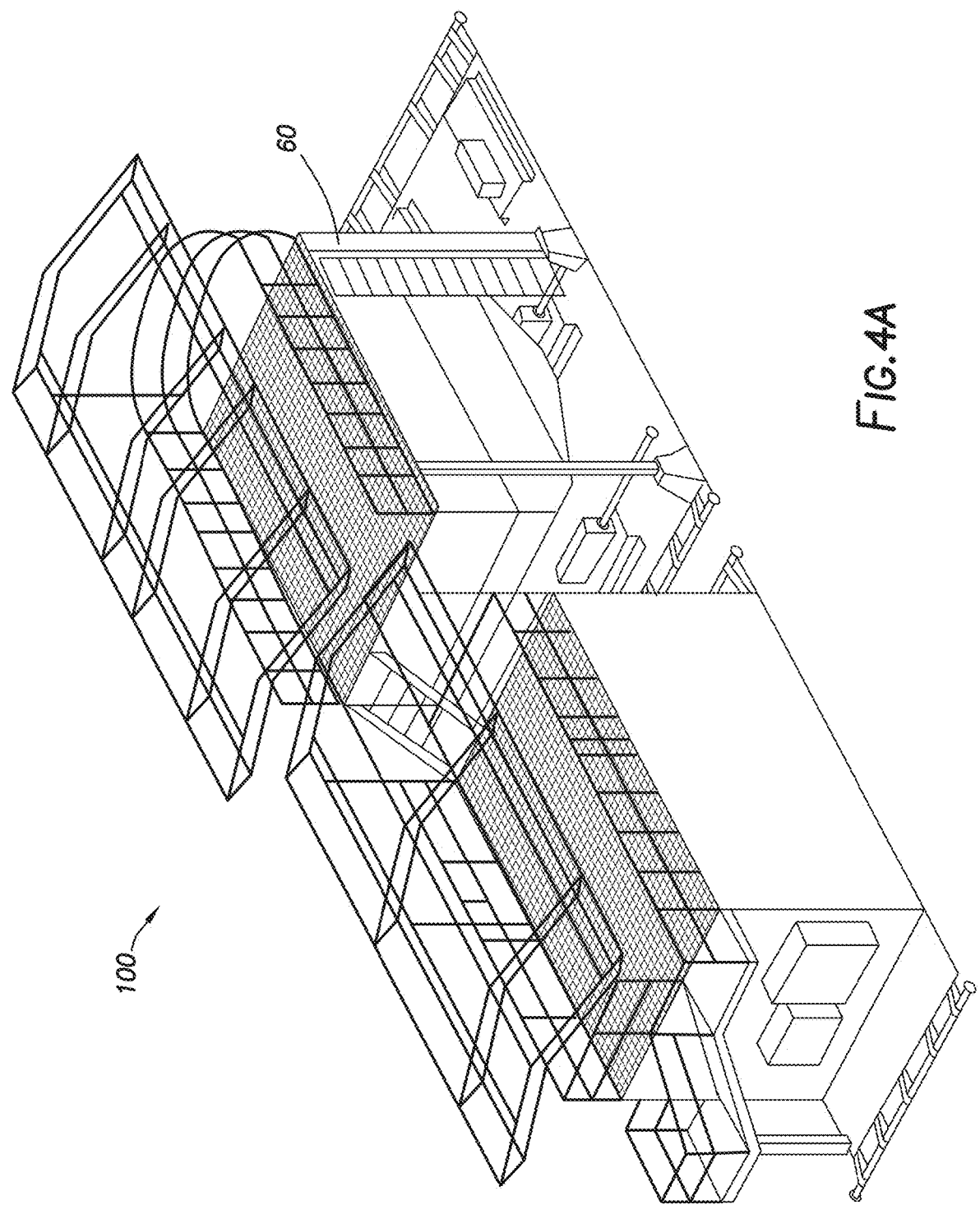

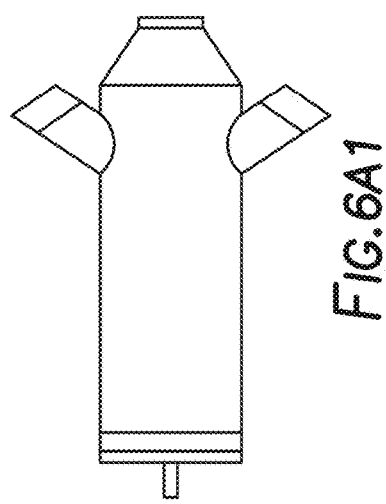
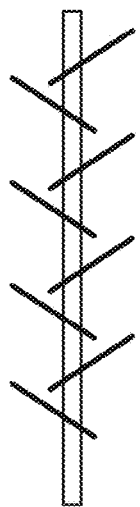
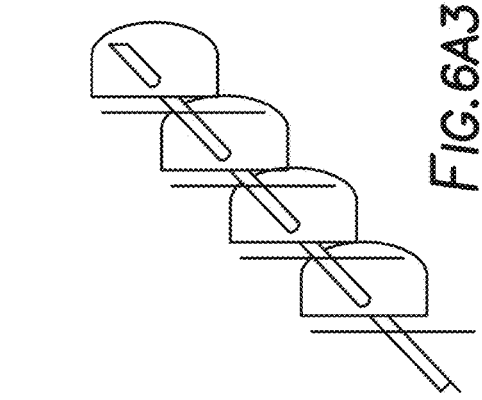
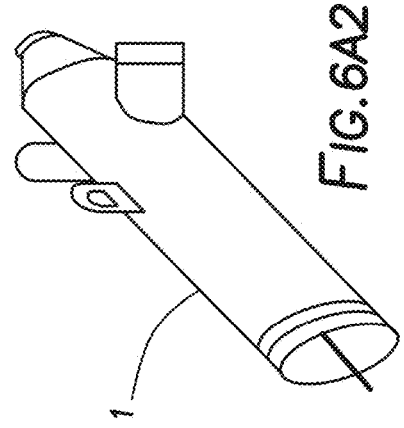
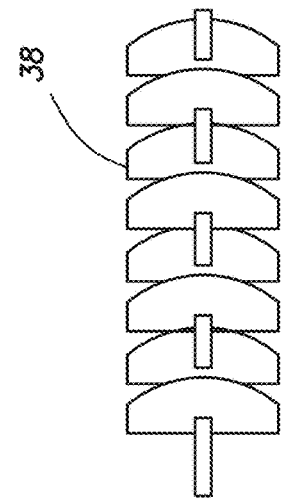

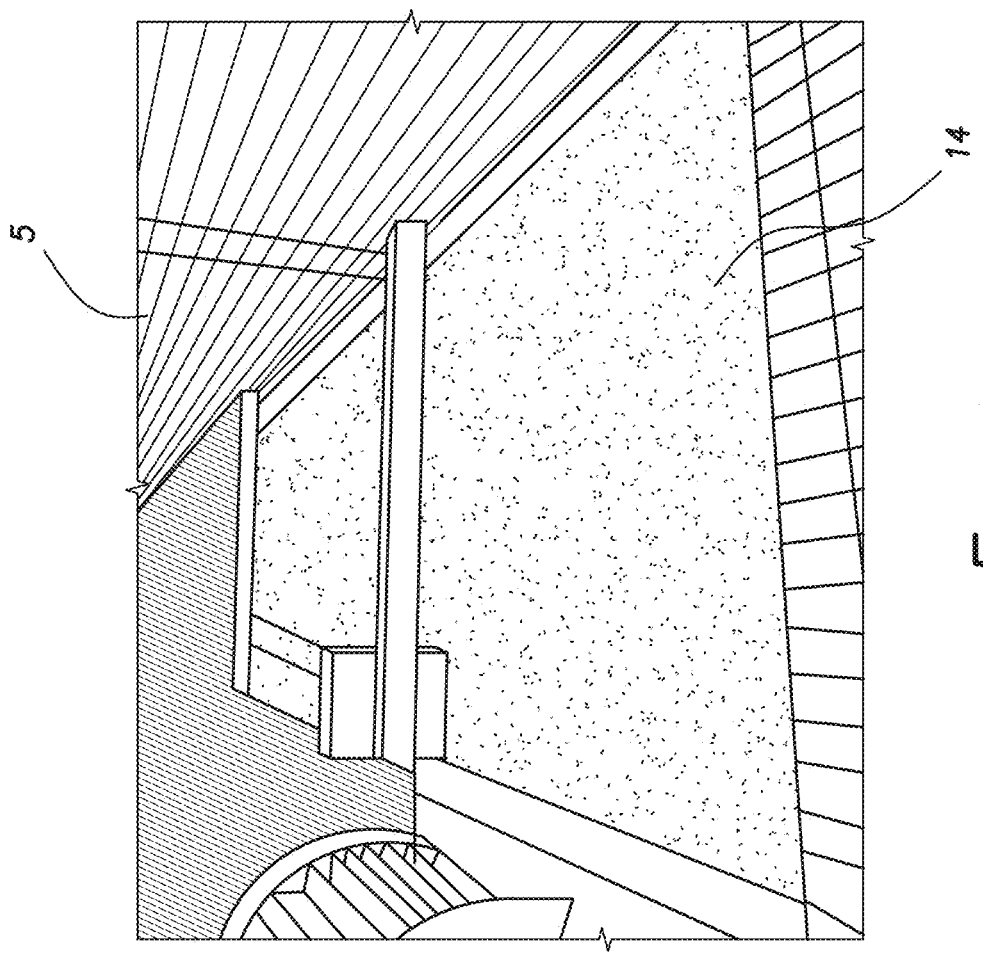

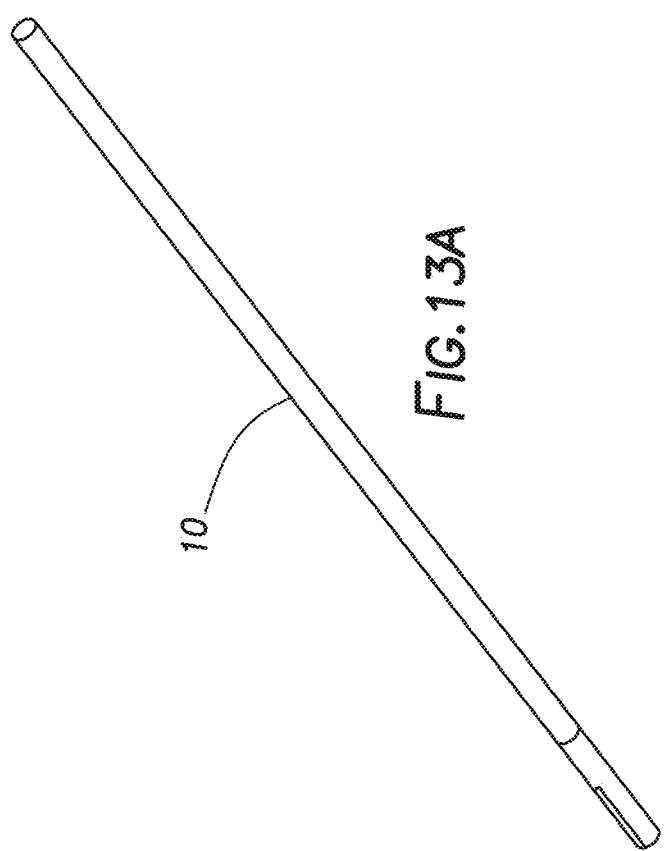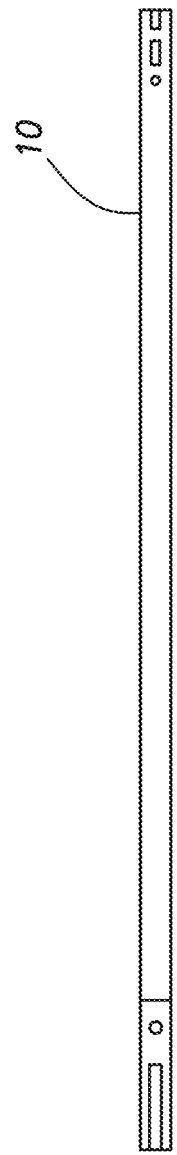
FIG. 13A
FIG. 13B

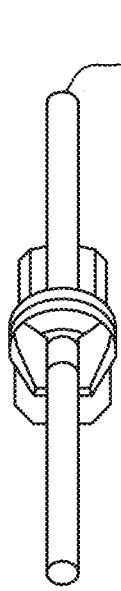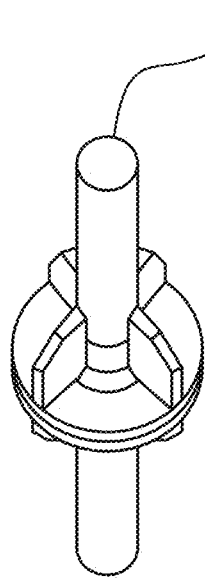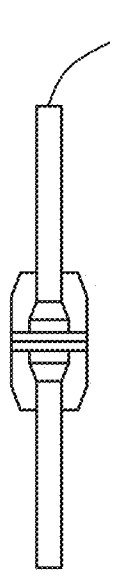
FIG.14A1       FIG.14A2       FIG.14A3
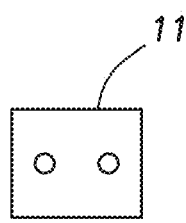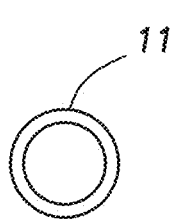
FIG.14B1       FIG.14B2
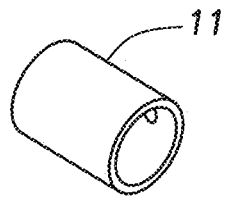
FIG.14B3

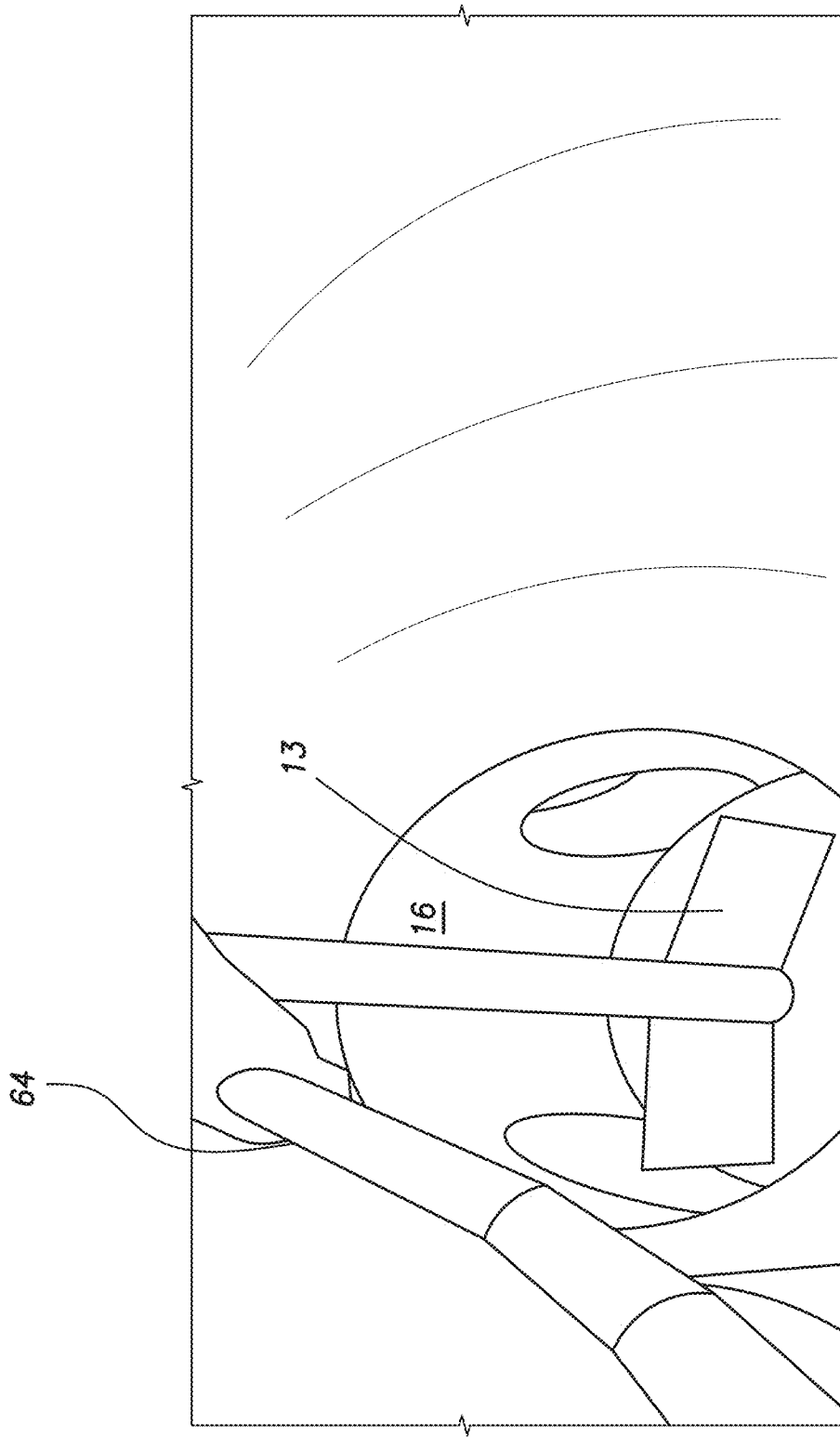

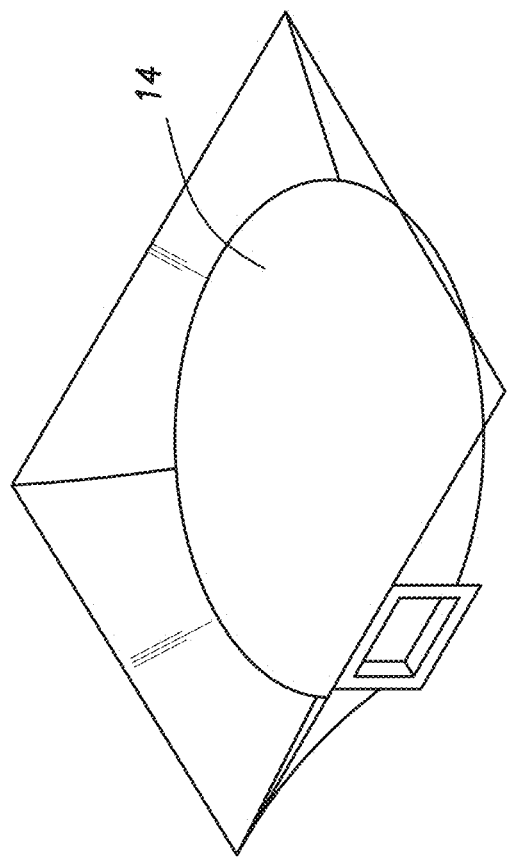
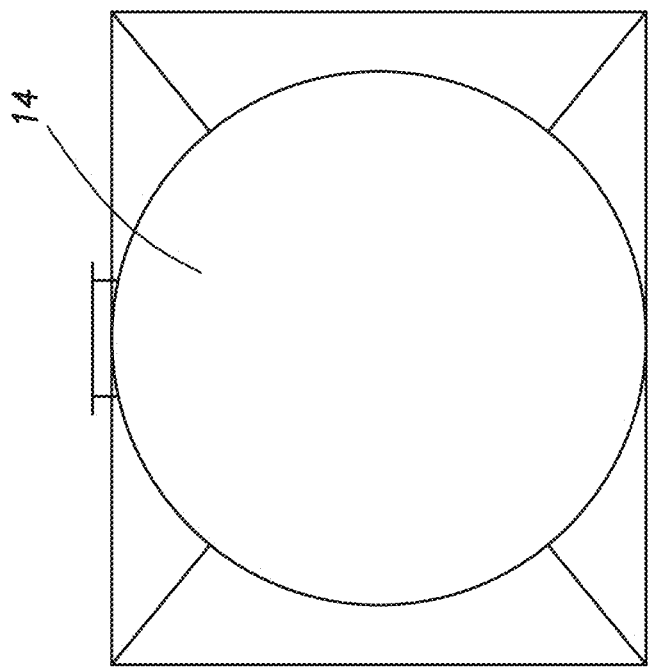
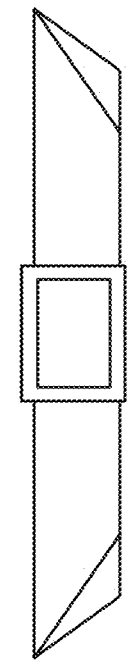
FIG. 17C
FIG. 17A
FIG. 17B

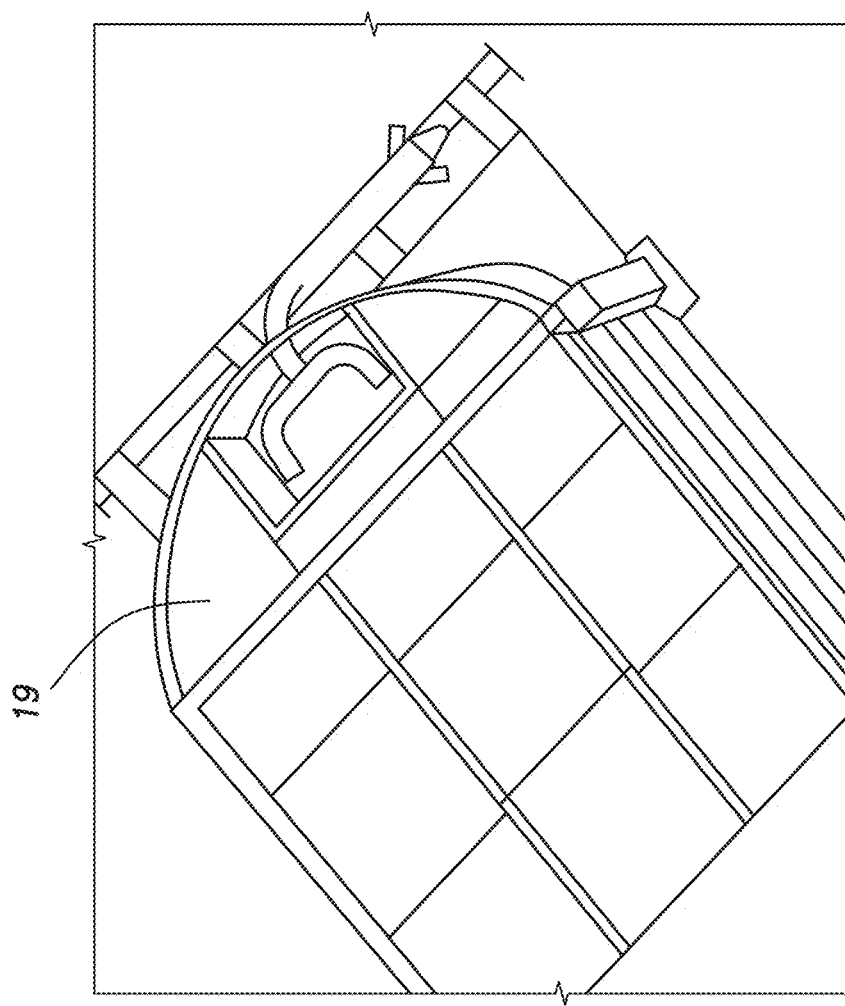

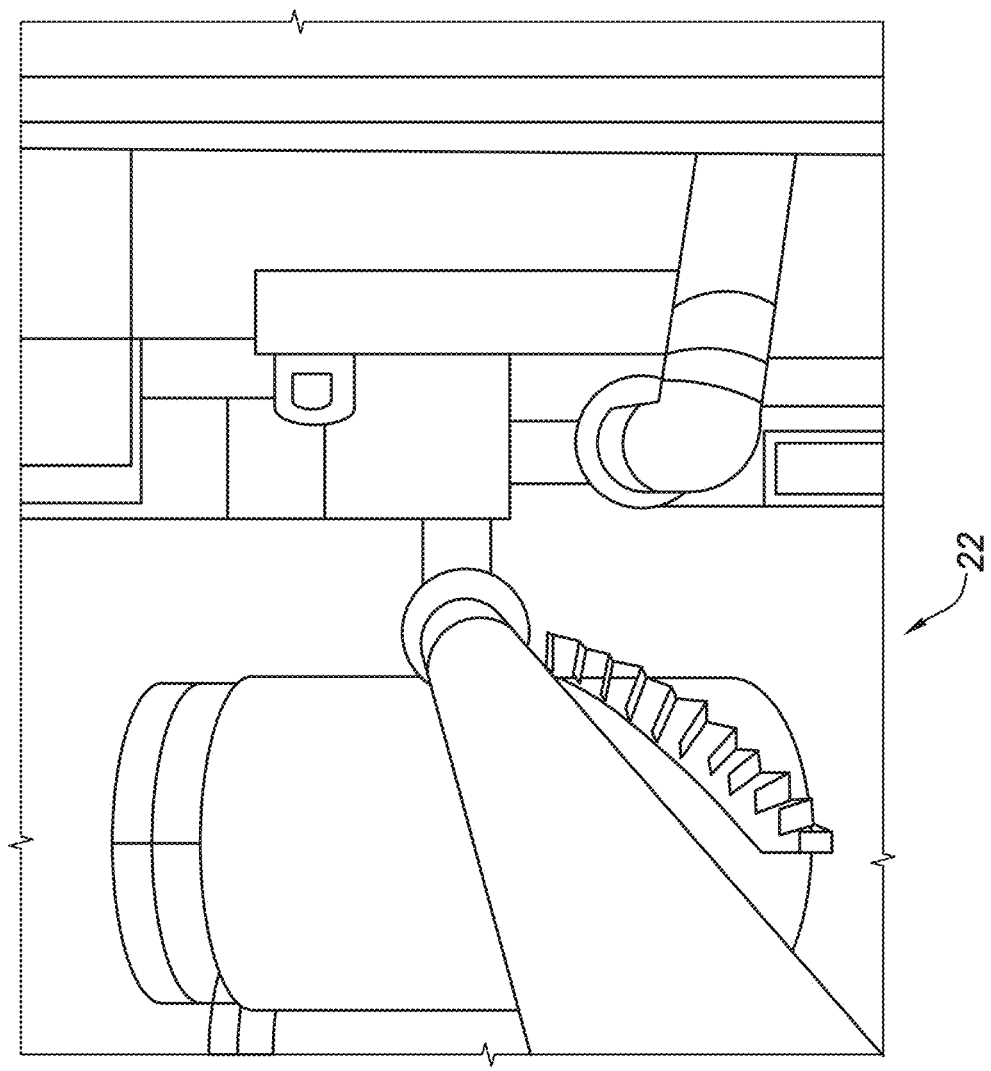

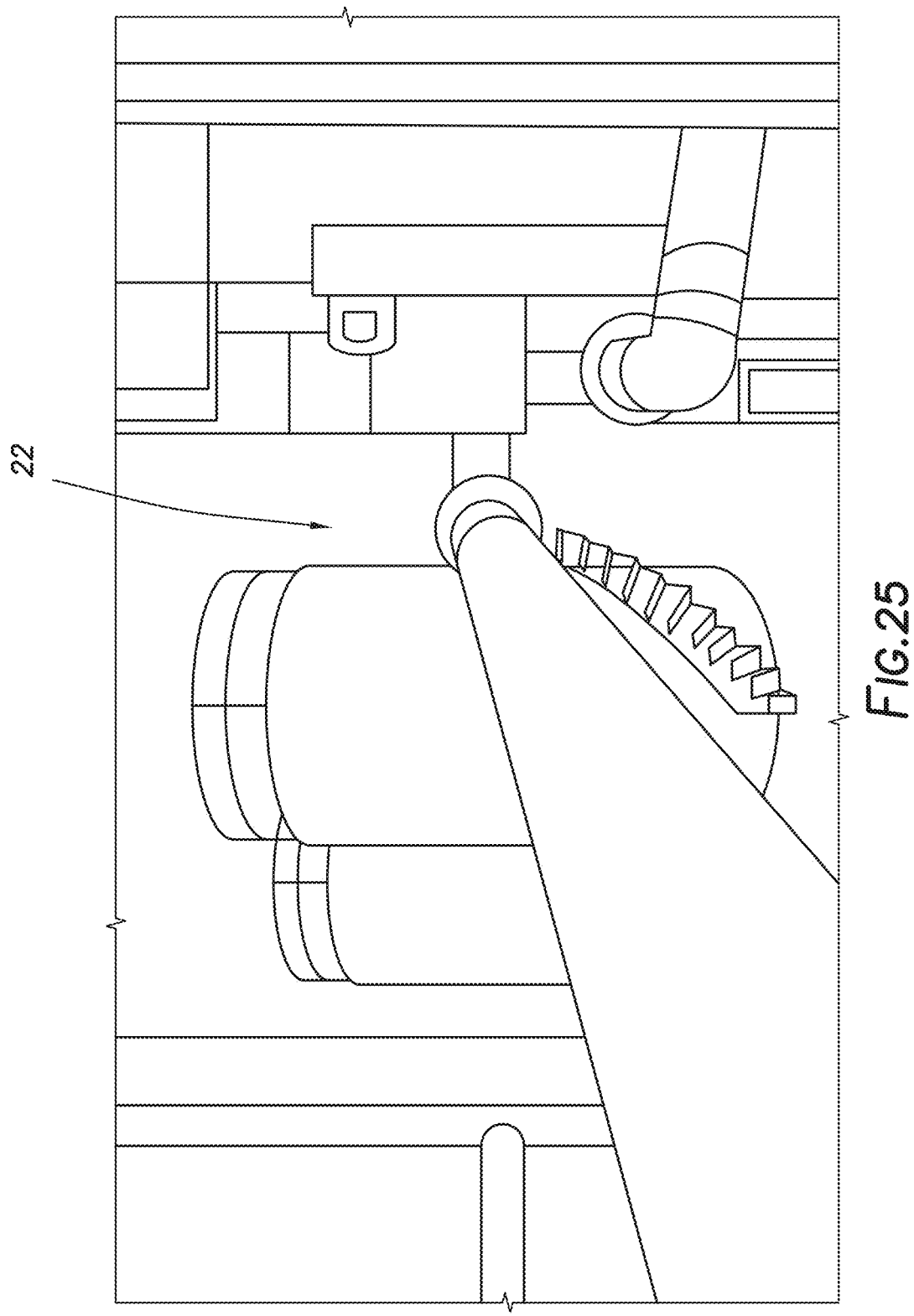

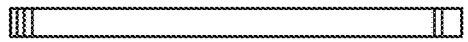
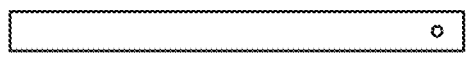
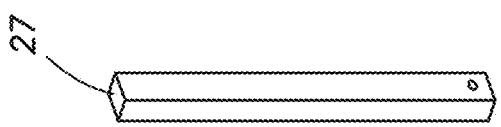
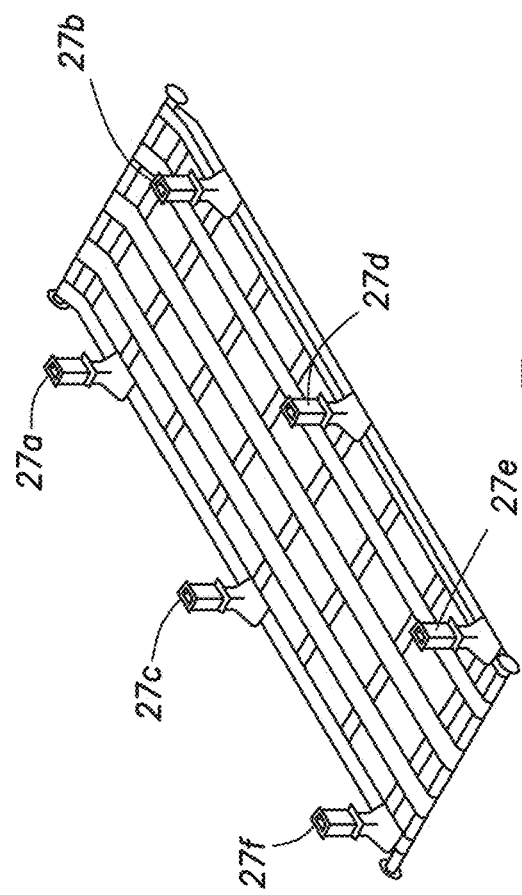

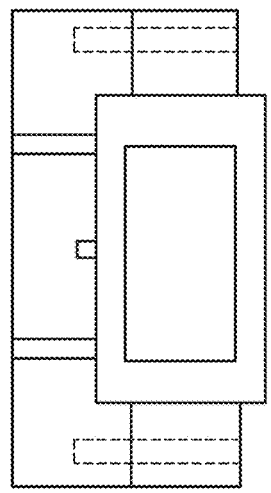
FIG.30C2
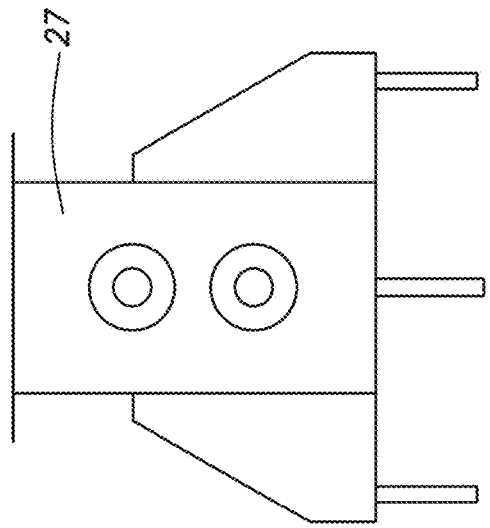
FIG.30C4
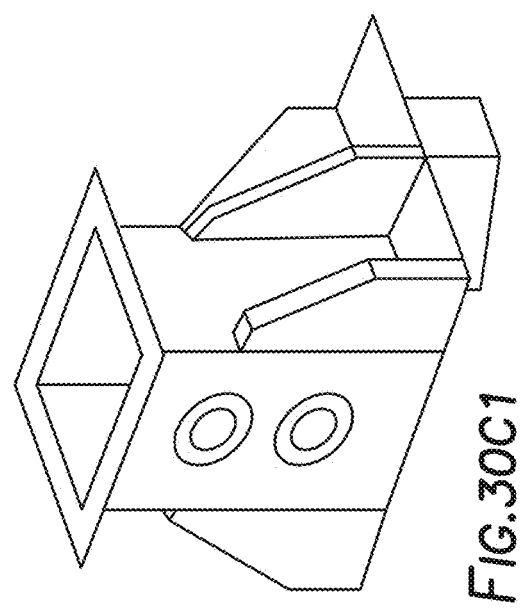
FIG.30C1
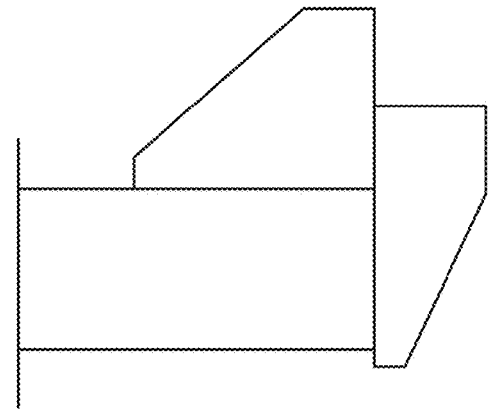
FIG.30C3

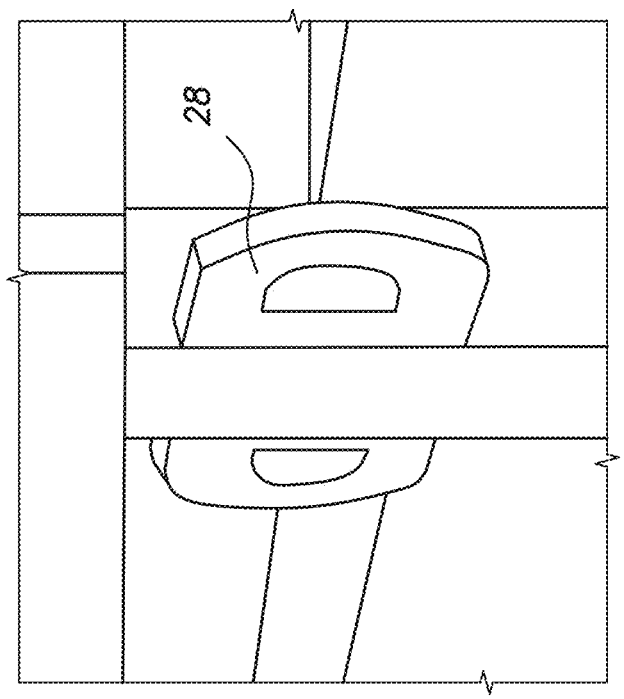
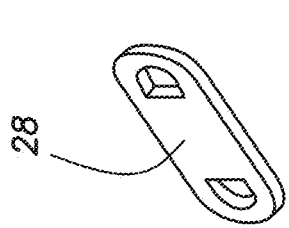

DEHYDRATOR SYSTEM AND METHODS OF USING THE SAME

CROSS REFERENCE TO RELATED APPLICATIONS

This application is a continuation-in-part of U.S. patent application Ser. No. 15/275,064, which is a continuation-in part of International Application No. PCT/EC2015/000001, filed Mar. 26, 2015, which claims the benefit of Ecuador Application No. IEPI-2015-10430 filed Mar. 18, 2015. The foregoing applications are incorporated herein by reference.

BACKGROUND OF THE INVENTION

Drilling fluids with high concentrations of salt and low densities are processed with equipment that allows for conservation of resources as the water used in perforation wells located in arid regions can be recycled. However, there is a need to process high density drilling fluids (mud) and waste in different regions and provide clean waste water without causing substantial pollution to the environment.

SUMMARY OF THE INVENTION

Dehydrator systems comprising a core dehydrator and a mixing unit are described herein and methods of using the same. As shown in the figures, the core dehydrator comprises a turbulent flow mixing compartment, a turbulent flow transition zone, a clarifying sediment chamber, a plurality of small baffles, a plurality of large deflector plaques and a flocculation pipe. In the turbulent flow transition zone, fluid flow transitions from turbulent flow to laminar flow. The mixing unit comprises a plurality of vertical flocculators. The mixing unit further comprises a rapid mixing manifold. The rapid mixing manifold contains drilling fluids and flocculant polymers.

The mixing unit can further comprise a water collector tank, a plurality of stir tanks for dissolving polymer, a double paddle axial flow swirl generator and a stir tank for sludge conditioning. Each stir tank can have one or more agitators. The mixing unit can further comprise a mud conditioning tank and a plurality of centrifugal pumps. In an aspect, the mixing unit comprises three flocculators.

As described herein and shown in the figures, the dehydrator system may also include a gearbox, a drawer storage gearbox, a connector shaft in fluid communication with an agitator, a bocin, a plurality of inclined palettes for axial flow, a plurality of radial vanes or palettes, a drag solid transition zone, a circular cone, a circular cylinder, a plurality of solid discharge pipes, one or more positive displacement pumps, one or more water well transporters, a distributor water channel, a water discharge valve to recirculate and improve water quality, a water discharge valve for evacuating drilling system, one or more suction pipes, a water distribution manifold, a plurality of solid removal jets, and solids discharge pipe in fluid communication with the positive displacement pump. The dehydrator system can further include a skid, a plurality of telescopic columns, and a plurality of ears for transporting the system.

Also provided herein are dehydrator systems comprising a solids removal system, a mixing unit and a core dehydrator. The mixing unit comprises a rapid mixing manifold positioned and a plurality of flocculator chambers. In an aspect, the mixing unit also comprises a plurality of stir tanks. In an aspect, the mixing unit further comprises a mud conditioning tank.

In the dehydrator system, the core dehydrator comprises a clarifying sediment chamber having plurality of small deflector plaques, a plurality of large deflector plaques and a drag solid transition zone. The rapid mixing manifold is in fluidic communication with the plurality of flocculator chambers. The clarifying sediment chamber is in fluidic communication with the drag solid transition zone. The drag solid transition zone is in fluidic communication with the plurality of flocculator chambers.

In the dehydrator system, the solids removal system is fluidic communication with the drag solid transition zone of the core dehydrator. The solids removal system comprises a large rotating paddle, a small rotating paddle, and a drive shaft. The draft shaft is connected to the large rotating paddle and the small rotating paddle and configured to rotate the large rotating paddle and the small rotating paddle for removing solids from the dehydrator system. In an aspect, the large rotating paddle and the small rotating paddle are configured to move solids out of the core dehydrator. In an aspect, the core dehydrator comprises a large cylindrical section and a small cylindrical section in fluidic communication with the large cylindrical section. The large rotating paddle is positioned with the large cylindrical section. The small rotating paddle is positioned within the small cylindrical section. In an aspect, a solids pump in fluidic communication with the core dehydrator.

Also provided herein are methods of removing solids from drilling fluids comprising the steps of: (a) providing drilling fluids to a dehydrator system; (b) mixing drilling fluids with polymer solution in the mixing unit to produce flocculated drilling fluids comprising micro-floccules; (c) collecting micro-floccules wherein micro-floccules agglutinate and enlarge producing solids; (d) separating the solids from the flocculated drilling fluids; and (e) removing solids from the dehydrator system. In an aspect, the dehydrator system comprises a solids removal system in fluidic communication with a core dehydrator. The core dehydrator comprises a plurality of small deflector plaques and a plurality of large deflector plaques. The solids removal system comprises a large cylindrical section, a large rotating paddle, a small cylindrical section, a small rotating paddle and a drive shaft. The drive shaft is connected to the large rotating paddle and the small rotating paddle. The large cylindrical section and the small cylindrical section are in fluidic communication with the plurality of small deflector plaques and the plurality of large deflector plaques. The micro-floccules are collected with the small deflector plaques and the large deflector plaques wherein micro-floccules agglutinate and enlarge producing solids. The large rotating paddle and the small rotating paddle are configured to move solids from the large cylindrical section to the small cylindrical section and out of the dehydrator system. In an aspect, the drilling fluids are rapidly mixed creating a turbulent fluid flow. In an aspect, drilling fluids and polymer solution are mixed under turbulent fluid flow. In an aspect, turbulent fluid flow of the mixture transitions to a laminar flow.

Further provided herein are solids removal systems for a dehydrator system comprising a large rotating paddle; a small rotating paddle; and a drive shaft. The large rotating paddle and the small rotating paddle are in fluid communication with core dehydrator to dispose solids from the dehydrator system and connected to the drive shaft. In the solids removal systems described herein, the dehydrator system includes a core dehydrator and a mixing unit. The core dehydrator comprises a plurality of small deflector plaques in fluidic communication with a plurality of large deflector plaques. The mixing unit includes a rapid mixing manifold in fluidic communication with a plurality of vertical flocculators.

DESCRIPTION OF THE FIGURES

FIGS. 4A and 4B show a perspective view and a front view of the core dehydrator and the mixing unit.

FIGS. 6A1, 6A2, 6A3, 6A4, 6A5, and 6B shows the rapid mixing manifold where polymer solutions enter, mix and flocculate. The manifold has a separation to avoid the collision of fluids at the beginning of a process.

FIGS. 8A and 8B show the clarifying sediment chamber with small defector plaques and large deflector plaques. FIG. 8A depict the drag solid transition zone (the drag solid transition zone is the area of core dehydrator that transition from a rectangular section into a circular cone 15).

FIGS. 13A and 13B show the connector to agitator shaft with dimensions.

FIGS. 14A1, 14A2, 14A3, 14B1, 14B2 and 14B3 are the bocin required to remove the agitator shaft for proper maintenance.

FIG. 16 shows the radial palettes located in the circular cycle to allow solids to exit to the positive displacement pump lobes.

FIGS. 17A, 17B, and 17C show the drag solid transition zone from rectangular to circular and a plurality jets for the evacuation of solids into the circular cone.

FIG. 22 depicts the water transporter chambers where the small deflector plaques and large deflector plaques are located.

FIG. 24 is the water discharge valve to discharge and recirculate water to the flocculator chamber in order to reduce the suspended solids.

FIG. 25 is the water discharge valve that evacuates the tanks of the drilling station.

FIGS. 30A, 30B1, 30B2, 30B3, 30C1, 30C2, 30C3, and 30C4 show the telescopic column used to lower the dehydrator system and to facilitate its transportation.

FIGS. 31a1, 31a2, 31a3, and 31b show the ears that facilitate system lifting

FIG. 44A shows the sold discharged to the excavator's bucket. FIGS. 44B and 44C shows the solids discharged to cutting tools. FIG. 44D show solids discharged to a cutting tank.

DETAILED DESCRIPTION OF THE INVENTION

Figure 1:
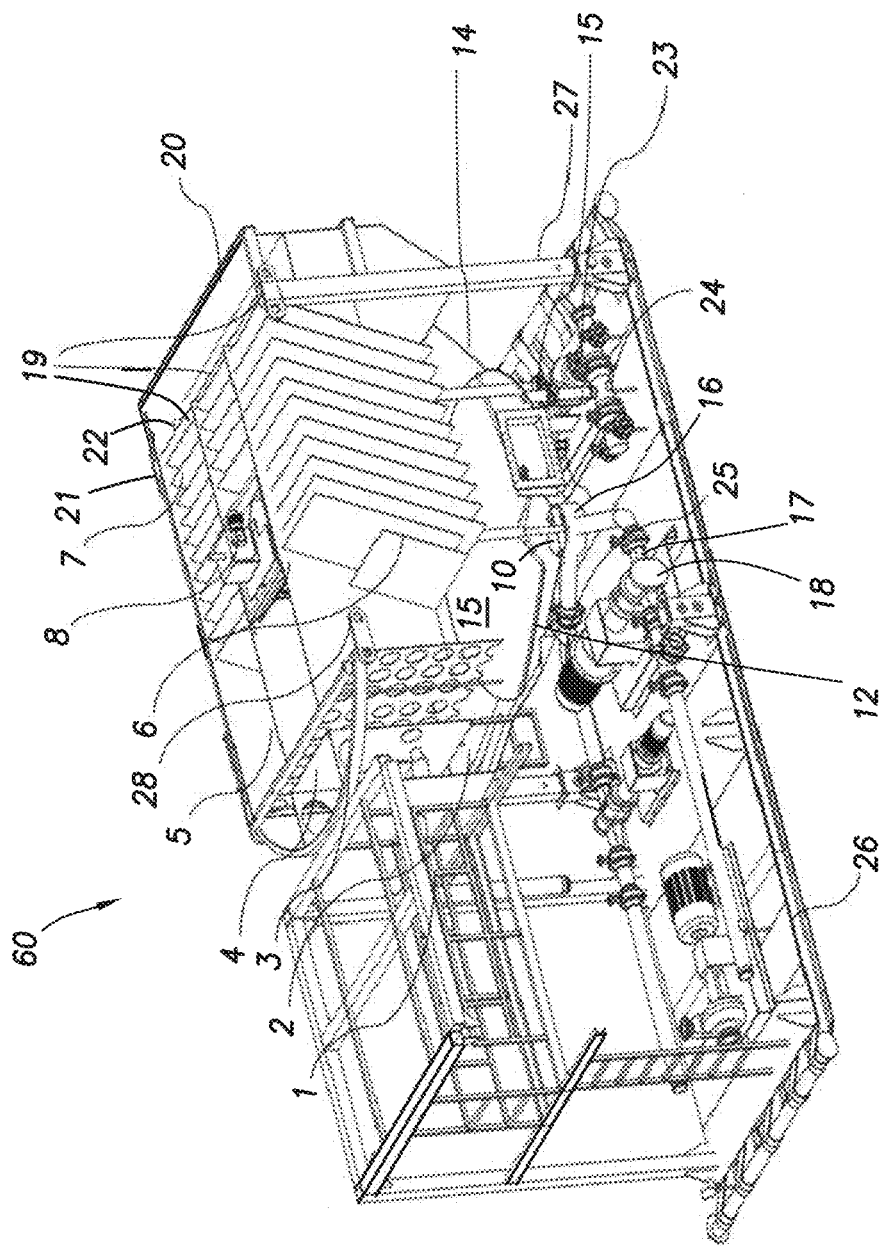
FIG. 1 is a front view of the dehydrator system showing the components of the system as described herein.

The dehydrator systems 100 presented herein are useful in the area of oil well drilling, and are mechanically designed to be environmentally friendly. The dehydrator systems 100 can process drilling fluids that contain crude oil traces, coming from the area of production, completion, reconditioning of wells in the oil area and industrial waste management in the mining area. The described systems and methods are useful for oil field operations and other waste water processing of high density type of waste.

The dehydrator system 100 comprises a core dehydrator 60 and a mixing unit 50. As shown in the figures, the core dehydrator comprises a turbulent flow mixing compartment 3, a turbulent flow transition zone 4; a clarifying sediment chamber 5 (where fluid flow is substantially laminar), a plurality of small baffles 6 (also referred to herein sometimes as small deflector plaques 6); and a plurality of large deflector plaques 7 (also referred to herein as large baffle plates). In the turbulent flow transition zone 4, fluid flow transitions from turbulent flow to laminar flow. The mixing unit comprises a plurality of vertical flocculators 32. As used herein, a vertical flocculator 32 is also sometimes referred to as a flocculator chamber or a flocculation chamber. The mixing unit 50 further comprises a rapid mixing manifold 1. The rapid mixing manifold 1 contains drilling fluids and flocculant polymers.

The mixing unit 50 can further comprise a water collector tank 33, a plurality of stir tanks 34 for dissolving polymer, a double paddle axial flow swirl generator and a stir tank for sludge conditioning. Each stir tank can have one or more agitators also referred to sometimes as a paddle stirrer. The mixing unit can further comprise one or more mud conditioning tanks 35 and a plurality of centrifugal pumps 36. In an aspect, the mixing unit comprises three flocculators.

As described herein and shown in the figures, the dehydrator system 100 may also include: a gearbox 8 or orthogonal gearbox 8; a drawer storage gearbox 9; a connector shaft 10 in fluid communication with an agitator 40; a bocin 11; a plurality of inclined palettes for axial flow 12; a plurality of radial vanes or palettes 13; a drag solid transition zone 14; a circular cone 15; a circular cylinder 16; a plurality of solid discharge pipes 17; one or more positive displacement pumps 18; one or more water well transporters 19 (sometimes referred to herein as conveying water chambers); a distributor water channel 20; a water discharge valve 21 to recirculate and improve water quality; a water discharge valve 22 for evacuating drilling system; one or more suction pipes 23; a water distribution manifold 24; a plurality of solid removal jets 25; and solids discharge pipe 29 in fluid communication with the positive displacement pump 18. The dehydrator system 100 can further include a skid 26, a plurality of telescopic columns 27; and a plurality of ears 28.

Figure 3A:
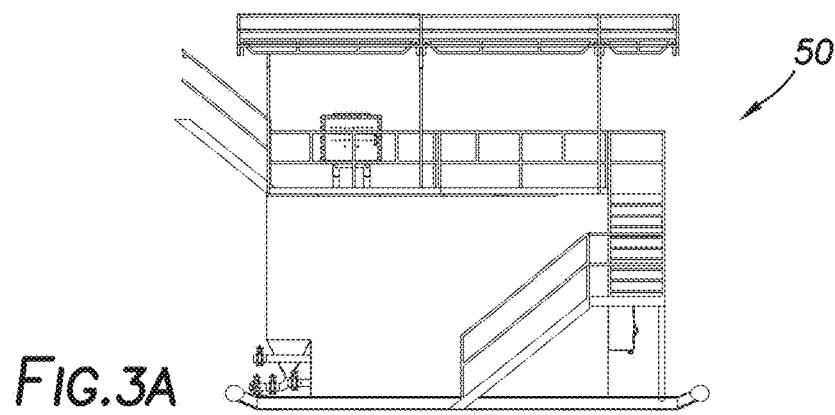
FIG. 3A is a side view of the mixing unit.
Figure 3B:
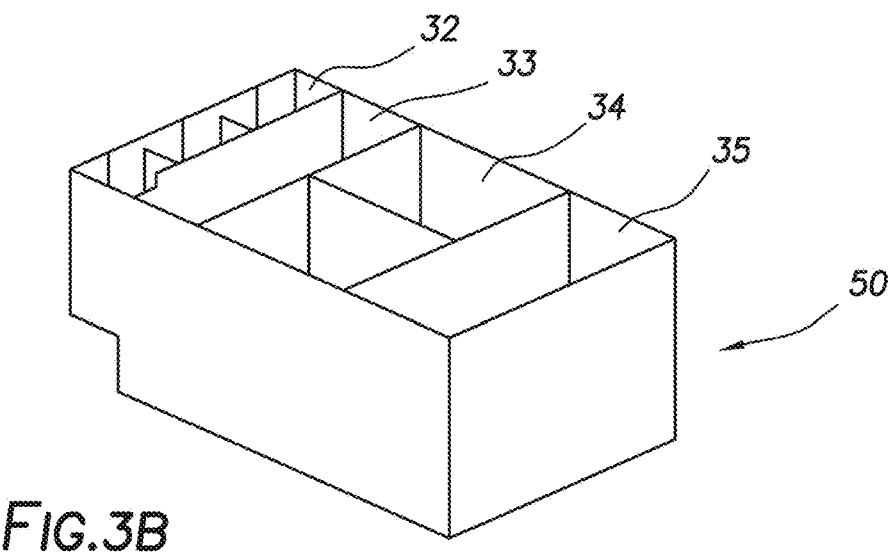
FIG. 3B depicts the vertical flocculators.

Generally, as shown in FIG. 1 and as described herein, components of the dehydrator system 100 include: a rapid mixing manifold 1; a flocculation pipe 2; a turbulent flow mixing compartment 3, a turbulent flow transition zone 4 comprising a holes plaque where fluid flow transitions from turbulent to laminator flow; a clarifying sediment chamber 5 also referred to as a settler, where fluid flow is laminar; a plurality of small deflector plaques 6; a plurality of large deflector plaques 7; a gearbox orthogonal 8; a storage drawer gearbox 9; a connector 10 to an agitator shaft 40; a bocin 11; a plurality of inclined palettes of axial flow 12; a plurality of radial palettes 13; a drag solid transition zone 14 (from rectangular to circular); a circular cone 15; a circular cylinder 16, a plurality of first solids discharge pipes 17; one or more positive displacement pumps lobes 18 (in an aspect, 75 HP and 15 HP); a water wells transporter 19; a gatherer and distributor water channel 20; a recirculating valve to recirculate water discharge 21 (in an aspect the valve is an 8 inch valve) 21; a water discharge valve 22 to evacuate drilling system; one or more suction pipes 23 for fast download; a water discharge valve 22, a plurality of suction pipes 23 for fast download; a water distribution manifold 24 for water distribution fast download; a plurality of jets 25 for solids removal; a skid 26 and a plurality of telescopic columns 27; a plurality of ears 28; one or more second solids discharge pipes 29; an emergency exit 30 and a centrifuge stand 31. FIG. 3B shows the mixing unit having three vertical chambers flocculators 32, a water tank collector 33, a plurality of stir tanks 34 to stir polymer plus double paddle stirrer axial flow; and a mud conditioning tank with its own agitator 35.

As described above, the present dehydrator system comprises a mixing manifold 1. The mixing manifold comprises a pipe having one or more rapid mixing manifold deflector plaques 38. In an aspect, the pipe is 6 inches in diameter by 0.9 meter long. In the interior of the mixing manifold 1, deflector plaques 38 are positioned in the interior of the mixing manifold 1. In an aspect, these deflector plaques 38 are stainless steel shaped as fish vertebrae. In the mixing manifold 1, drilling fluid (mud) is mixed with polymer solution. In an aspect, the drilling fluid and polymer solution can be mixed in less than 0.16 seconds. The polymer solution may enter the mixing manifold 1 from one of the stir tanks 33. In an aspect, each tank 33 has a capacity between 65-70 bbls or 68 bbls. Each tank 33 can comprise double stirrers having three impellers (or fins). In an aspect, the impellers can be set at 120 degree angle each providing an axial flow rotating at 66 rpm. The tank further comprises an engine. In an aspect, the engine can provide 10 HP. Polymer solution enters a flocculation pipe 2 together with the drilling fluid (mud) from a mud conditioning tank 35. In an aspect, the mud conditioning tank 35 has a capacity of 110 bbls. The mud conditioning tank 35 comprises a stirrer double vane (i.e., three impellers (fins) angled at 120 degrees each). In an aspect the stirrer double vane rotates at 88 rpm with power proved by 10 HP engine, tank or set auger drilling. The overall described process provides fluid comprising micro flocs passing through the flocculation pipe 2, in order to assist the clumping of floc entering the turbulent flow mixing compartment 3.

From the flocculation pipe 2, flocculated drilling fluids enter the turbulent flow mixing compartment 3. Collisions occur within the turbulent flow mixing compartment wall. In order to distribute flocs floating to bottom and sides of the turbulent flow mixing compartment 3 and to allow passage into the turbulent flow transition zone 4, the turbulent flow transition zone 4 has an orifice plate that covers the core dehydrator and downwards into the turbulent flow mixing compartment 3 where flocculated drilling fluid flow transitions from turbulent flow to laminar flow and provides fluid passage in a horizontal (X axis) at a clarifying sediment chamber 5.

The clarifying sediment chamber 5 also referred to sometimes as the clarifier chamber 5 or clarifying chamber 5 comprises a plurality of well water transporters 19 (also referred to herein as conveyor water chambers 16 or as transporting water chambers 19). Inside of the clarifying sediment chamber 5 are a plurality of small deflector plaques 6 (also referred to as small flappers 6 or small deflector flappers). In an aspect, each of the small deflector plaques 6 are inclined at approximately 70 degrees. The clarifying chamber further comprises a plurality of large deflector plaques 7 sometimes referred to as large plates 7 or as large flappers 7. In an aspect, the large deflector plaques are each set at a 70 degree incline. Drilling fluid containing flocs from the turbulent flow transition zone 4 flows substantially horizontally and substantially in laminar flow. In an aspect, fluid flow of the drilling fluid containing flocs has a linear speed approximately less than 0.3 m/s. Drilling fluid with flocs is distributed substantially uniformly in the plurality of conveyor water chambers (19) to initiate the process of collision with the small deflector plaques 6. In an aspect, there are three conveyor water chambers or otherwise referred to as well water transporters 19 or transporting water chambers 19. Here, flocs tend to go up and go agglutinating to form heavier particles precipitated. Drilling fluids containing the light flocs rise and pass from one small plaque to another and likewise coalesce to precipitate, fulfilling the same path which are at different heights, defining a first sedimentation process. Following this, drilling fluids travel through each one of the well water transporter 19 (conveyor water chamber 19) and collides with a group of large baffle plates 7 otherwise referred to as large deflector plaques 7. The large deflector plaques 7 are at the substantially the same height and use substantially the same flow path as light and heavy flocs meet the same process that was previously performed using the small deflector plaques 6. For example, flocs rise, agglutinate and precipitate. Additionally, this happens between a plate and another plate of the same height. Micro eddies require floc to descend and to obtain clear water.

If there is the presence of very light micro flocs the end of this process, treated water flows to a gatherer and distributor water channel 20 and subsequently a recirculating valve 21 to be recirculated back to the vertical flocculators. In an aspect, the vertical flocculators have speeds less than 0.11 m/s in order to improve water quality, optimizing the consumption of flocculating polymers. The process can become a cyclic process from a water collector tank 33 to the stir tank 34 returning to the rapid mixing manifold 1. Lightweight floc precipitated in the flocculator chamber 32 are sucked out by a positive displacement pump 18 and returned the rapid mixing manifold 1 to continue the dewatering process.

The water distributor channel 20 (the gatherer and distributor water channel 20) contains flowing treated water from the conveyor water chambers 19. The conveyor water chambers 19 comprise a plurality of small deflector plaques 6, and a plurality of large deflector plaques 7 which overflow to the water distributor channel 20. This allows the distribution of water. In an aspect, the distribution of water is handled with butterfly valves to discharge water and recirculate it back to recirculating valve 21. To improve water quality, a discharge valve 22 allows water to evacuate the drilling system. This treated water is used for drilling the first few feet of an oil well (first section) and where there are problems in the continuity of drilling (second section).

The dehydrator system can further comprise a double reduction gear box 8. In an aspect, the gearbox 8 can provide approximately 15500 Nm torque and works at speeds below 2 rpm. A connector is attached to a shaft to a connector 10 and further to a Bocin 11. The gearbox 8 can be disassembled for maintenance. When required to mobilize the dehydrator system further comprises a storage drawer 9 to store the gearbox 8 and reduce the overall height of the equipment and facilitates its transportation.

The dehydrator system 100 can further comprise an axial flow pitched blade 12 (also referred to as inclined plates 12 or inclined palettes of axial flow 12) that occupying most of the diameter of a circular cone 15. Since the shape of the circular cone 15 is concave, solids move towards the center of the cone 15 to the circular cylinder 16 and inside are the radial vanes 13 (also referred to as radial palettes). Hence, the circular cone 15 is in fluid communication with the circular cylinder 16. The radial vanes 13 assist to evacuate solids to the plurality of solid discharge pipes 17 and the positive displacement pump 18. Solids can then be disposed at a tarpaulin pool or tank called cash tank.

The dehydrator system further comprises a drag solid transition zone 14 that is in fluid communication with the circular one 15. The drag solid transition zone 14 is sometimes referred to as a transition from rectangular to round, a transition from rectangular to circular and/or a transition zone to circular cone 15. Solids slide via gravity from the drag solid transition zone 14 to the circular cone 15. If solids thick and adhere to the side walls of the transition zone 14 (or in the transition from rectangular to circular), solid removal jets 25 will activate to move or otherwise displace solids to the circular cone 15. From the circular cone 15, solids then pass to the circular cylinder 16 in fluid communication with the circular cone 15. The circular cylinder 16 downloads solids having a reduced or lower humidity. In an aspect, the humidity of the solids is between 40 and 50 percent or at 47% in the solids discharge pipes 17. Solids are subsequently be sucked out by the positive displacement pumps 18 also referred to herein as positive displacement pump lobes 18.

One or more suction pipe(s) 23 are used to clean and remove solids/solid waste from the dehydrator system. In an aspect, a first suction pipe 23a is located at a first elevated height, for example, ½h1 of the rectangular cube shown in FIG. 1. In this aspect, in order to download 50% of the volume of clean water that is in the rectangular cube quickly, the second suction pipe 23b can be placed above an inlet of the transition zone 14 or at h2 as shown in FIG. 1. With this scheme, from 0 to 50 percent of the remaining volume of the cube containing muddy water with traces of micro flocs may be processed. The suction pipe 23 is connected to a water distribution manifold 24. The water distribution manifold has at least four functions: (1) vacating or emptying water from the rectangular cube located in h1 immediately for cleaning; (2) connects to the jets 25 to remove solids and remove solids found in the drag solid transition zone or for example at h2 as shown in FIG. 1; (3) the water distribution manifold 24 is connected to the circular cylinder 16 in order to empty volume around the core dehydrator; and (4) the water distribution manifold 24 is connected to the discharge pipe 23, proceeding open valves to remove solids from the circular cylinder 16 toward the circular cone 15 and in order to remove solids adhered to the walls. Also, when processing the sludge product of oil drilling is finished, valves will be opened and creating a fluidic pathway to the solids discharge pipe 29.

As shown in FIG. 1, the present dehydrator system includes a solids removal system where solids separate and settle inside the core dehydrator 60. Separated solids are then discharged to the solids pump 17. The solids removal system includes the gearbox 8 and motor on top of the dehydrator system, a drive shaft 64, large rotating paddles 12 and small rotating paddles 13. The solids removal system moves settled solids from the dehydrator system for disposal.

In the solids removal system, the gearbox 8 is connected to the drive shaft 64 at one end, a drive shaft first end. Radial palettes 13 or small rotating paddles 13, collectively referred to as a "small rotating paddle" are connected to the draft shaft 64 at the other end of the drive shaft 64, a drive shaft second end, and positioned within the circular cylinder 16 (also referred to as a small cylindrical section 16). Furthermore, the inclined palettes of axial flow 12 or large rotating paddle 12 is also connected to the drive shaft 64 between the drive shaft first end and the drive shaft second end. The large rotating paddle is positioned within the circular cone 15, also referred to as a large cylindrical section. The large rotating paddle moves solids from the large cylindrical section 15 to the small cylindrical section 16 which is in fluid communication with the solids pump 17 via one or more solids discharge pipes 17. The large rotating paddle 12 may optionally include a rubber paddle attachment (not shown) at the end of the large rotating paddle or a free end of the large rotating paddle that is not connected to the drive shaft 64.

In an aspect, jets can be used for removal of solids 25. The jets comprise one or more pipes located between flocculation pipe 2 and the turbulent flow mixing compartment 3 as shown in FIG. 1. This configuration allows for removal of adhering solids at the bottom of turbulent flow mixing compartment 3. A plurality of jets 25 located in the drag solid transition zone 14 (inlet of solids from rectangular to round), can further remove solids adhered in the circular cone 15. Jets can also be positioned in the small cylindrical section 16 near the solids exit of the small cylindrical section 16, in the solids discharge pipe 17 and/or the solids pump.

The dehydrator system 100 can further include a travel unit having a skid 26 anchoring the turbulent flow transition zone 4 and plurality of telescopic columns 2 so that the dehydrator system can slide upward when operations are started. The unit can further decrease height for moving it and to meet standards for heavy loads on the roads. When entering areas inaccessible by road, the present dehydrator system can be moved by helicopter using the following: crane gauges connected in the ears 28 where equipment continues to life and the pins of each of the telescopic columns 27 are removed. By tapping and lifting, the system is separated it into two parts. The first part is the skid 26 which contains two positive displacement pumps 18, centrifugal pumps 36, the water discharge manifold 24, pipes, hoses and other accessories. The second part is the remaining portion of the system including its beams.

The dehydrator system described herein can operate at a noise level near zero decibels (dB), contributing to environmental protection. The dehydrator system can continuously process at flow rates of less than approximately 1200 gpm between drilling fluid (mud) and polymer solution, without suspending the process of dehydration. Solids can be removed directly from the dehydrator system without requiring additional equipment to dewater solids. Solids can be sent directly to the final disposal having humidity as low as 40 to 45 percent and possible lower between 25 and 35 percent or 25 and 50 percent. In the present dehydrator system, the core dehydrator is combined with a mixing unit having a plurality of vertical flocculators to process fluids contaminated with traces of crude product of oil drilling and to collect solids manually in a similar way as an API trap. In the described dehydrator system, there can be 1 to 15 flocculators, 3 to 11 flocculators, 3 flocculators or any other number of flocculators necessary to provide the quality of water treatment desired. The present dehydrator system can suck sand, coarse solids, clays, shales, directly from the sand trap drill hole located under the shakers. This avoids passing the solids to the other tanks in the system drill, avoiding pumps and other equipment damaged auger drilling and also save the consumption of meshes for sieves. (See FIG. 1).

The quality of treated water provided by the core dehydrator and dehydrator system relates to the depth of the feet drilled oil wells, ranging from 0 to 6000 ft approximately (1st section). The result of suspended solids can be less than 25 mg/l at the water discharge valve 22. If it is necessary to improve the quality of water, it can be passed through the recirculating valve 21 to the flocculator chamber 32 to obtain clearer water at the water collector tank 33 with suspended solids below 18 mg/l. For ranges between approximately 6000 to 9800 feet (2nd Section), suspended solids of less than 85 mg/l in the outlet can be obtained at the water discharge valve 22. If necessary to improve the quality of water, it can pass through the recirculating valve 21 to the flocculation chamber 32 to obtain higher quality water in the water collector tank 22 having suspended solids below 72 mg/l. Finally, for ranges between 9800 to approximately 12,000 feet (3rd Section), suspended solids of less than 650 mg/l in the outlet can be obtained at the water discharge valve 22 and if It requires improving the quality of water pass through the recirculating valve 21 to rapid mixing manifold to improving quality in the water collector tank 33 having suspended solids of approximately less than 500 mg/l.

The present dehydrator systems can flocculate and dehydrate drilling fluid with densities ranging from about 1030 to 1450 kilograms per meters cubed (Kg/m$^3$) and provide drilling wastewater in condition for release into the environment without substantial pollution. The dehydrator system can receive water-based fluids from drilling processes, which contain very high densities, otherwise referred to as a "mud" and drilling fluid that is mixed with the solids inside a hole, sometimes referred to as waste. The dehydrator system can be further used to receive fluids contaminated with hydrocarbons (high total petroleum hydrocarbon (TPH)), from formation waters for treatment, or production sands when drilling is taking place. These dehydrator systems tend to avoid or mitigate environmental impact.

The dehydrator systems described have certain advantages including a decrease in the measurements of the deflector plaques, an increase and novel shape of stirring blades, an increase in the capacity of reducing boxes (gearbox), and unique placement of jets in corners to facilitate solids fall. In addition, the dehydrator system has a plurality of flocculators (in an aspect, three flocculators) each positioned in a flocculator chamber and each flocculator having optimized inclination angles, including both ends as a cone, and location of additional jets.

Also, in an aspect, the dehydrator systems described herein have the rapid mixing manifold positioned in the mixing unit that is directly equalized with the core dehydrator. In an aspect, the mixing unit comprising three vertical flocculators 37, a water collector tank 33, which has the same capacity as the tank for polymer dissolution, two tanks for polymer dissolution (also referred to as polymer stir tanks) each tank having an agitator (i.e., double paddle stir), and a mud conditioning tank 35 with an agitator. In the rapid mixing manifold 1 having inlet deflectors, drilling fluid is mixed with polymer flocculant polymer solution, and in some aspects, in less than a second. In an aspect, the inlet deflectors have a fish vertebrae shape. This way, the flocculated mud enters a turbulent flow mixing compartment 3 in which a collision with the compartment wall is produced, and in order to distribute the flocs on the bottom and sides of the compartment 3 allowing immediate precipitation of solids.

In the interior of each chamber, there are a plurality of small deflector plaques 6 and a plurality of large deflector plaques 7, each type of plague can be inclined at 70 degrees. At this point in the process, drilling fluid containing flocs has a laminar flow and moves horizontally with linear speeds of less than 0.3 m/s. Therefore, drilling fluid is distributed substantially uniformly in each of the chambers, beginning the process of collision with the small plaques 6 in which the flocs tend to go up and joining together to form heavier particles that precipitate. The fluid that contains the light flocs rises and passes from one plaque to another, where they also agglutinate to precipitate, fulfilling the trajectory of the plaques that are found at different heights, to meet the first sedimentation process.

Following this, fluid travels through each one of the flocculators and collides with the first plaque 7a of the plurality of large deflector plaques, the same are at the same height and on the same path of the light and heavy flocs meet the same process as was done in the small plaques 6, i.e. as they ascend they agglutinate and precipitate. In addition to this process, between each plaque of the same height, micro whirlpools are generated, requiring floc to descend, to obtain clear water. If at the end of this process, there is possibility of presence of very light micro flocs, water can be collected in a water channel, that will subsequently flow to the flocculators, located in the mixing unit which is intended to improve water quality. As a result of this process, a certain volume of water can be obtained that is used to prepare the polymer solution, a cyclical process, and finally returning to the core dehydrator to continue the dehydration process and the other part will go to a storage tank for final disposal that is the reinjection.

In the distributor water channel 20, fluid (water) comes from a plurality of well water transporters 3, each having plaques in the interior. Water falls due to overflow, and as its name says, allows water distribution through a plurality of butterfly valves, distributed by the water discharge valve 22 to improve water quality and one water discharge valve 22 to evacuate the perforation system where water is used for the first feet of perforation of an oil well (first section from 0 to 6000 ft.), and when problems arise in perforation continuity (second section from 6000 to 9000 ft.).

In the core dehydrator, there is a double orthogonal reducing box (gearbox) 8 providing a 15,500 Nm torque that works at speeds of less than 2 rpm, joined to a connector 10 to the agitator that is easy to disassemble for maintenance. When the core dehydrator has to be moved, it has a storage drawer gearbox 9, allowing total reduction of height and to facilitate transportation of such equipment. A reducing axle directly attaches to the deflector plaques 6, 7, of axial flow, occupying 99% of the cone diameter, its concave shape allows easily moving the solid to the center of the cone, to a circular cylinder 16 inside of which the radial palettes 13 are found that help evacuate solids through a plurality of solid discharge water ducts and then to positive displacement pumps. Solids will be placed on an impermeable pool or a cutting tank referred to sometimes as a cash tank.

The drag solid transition zone 14 allows solids to slide by gravity to the circular cone 15 and in case that solids are clay like, and adhere to the lateral walls in the transition zone 14. A plurality of jets 25 can be activated to help solids to move, and then pass through the circular cylinder 16 that allows solid discharges with humidity of less than 47% and be further suctioned by positive displacement pumps.

Furthermore, there are discharge suction pipes 29 for solid waste cleaning and removal from the dehydrator system. The first pipe is located at about ½ of h1 (FIG. 1) from the rectangular cube of the core dehydrator, with the purpose of discharging 50% of the clean water volume that is found in the rectangular cube in a quick manner, and the second suction pipe is found 10 cm above the drag solid transition zone h2 (FIG. 1), to eliminate substantially 50% of the volume of the cube, that contains dirty water, with traces of micro floccules. The suction pumps are attached to the water discharge manifold 24 that has four functions: first, evacuate all the water from the rectangular cube located in h1, immediately for cleaning; second, connect the plurality of jets for solid removal; third, connect to the circular cylinder 16, with the purpose of evacuating 100% of the volume on the core dehydrator and fourth, connect to the disposal pipes, opening valves to remove solids from the circular cylinder to the cone in order to remove solids adhered to the walls, and so, when all the mud from the oil perforation is removed, valves are opened directing them to a solid waste discharge duct, and water is pumped until it comes out totally is solid-free.

The skid 26 secures telescopic columns 27 that help to slide ascendant to the core dehydrator when perforation operations start, and descend when we are going to transport, to reduce height, to comply with heavy load regulations. When the equipment goes to inaccessible places by land, it may be transported by helicopter, for this purpose the following procedure must be followed: crane gauges of a crane must be connected to the ears 28, keep system raised until the pins of each of the telescopic columns 27 are removed, by slightly striking; then the core dehydrator is raised completely, separating it into two parts: the skid, which has two positive slide pumps, centrifuge 4×3×13 pumps, water discharge manifold, ducts, hoses and other accessories; and the upper part of the core dehydrator including its beams.

The result of processing mud using the described dehydrator systems include:

Solids with average humidity of up to 47%, and that are easily transported through pipes except the solids coming from the decanted centrifuges.

Free particle water with suspended solids within the limits allowed by the Environmental Legislation, for those fluids from the first perforation section.

Distribution of the more compact solids in cells or pools.

Advantages of the dehydrator system include new parameters for this type of equipment, regarding height and length, facilitating movement, transportation, and placement, related to the core hydrator, being a totally compact equipment.

| LENGTH OF EQUPMENT | 8.454 m |
| --- | --- |
| HEIGHT (Without cealing) | M |

Another advantage is construction of a stand in the same unit, to place a decanter centrifuge, with the purpose of removing or recuperating low or high gravity solids. In one aspect of the described dehydrator system, the deflector plaques 6, 7 have inclination at 70 degrees and comprise aluminum material having raised thickness from about 4 to 6 mm. The deflector length can be diminished, that is a height of 1.7 meters from the cylinder versus a 2.3 meters height over the same cylinder. Also, in an aspect, the transition zone 4 is constructed with ASTM A36 steel thickness with an angle of 33.67 degrees on the side and 51.34 degrees in the center. The diameter of a precipitation cone of the transition zone 4 is 3.2 m. A height of 700 mm was built in an aspect of the transition zone 4 made of ASTM A588 steel with 6 mm thickness, and a 27.7-degree angle formed from the top part of the solids discharge. The circular cylinder 16 can have a height of 24 cm, with a connection that allows the flow of solids with a certain degree of inclination. The rapid mixing manifold 1 is located in the mixing unit and between about 6 to 8 meters from the entrance to the core dehydrator in order to flocculate the mixture and agglutinate it during transportation.

In the present dehydrator system, water exhaust channels are eliminated in the compartment of the sediment settler chamber in order to have a longer residence time and get better water quality. Solids control processes can be different now in the oil industry as the core dehydrator is friendly to the environment. Currently, the use of decanter centrifuges in the process of dewatering or dehydration is paramount in drilling (conventional solids control process). The present dehydrator system uses an additional decanter centrifuge for the process of removal of low or high gravity solids, allowing the customer savings in their operations costs such as fuel consumption, and maintaining in good condition the properties of the drilling fluid, decreasing the drilling days. Other secondary but important issues for the operator is the decrease of use of chemicals, of mesh screens within the drill, because the equipment will optimize the use of such materials.

The subject dehydrator systems can process waste at high flow rates, resulting in water with optimum parameters to be reused or sent for reinjection wells and/or solids that are easy to be transported or disposed. Energy consumption is lower with the dehydrator system, therefore the cost to rent a power generator necessary to operate it, and diesel consumption are lower, also helping to minimize environmental pollution. The system is transportable and can be assembled and disassembled. With the present dehydration system, the time in setting up in rig up and rig down has been reduced in comparison to other systems. In a second stage, if the pools or cells where the cuttings and waste are deposited are near the dehydrator system, the road equipment such as excavator and dump trucks, can be minimized or eliminated, as these would be driven by two positive displacement pumps, and can be distributed throughout the pool, by transport pipeline of 6 or 8 inches that would be located around the dehydrator system.

In the development of the dehydrator systems, a first prototype was designed and built. The prototype measured are (2.4 m long×0.7 m wide and 1 m high), and had a 6-month test in exploitation oil fields, resulting in improved efficiencies in the processes of dehydration (sometimes referred to as dewatering), whether toward the active system (returning water to the drilling tanks) or discharge of the water to the environment.

Treated water obtained from the dehydrator system can result in suspended solids at 20 mg/l in the first section of drilling, whereas with conventional equipment suspended solids results range from 240 mg/l to about 480 mg/l, saving chemicals to treat wastewater from the said equipment, sending the water directly to injection, complying with the valid parameters set by law, without chemical treatment. The results of suspended solids from water in the second and third sections of the drilling can be less than 500 mg/l, compared with the conventional system which ranges from 2500-8000 mg/l.

Using the present dehydrator system, processing of the mud or fluid to be treated is continuous, without stopping the dehydration process for maintenance, as the conventional system has to stop operations at least 2 times every 24 hours for a period of 2 hours. In the present system, fluid flow is substantially constant. Fluid flow speed changes at the end of the process (where flocculators are located in the mixing unit) can be less than 0.1 m/s to aid micro floccules to clump together and precipitate and obtain clear water. The present dehydrator system has the capacity to suck sand, thick solids, clay, directly from the drill sand trap drill or grit chamber; compared with other solids control equipment that has to be suctioned when the fluid is completely clean of sand and clay (after the de-claying tank of the drill) (FIG. 3) to avoid damaging the internal part of the decanting centrifuges. Using the present, an operator may omit the use of a sludge conditioner, representing a considerable financial saving.

The total flow is designed to process is approximately 1200 gallons per minute (gpm), between drilling fluid (mud) and polymer solution; while prior art solids control system processes up to 450 gl/min between drilling fluid and polymer solution. There is a relatively low maintenance cost for the present dehydrator system compared to decanting centrifuges or conventional system. There is a decreased consumption of meshes in the shakers of perforation drills, especially in the first section (0-6000 feet); an analysis made from 2011 to 2015, obtained a 42% savings, using the dehydrator system descript, compared to other systems. Furthermore, there is a reduced chemical consumption; an analysis was done from 2011 to 2015, and it was optimized by 50% compared to the conventional system. The present dehydrator system can remove oil traces, especially in oil fields that use the equipment. The dehydrator system reduces or minimizes environmental pollution and industrial safety in noise reduction (according to the noise map). The result was zero decibels, with other solids control equipment there is an average of 85 to 110 dB.

The present dehydrator system can also be used in the mining area, wastewater plants, and for water under formation. Formation water that comes with sand, solids and traces of oil can be treated; as well as fluids from the mining industry, since using the system optimizes the use of the sieves and hydro cyclones. Solids are drawn out and clear water obtained that is returned back to the active system, or to the process, avoiding water discharge to the environment. The present dehydrator system continuously, without stopping, evacuates solids or dense flocs, as well as treated water, and this allows to avoid problems that oil and mining industries are currently having, such as the storage volume of weak solids that occupy more volume and therefore greater capacity in pools or tailings.

The dehydration system and processing involve dehydration of the drilling fluid in oil wells to produce a liquid (water) and solid (cuts) discharge. Dewatering processes are performed and the resulting fluid can be routed to the active system or towards the water treatment tanks, depending on the conditions in the perforation. The dehydrator system 100 utilizes a process of chemical and physical separation (volumetric reduction). Dehydration of the cuts is essential for treatment in pools or cells reducing capacity of them. This operation will be carried out by sedimentation baffle plates. Prior to the discovery of this process, a chemical compound that destabilizes the emulsion that forms the mud, and promotes the chemical and physical separation of its components will be added.

Figure 3C:
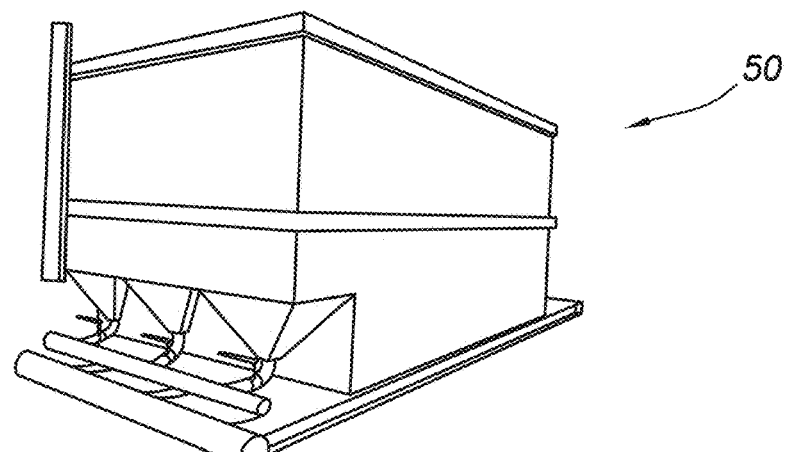
FIG. 3C is front view of the mixing unit.
Figure 4B:
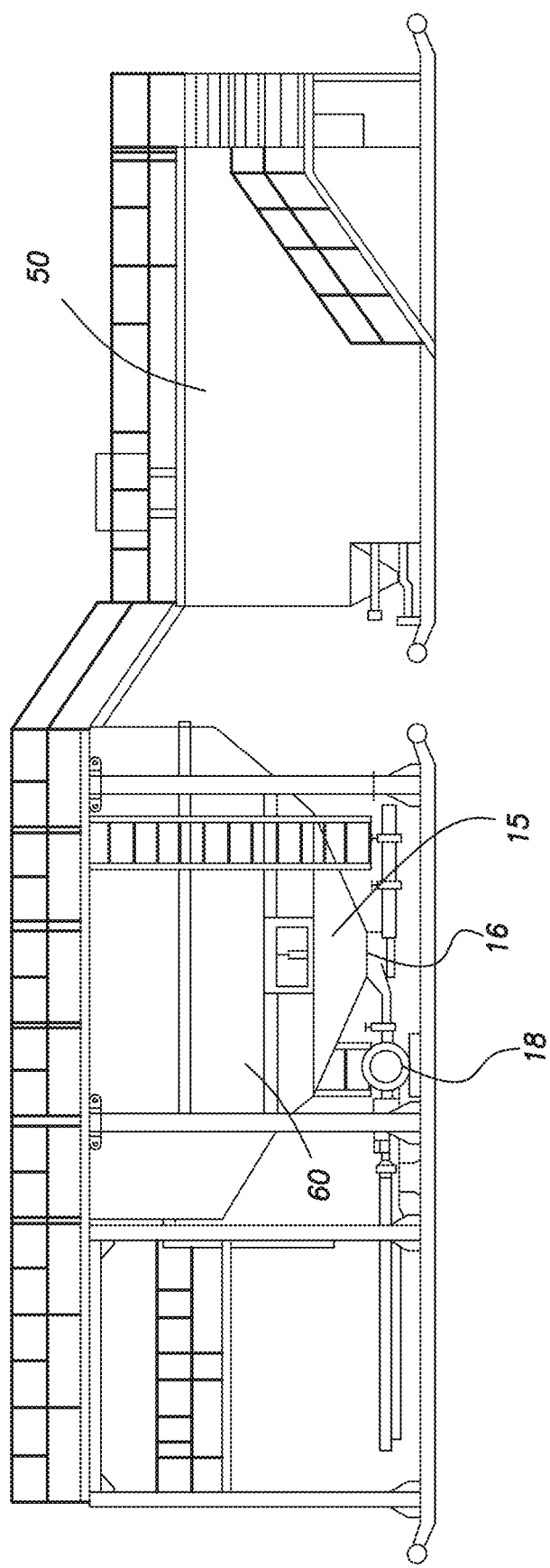

The present system applies solids controls processes without using centrifuges decanters, a dewatering unit or dehydrator, and can eliminate excavators and dump trucks, especially where there are pools near the location. If the process works with cells or storage centers, tank cuts or cash tanks will be used. It can obtain improved water quality so that water can be reused in the active drilling system, in order to prevent colloids which in turn degrade, when passing through the drill pipe, increasing the viscosity in the drilling fluid, and thus increasing the operation days. As noted herein, it can help decrease electrical energy consumption, saving 27% on fuel in comparison to other solids controls processing and minimize the environmental impact caused by the discharge of liquids to the environment while reducing the noise caused by conventional equipment (80-110) dB to zero (0) dB with the DNT equipment. FIG. 3 details the layout of an aspect of the dehydrator system 100 discussed below in Example I.

Example I

Parameters and Main Components of the Dehydrator System

TABLE 1

SYSTEM PARAMETERS

| | |
|---|---|
| Maximum load | 32869 kg |
| Work flow (approximate) | 1200 gal/min |
| Volume of the equipment | 300 bbls |
| Length of the equipment | 8.454 m |
| Width of the equipment | 3.56 m |
| Height of the equipment with cealing | 7.450 m |
| Height of the equipment without cealing | 4.650 m |

TABLE 2

PARAMETERS OF THE MIXING UNIT

| | |
|---|---|
| Maximum load | 20464 kg |
| Work flow (approximate) | 1200 gal/min |
| Volume of the equipment | 964 bbls |
| Length of the equipment | 7.654 m |
| Width of the equipment | 3.2 m |
| Height of the equipment ceiling included | 6.253 m |
| Height of the equipment without ceiling | 3.408 m |

Stand for Decanter Centrifuges 31

Figure 47:
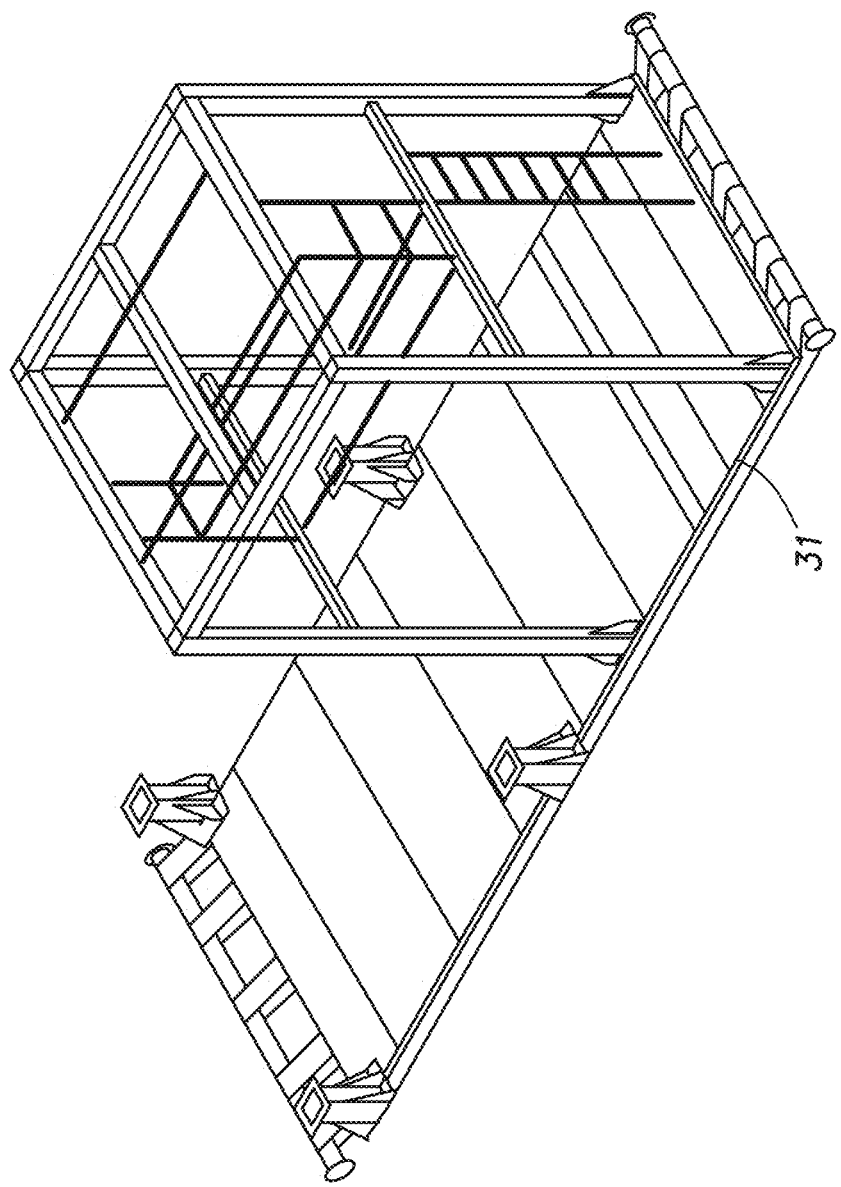
FIG. 47 shows the centrifuge stand.

A stand 31 was built, in order to place a decanter centrifuge and to supplement the core dehydrator and perform the removal of solids of low and high gravity. (See FIG. 47)

Telescopic Columns System 27

The telescopic columns system comprises a set of four bases, boot and detachable column with pin. Boots constructed with ASTM A36 steel 12 mm thick, were reinforced with square stiffners flange type, reinforced with ASTM A 36 steel 16 mm thick, for reinforcement between skid base and boot (see FIG. 30).

Columns and Side Beams

The columns support the weight of the structure plus weight of the fluid when in operation, it is composed of a UPN profile 200, final dimensions 200×150 mm and 3800 mm high, design load 20,000 Kg compression. Side beams UPN profile 140 mm, on which a vessel lining, ASTM A36 steel 6 mm thick, is attached.

Ears 28

A plurality of ears 28 were built in order to help demobilize and dismantle of the equipment, built with NAVAL steel material, with a yield strength of 248 MPa and a thickness of 39 mm; this element as shown and described can support 26 tons (see FIG. 31).

Container Cover

Figure 2:
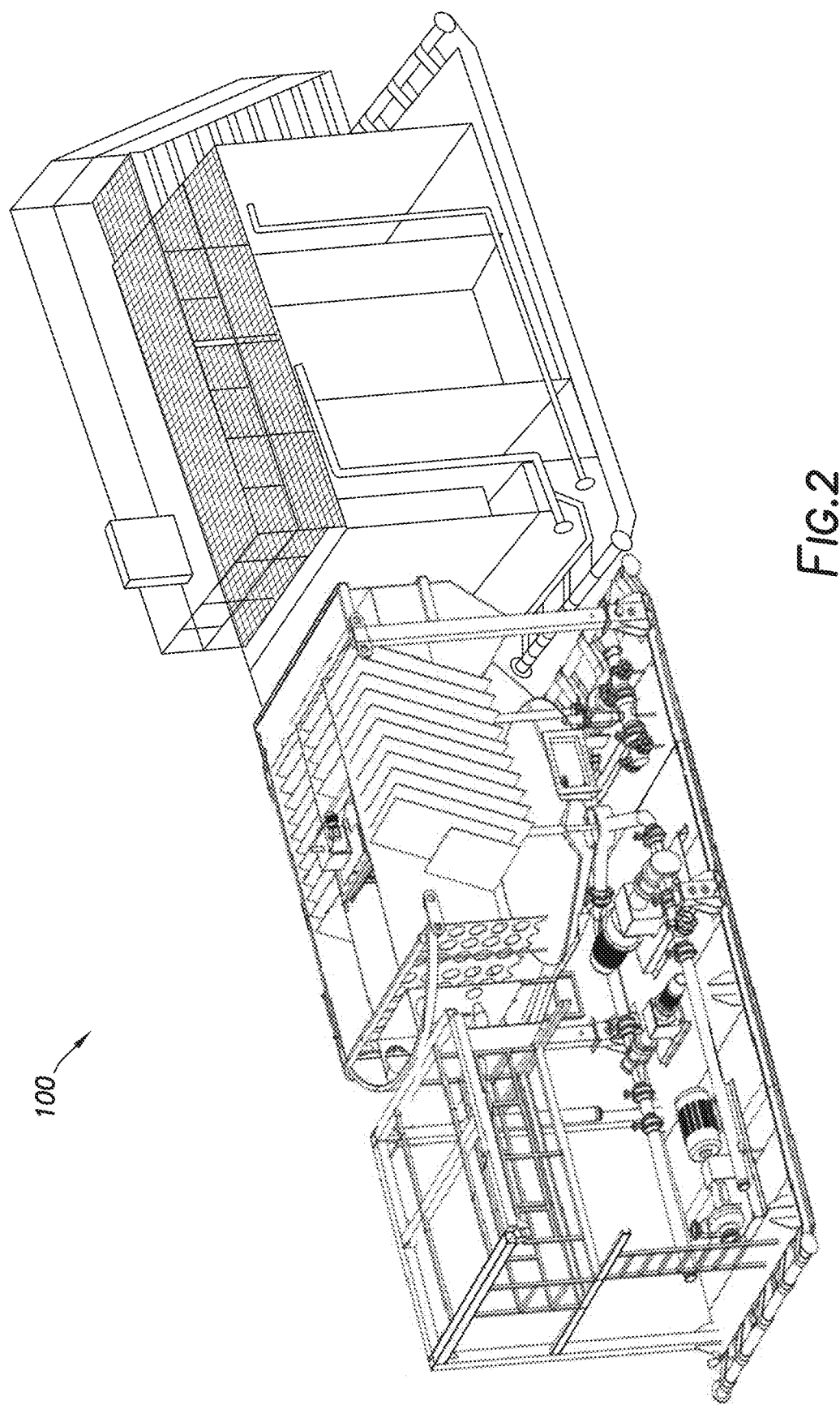
FIG. 2 showing the mixing unit of the dehydrator system that include vertical flocculators, stir tanks, polymer and double paddle stir and a mud conditioning tank.

The container cover was made of ASTM A36 steel material having a thickness 6 mm, and side measures: 4000 mm×2500, depth 1700×2500 mm. (FIG. 2).

Fluid Inlet Manifold

Figure 6B:
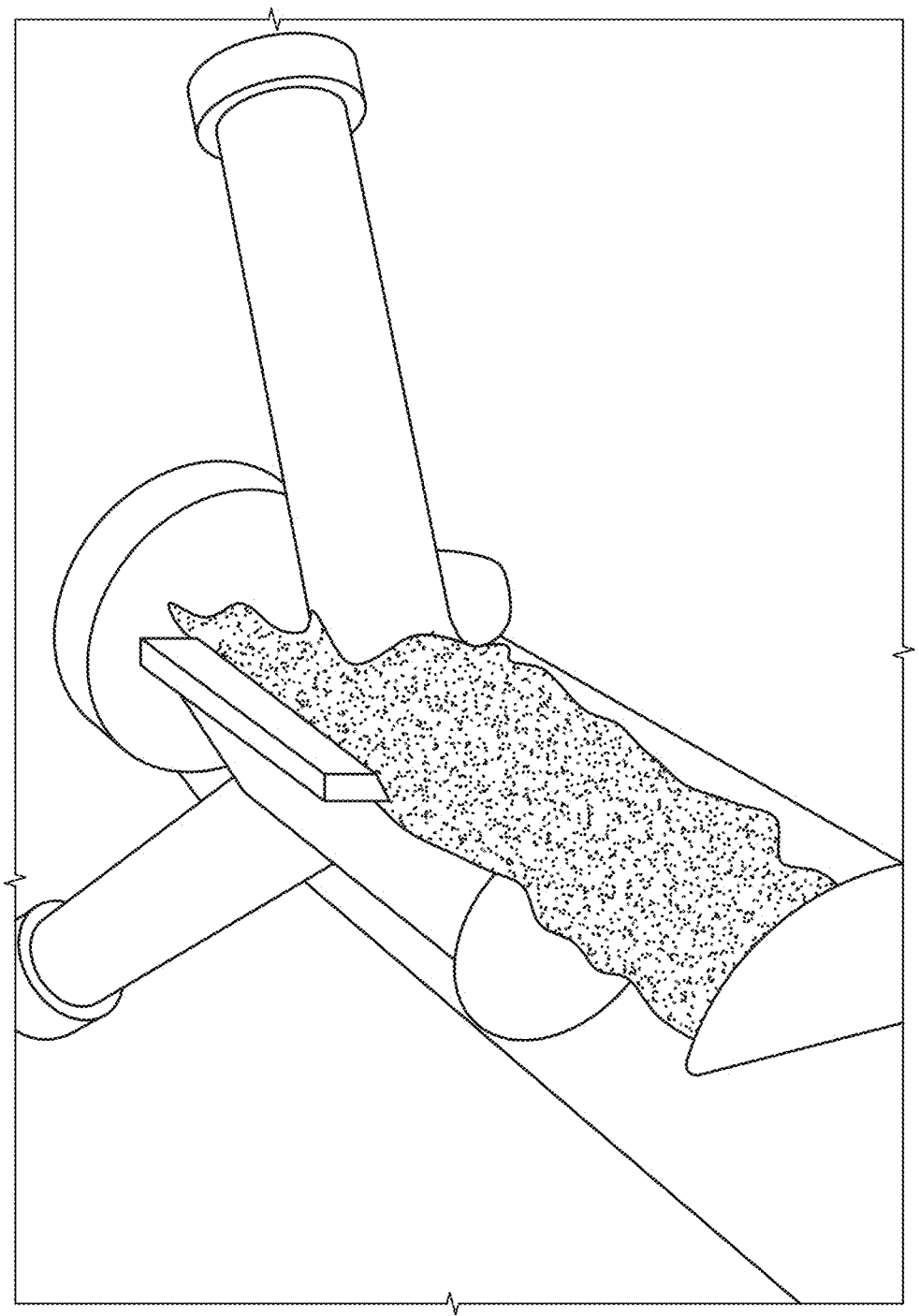

Dehydrator system has a rapid mixing manifold 1 with inlet deflectors, where drilling fluid (mud) is mixed with flocculant polymer solution, and moves in the pipe 2. The mixing manifold 1 is located on top of the mixing unit (See FIG. 6).

Flocculation Pipe 2

In an aspect, the flocculation pipe 2 is built with steel SCH approximately 80 8 m length which function is to allow clumping floc to enter the chamber 5. Drilling fluids enter the core dehydrator flocculated (See FIG. 3), and the turbulent flow mixing compartment 3.

Turbulent Flow Receiver Mixing Compartment 3

In this aspect, the compartment 3 was made of ASTM A36 6 mm thick steel, curve plaque radius 1780 development 4000 mm, where the flocculated drilling fluid enters, and a collision with the wall of the compartment 3 occurs. (FIG. 3), distributing the fluid both at the bottom and at the side. (See FIG. 7)

Turbulent Flow Transition Zone 4 (the Holes Plaque)

Figure 7C:
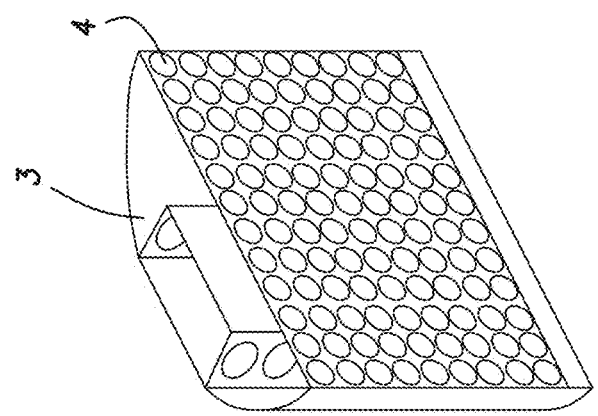
FIGS. 7A, 7B and 7C show the turbulent flow mixing compartment with plate openings having a turbulent flow transition zone where linear speed of fluid flow is reduced.
Figure 7B:
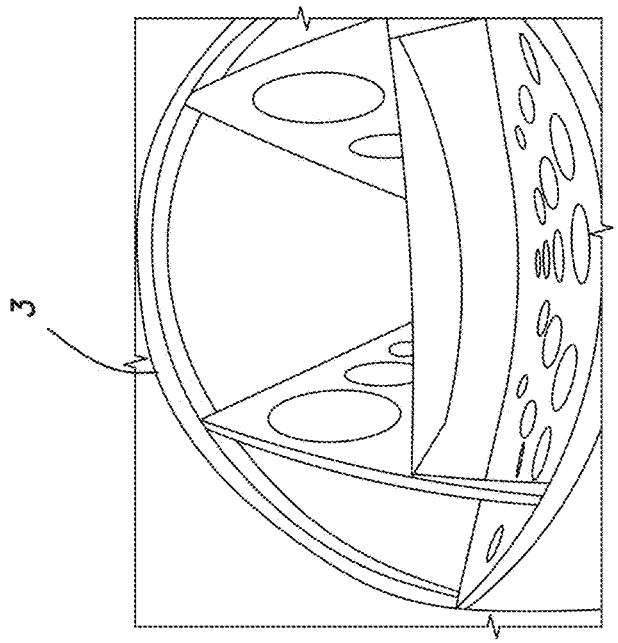
Figure 7A:
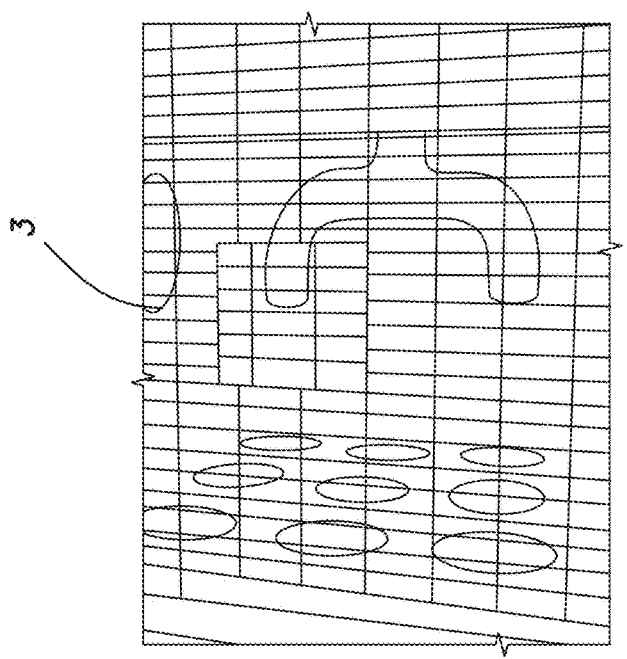

In this zone, perforations of 300 and 250 mm in diameter in the plague were made (See FIG. 7). Due to its shape, fluids pass from turbulent flow to laminar flow to cover the entire width of the equipment.

Clarifying Sediment Chamber 5

Figure 8A:
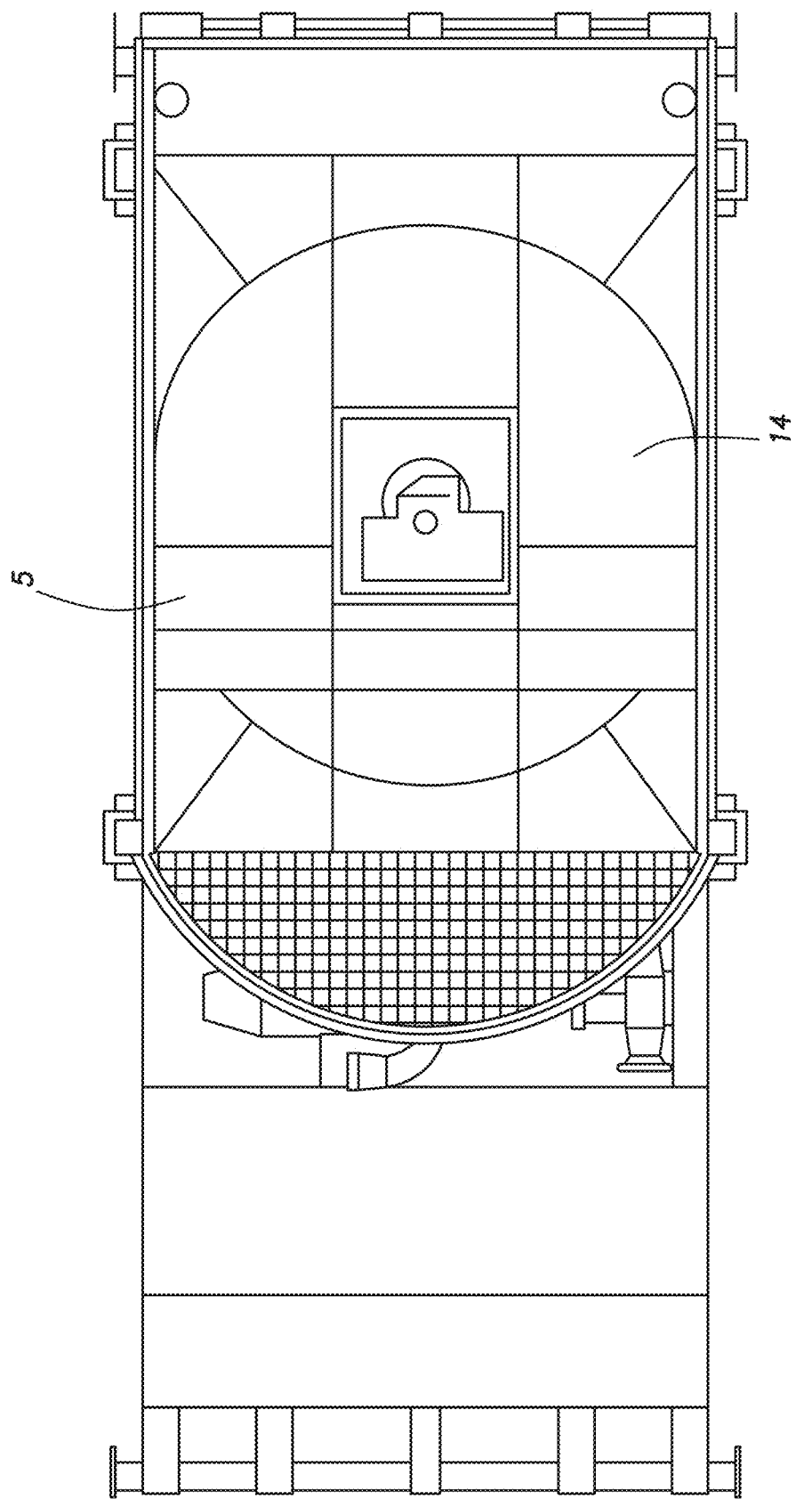

The clarifying sediment chamber 5 is the main chamber where solids can settle in one of three water transportation chambers. The clarifying sediment chamber has small and large deflectors to allow for a laminar flow for the proper settling of floc and heavier particles, such as sand, clay and gravel, in order to improve residence time and obtain a better water quality (See FIG. 8).

Small Deflector Plaques 6

Figure 9B:
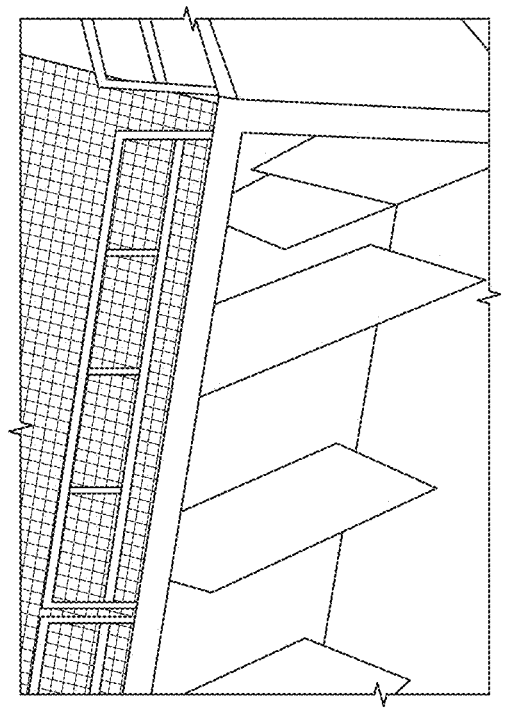
FIGS. 9A and 9B show the small deflector plaques and large deflector plaques where micro-floccules are collected and agglutinated until they are enlarger and precipitate.
Figure 9A:
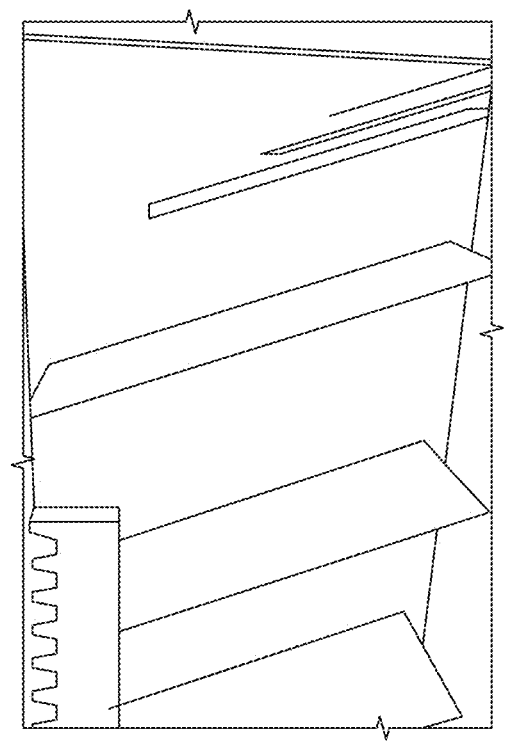

Small deflector plaques 6 were set in this aspect with inclination angle of 70 degrees, and having sliding, steel material, 6 mm thickness, placed at different heights, where flocs tend to rise and agglutinate to form heavier particles that fall. (See FIG. 9).

Large Deflectors Plaques 7

Figure 10B:
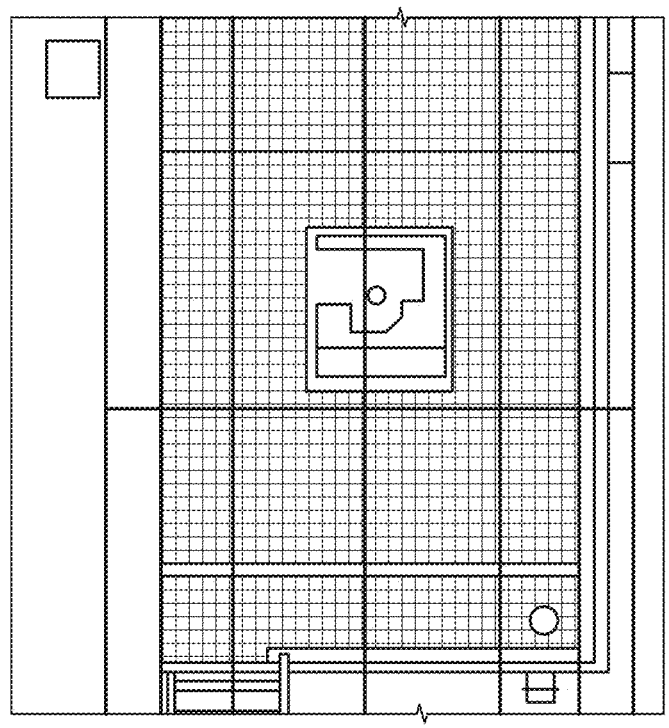
FIGS. 10A and 10B show the fluid and micro-floccule flow pathway to achieve lowered speed.
Figure 10A:
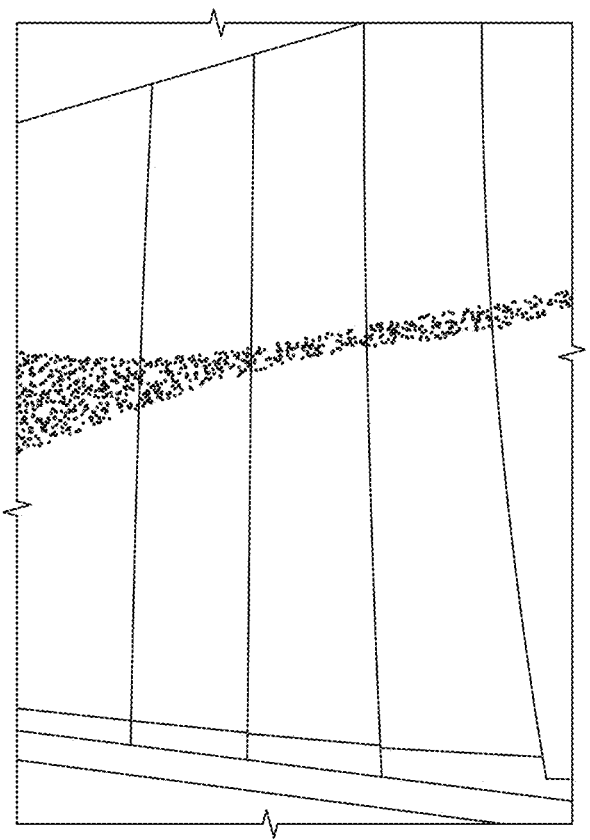

Large deflectors plaques 7 were set at an angle of 70 degrees in this aspect, sliding material, 6 mm thick, aluminum, with a length of 1.7 m, placed at 2.3 m from the base where solids output. (See FIG. 10)

Reduction Gearbox 8

Figure 11:
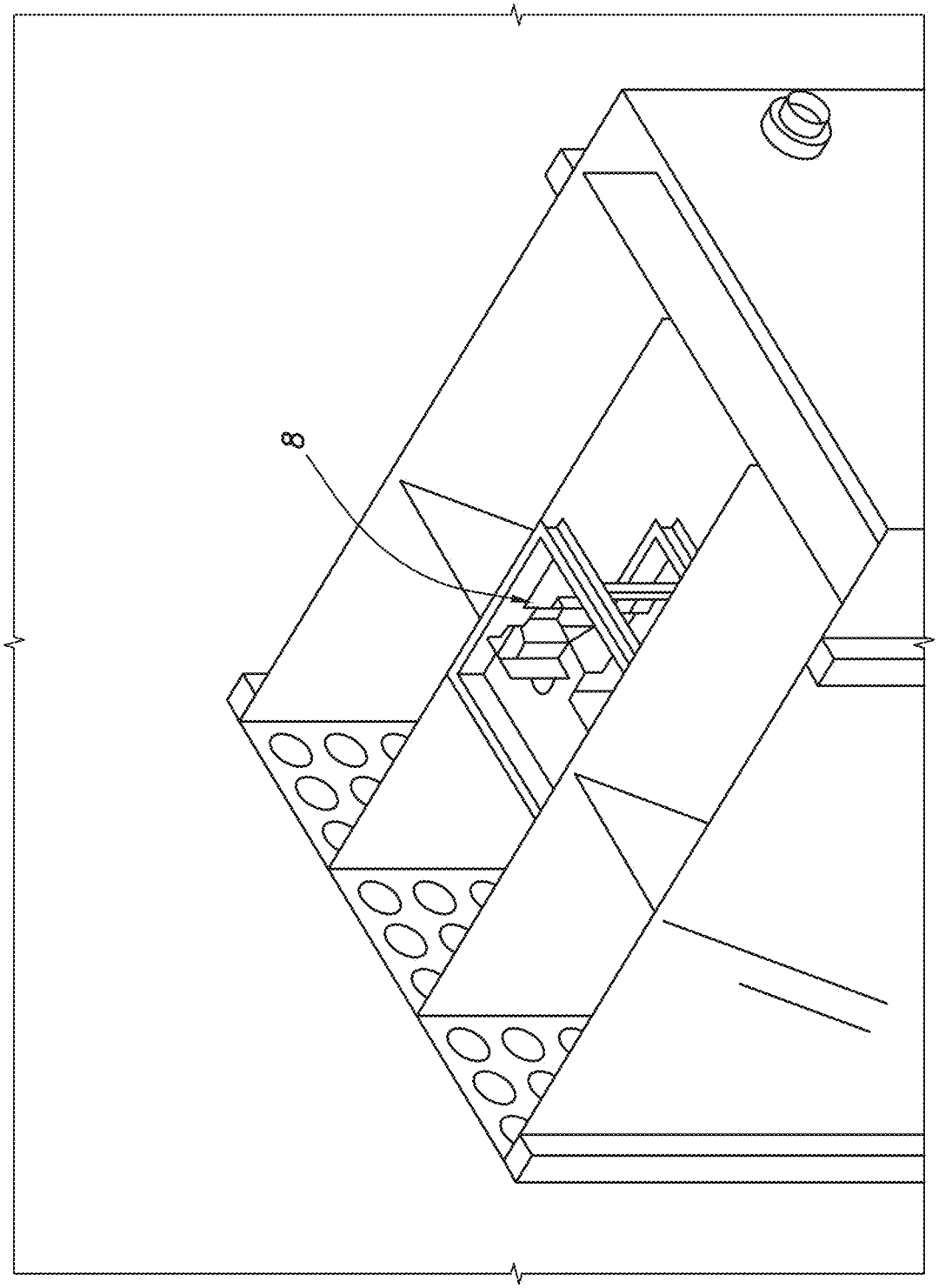
FIG. 11 shows the gearbox that moves the solids to the circular cylinder.

Double orthogonal reducer gearbox 8 can work at speeds below 2 rpm. (See FIG. 11).

Storage Drawer for Gearbox 9

Figure 12:
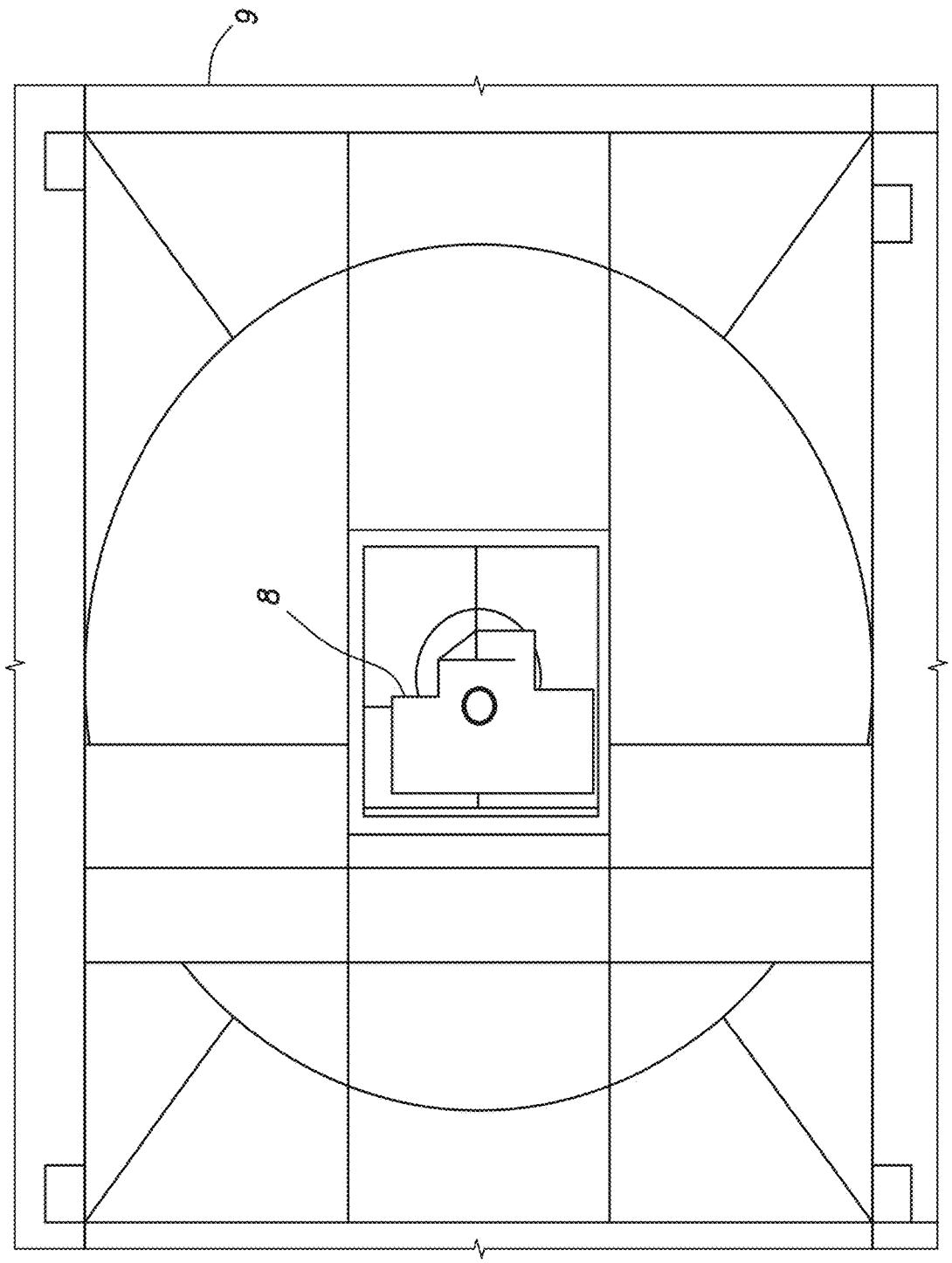
FIG. 12 shows the storage drawer gearbox that allows reduction of the dimensions of the core dehydrator.

Built specifically to keep the gearbox 8 and allow the reduction of overall height of dehydration system, facilitating transportation of equipment. (See FIG. 12).

Connector to Agitator Shaft 10

The connector to agitator shaft 10 provides transmission of power and motion. Made of steel material AISI 1045 HR, yield strength of 313 MPa, has a towing capacity of 122 kgf in each of the ends of the sweepers, and can withstand without difficulty a maximum torque of 3841 Nm without damage occurring. (See FIG. 13)

Bocin 11

The bocin 11 is an element that supports cut, due to torsion, thus it has a yield strength 431.6 MPa, an outer diameter of 112 mm, inner diameter 63 mm. (See FIG. 14).

Inclined Palettes of Axial Flow 12

Figure 15:
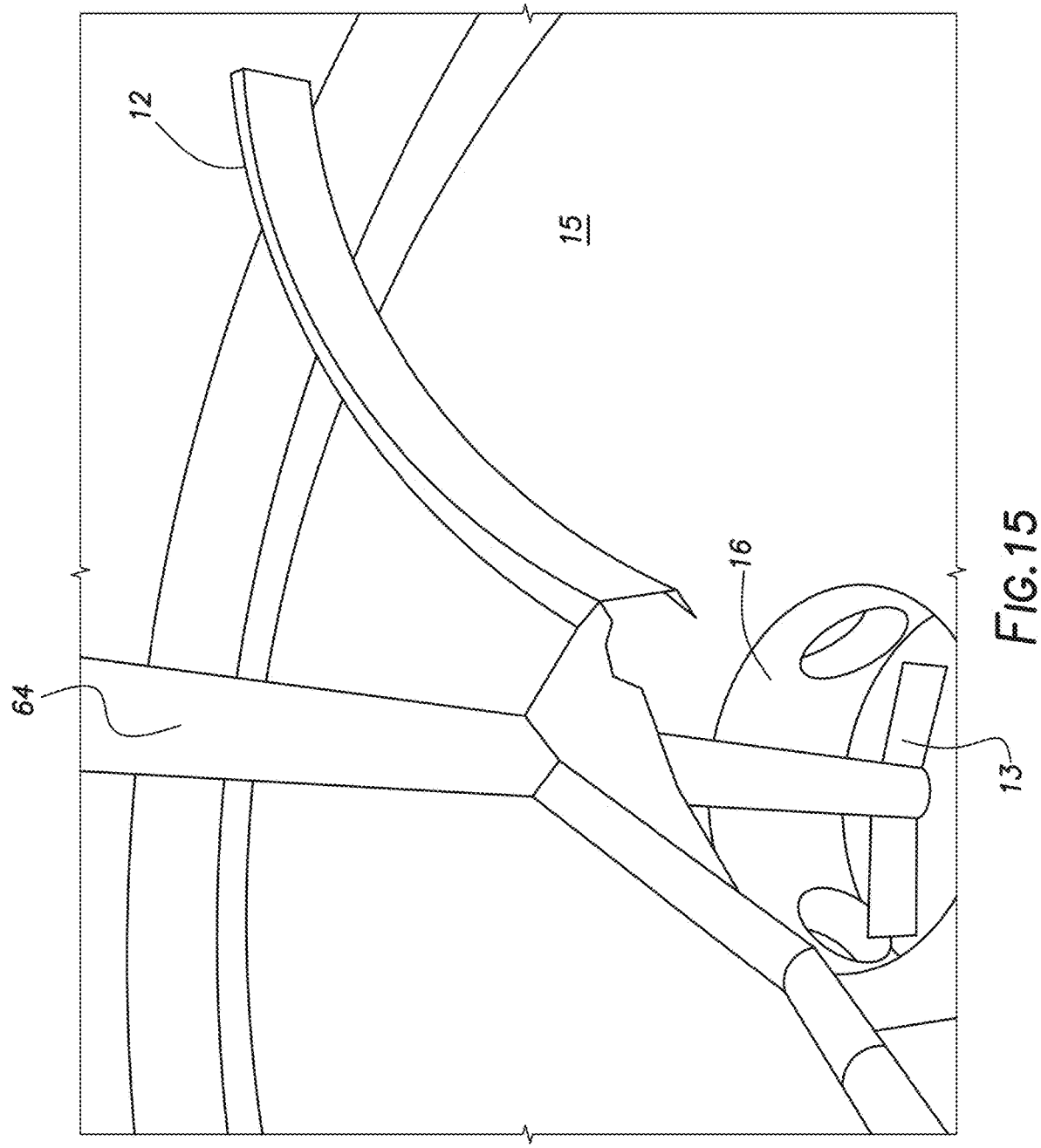
FIG. 15 is the inclined palettes of axial flow having a concave shape to transport solids from the circular cone to the circular cylinder.

The purpose of the inclined palettes of axial flow 12 are to remove the solids deposited in the system located at the ends toward the center and at full capacity. The inclined palettes of axial flow 12 is a plurality of inclined palettes rotating with helped of the orthogonal motor reducers. In this aspect the inclined palettes of axial flow rotate at 1 to 2 rpm, 21500 Nm approximately, working 24 hours a day, and with about 15 HP. (See FIG. 15)

Radial Palettes 13

The purpose of the plurality of radial palettes 13 is to evacuate the solids (deposited in the cylinder) and move solids towards the solids discharge pipe 17. (See FIG. 16)

Drag Solid Transition Zone 14—from Rectangular Section to Circular Cone

The drag solid transition zone 14 is a rectangle section of the core dehydrator positioned adjacent to the circular cone 15. In an example, the drag solid transition zone 14 was sized at 4000×3200 mm in rectangle shape and built in ASTM A36 6 mm thickness, emergency hatch 700 mm×400 mm, with top angles of 33.67° and 51.34° at the bottom. (See FIG. 17)

Circular Cone 15 or Large Cylindrical Section 15

Figure 18C:
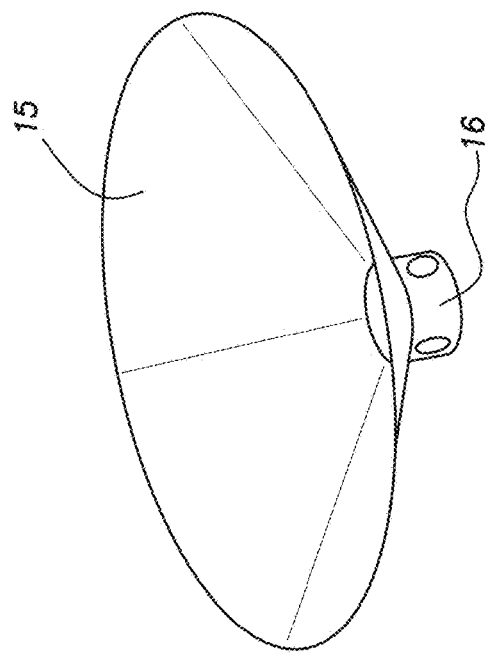
FIGS. 18A, 18B, and 18C show the circular cone.
Figure 18A:
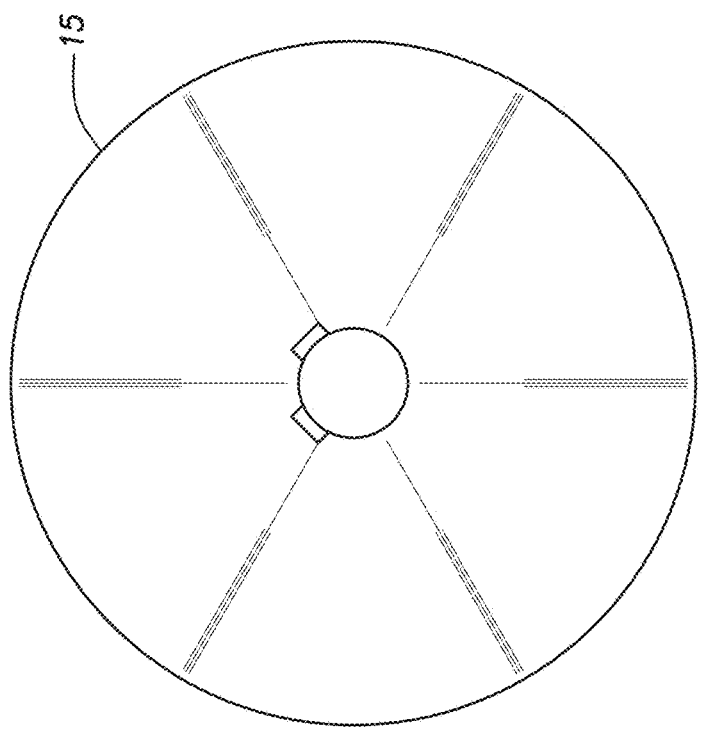
Figure 18B:
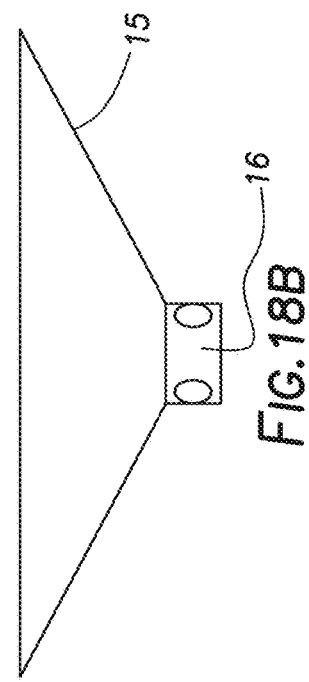
Figure 19:
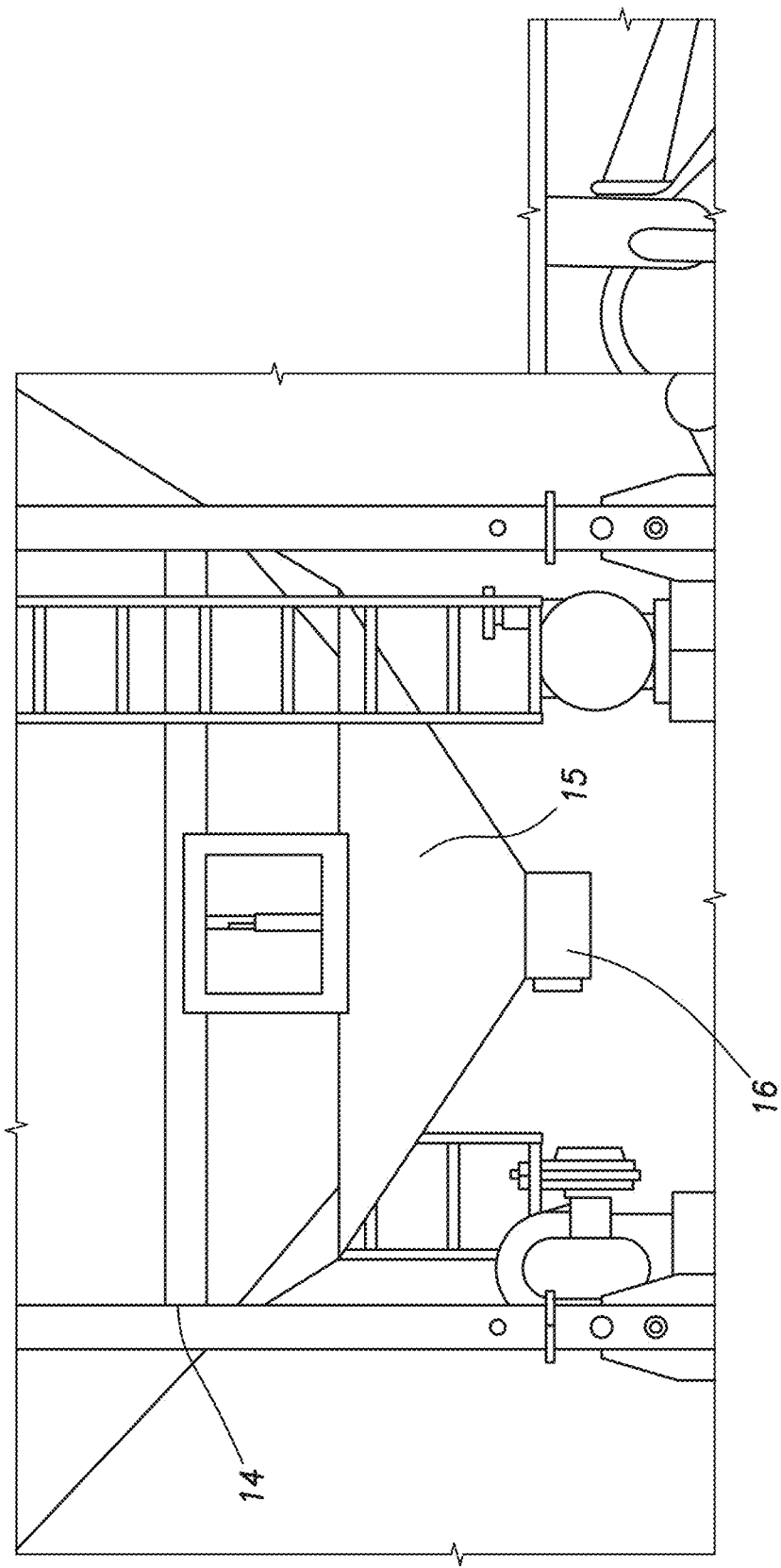
FIG. 19 shows the drag solid transition zone (from rectangular to circular), the circular cone and the circular cylinder.
Figure 20B:
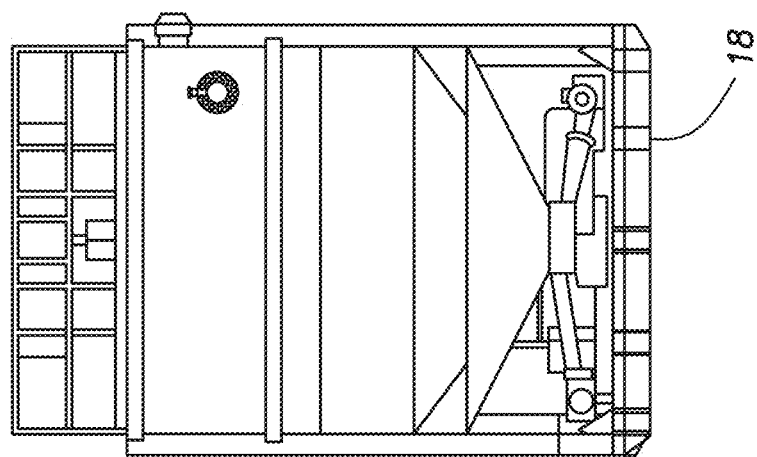
FIGS. 20A and 20B show the positive displacement pump lobes where solids are discharged to the mud conditioning tank and to cutting pools.
Figure 20A:
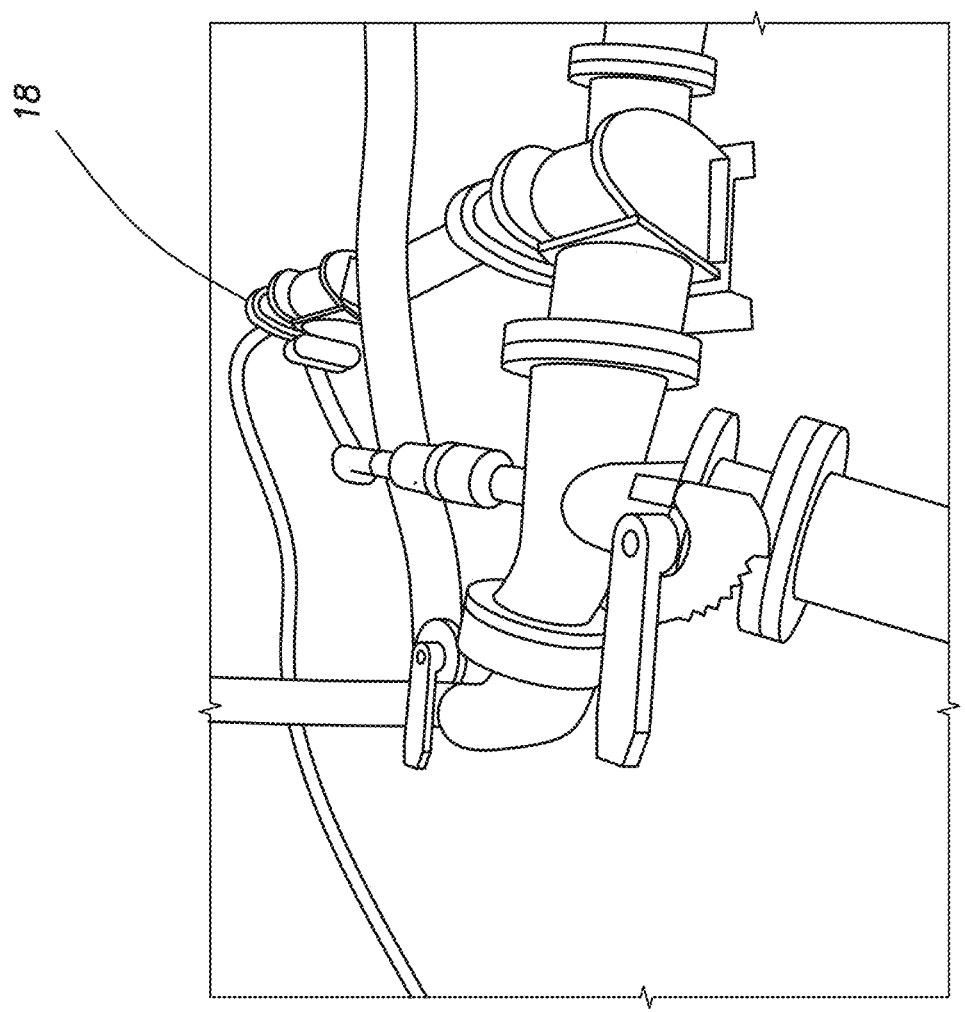

The circular cone 15 allows solids to move to the circular cylinder, made of steel A588 diameter of 3.2 m with a height of 700 mm 6 mm thickness, with 27.7° angel, taken from the upper part of the solid discharge. (See FIGS. 18 and 19)

Circular Cylinder 16 or Small Cylindrical Section 16

The circular cylinder 16 also referred to as the small cylindrical section 16 allows discharge of solids having less than 47% humidity to be suctioned by positive displacement pumps or lobes.

Solids Discharge Pipe 17

Solids discharge pipe allows output of dehydrated solids for final disposal; the material is SCH 80.

Positive Displacement Pumps 18

Figure 21:
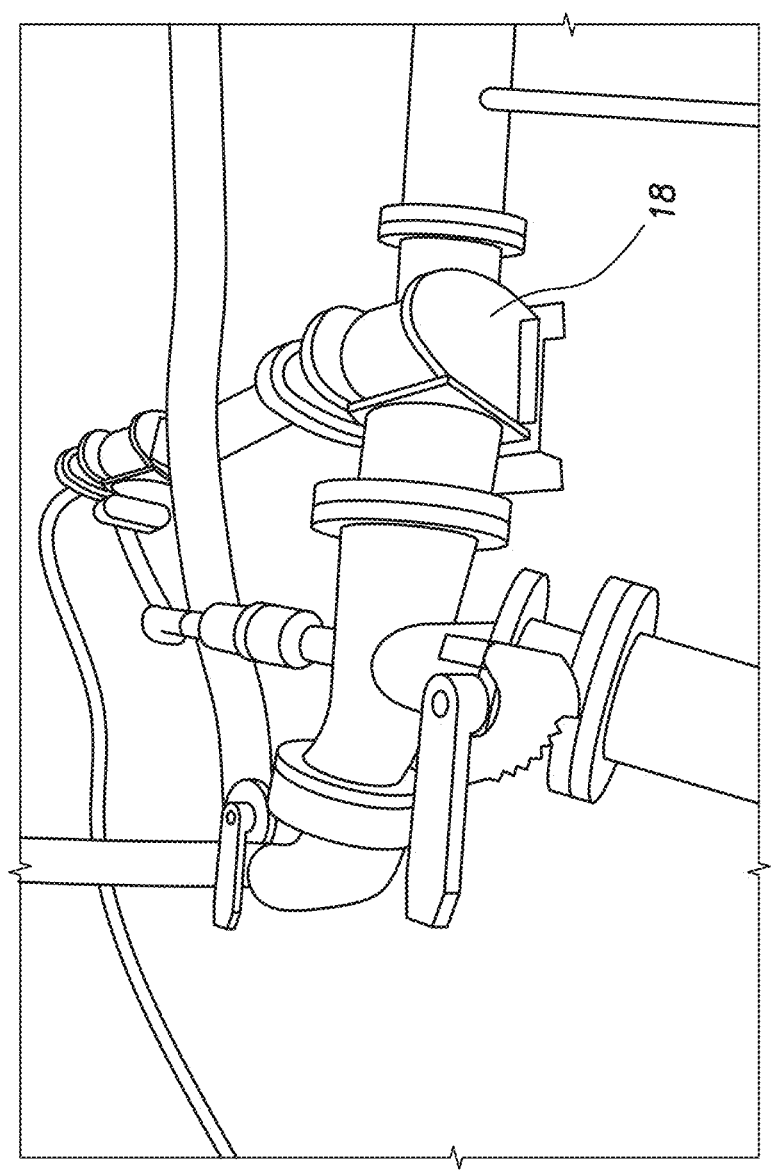
FIG. 21 shows two positive displacement pumps (75 and 15 HP respectively).

Positive Displacement Pumps 18 evacuate solids. In this aspect, there was a pump 18 of higher potency for chamber use, and another of less potency as contingency for maintenance. The chamber uses 1 Borguer 75 HP pump in which the curve is attached. The pump 28 with less capacity to discharge flocs coming from vertical flocculators and send to the core dehydrator. (See FIG. 21)

Water Well Transporter 19 (Also Referred to as Water Transport Chambers)

In this aspect, three water transport chambers are constructed in ASTM A36 steel were used in this example; in which interior there are small deflector plaques, inclined at 70 degrees and large deflector plaques inclined at 70 degrees the fluid containing flocs, which flow is laminar is moved horizontally, with linear speeds of less than 0.3 m/s. The fluid is uniformly distributed in three water well transporters (water transport chambers) and overflows through the collector and distributor channel. (See FIG. 22).

Collector and Distributor Water Channel 20

The collector and distributor water channel (also referred to as the gatherer and distributor water channel) collects overflow fluid from the transport water chambers 19 which contain the deflector plaques 6, 7, and overflow travel to the same. As its name indicates, the channel 20 allows distribution of water through the operation of a plurality of butterfly valves. In this aspect, eight-inch valves were used. One valve recirculates water to improve water quality.

Figure 23A:
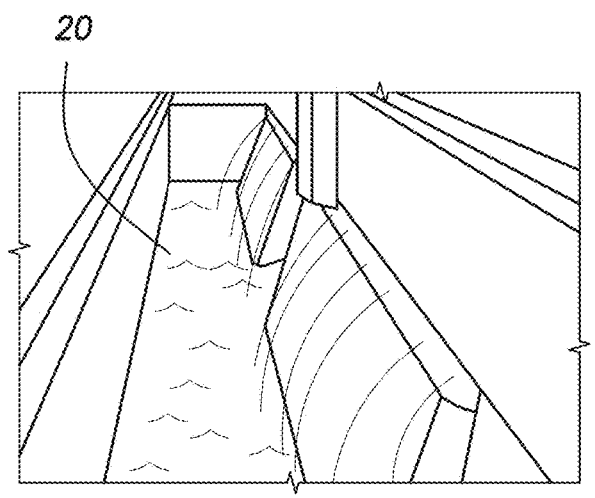
FIGS. 23A, 23B, and 23C are the gatherer and distribution water channel that transports water to both the vertical flocculators and the tanks described in FIG. 22.
Figure 23B:
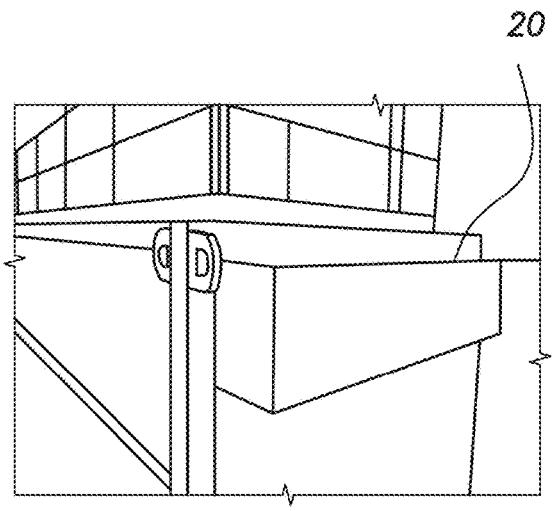
Figure 23C:
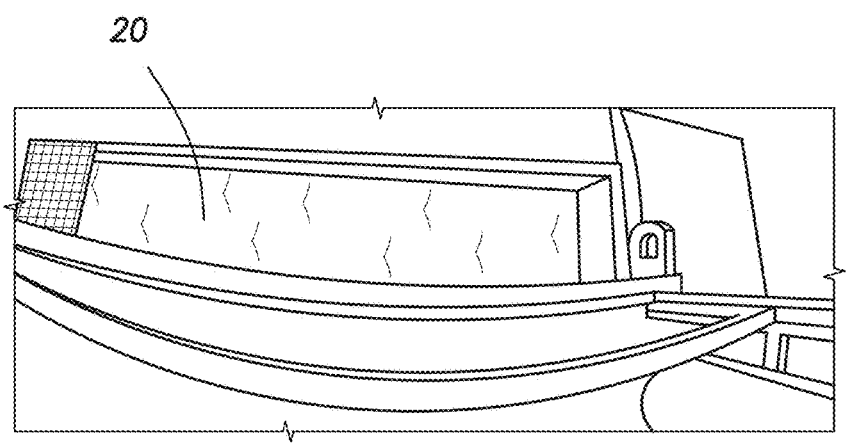

Another valve is used for water discharge to evacuate to a drilling system (See FIG. 23).

Water Discharge Valve 22a to Improve Water Quality

An ANSI 150 valve 22a was used to recirculate water, improve water quality, passing through the vertical flocculators. (See FIG. 24).

Water Discharge Valve 22b to Evacuate Drilling System

A water discharge valve 22b to evacuate the active drilling system. The water can be used for drilling the first few feet of an oil well (first section) and when there are problems in the continuity of drilling (second section). (See FIG. 25).

Suction Pipes 23 for Rapid Discharge to Clean the DNT

Figure 26:
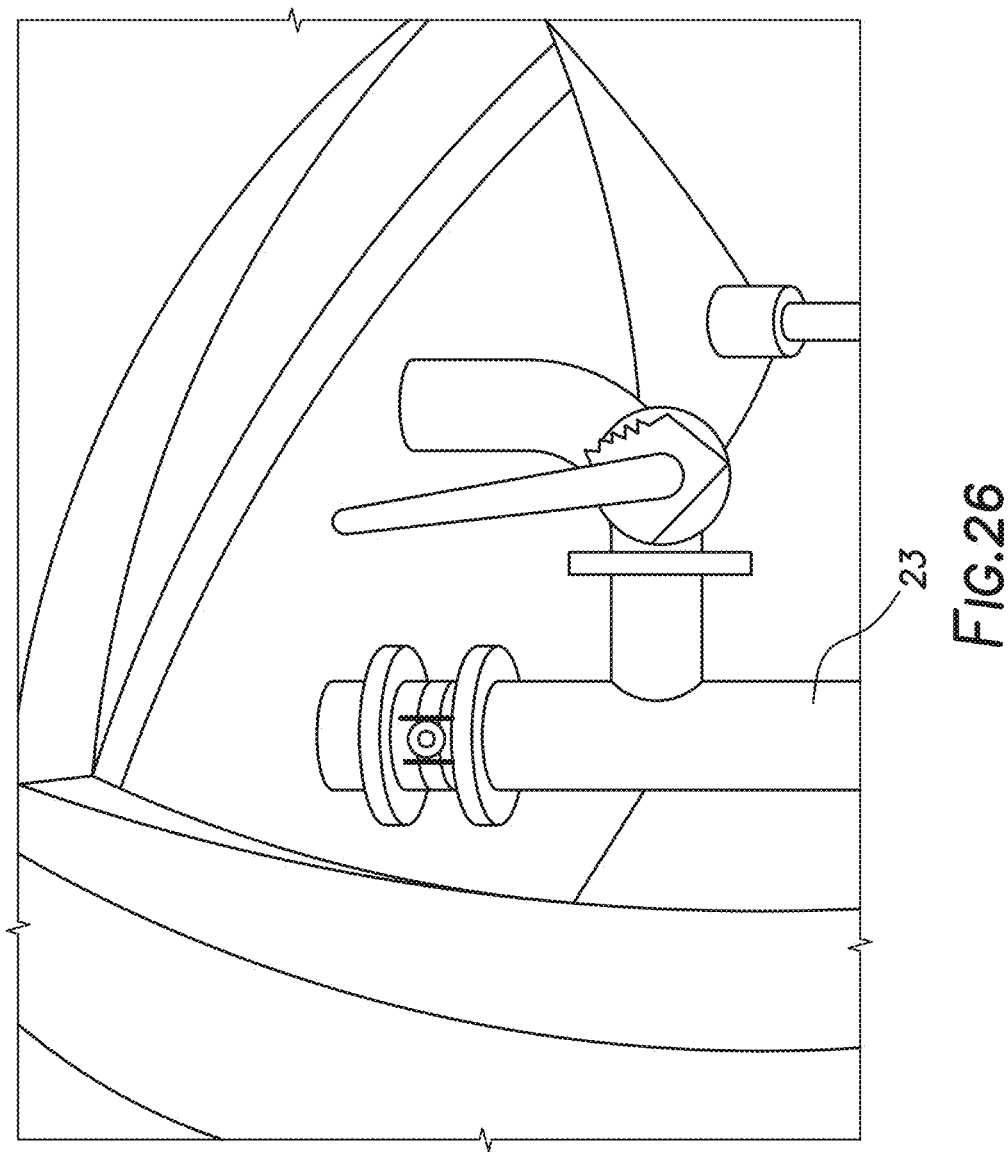
FIG. 26 shows the suction pipe for discharge of solids and to clean dehydrator.
Figure 27:
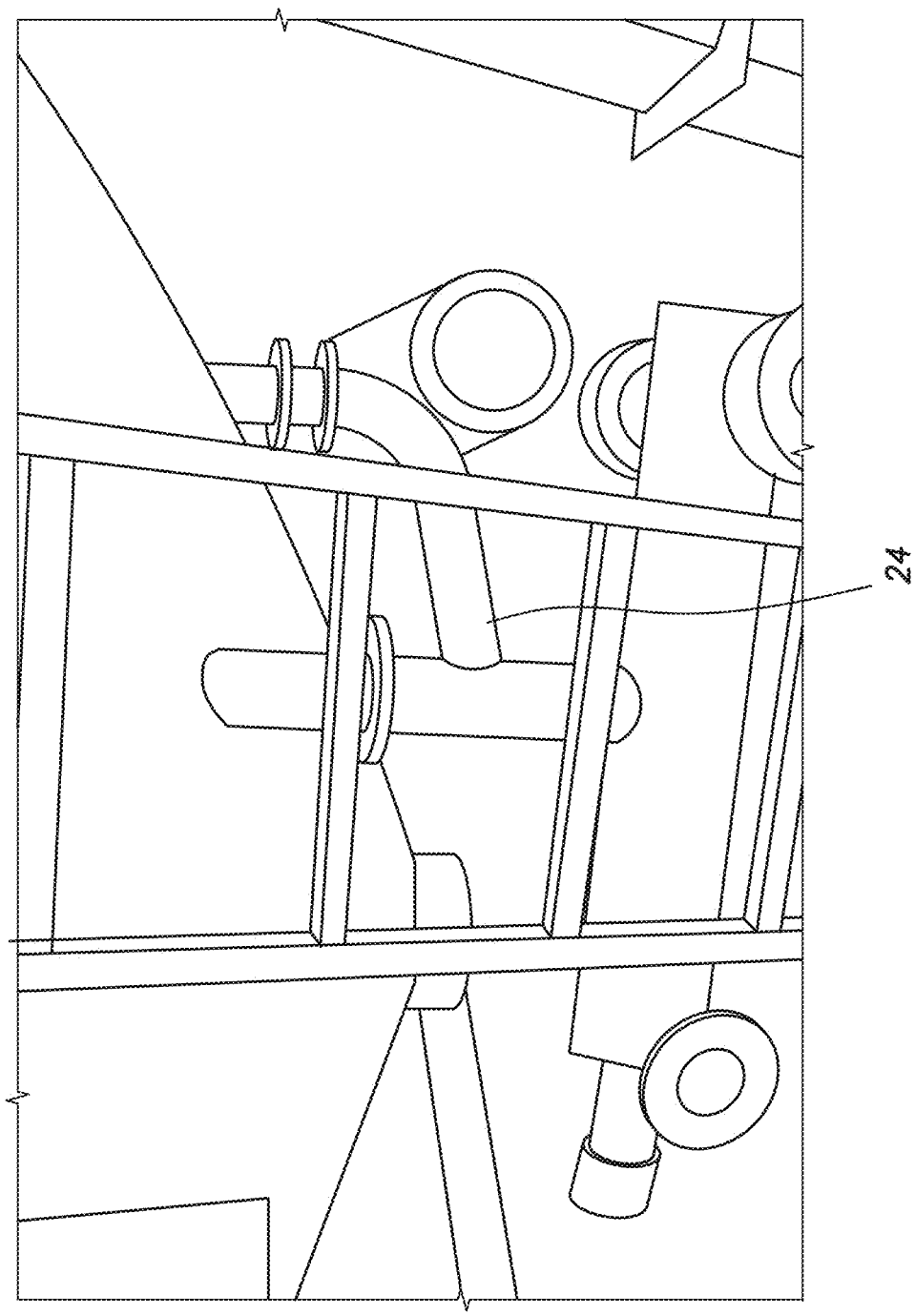
FIG. 27 show the water distribution manifold used in the drag solid transition zone (from rectangular to circular cone) when the operation required removal of solids stuck to the walls and/or to clean solid discharge pipe(s).

Suction pipes 23 allow for cleaning and removal of waste solids from the dehydration system. In an aspect, a first pipe 23a was located ½ h1 from the rectangular cube of the dehydration system. In order to evacuate quickly, 50% of the volume of clean water that is in the rectangular cube. A second pipe 23b is 10 cm above the Drag Solid Transition Zone 14 to move and remove the other 50% of the volume of the cube containing turbid water with traces of micro flocs. (FIG. 26).

A Plurality of Jets 25 for Solids Removal (Solid Removal Jets 25)

Figure 28:
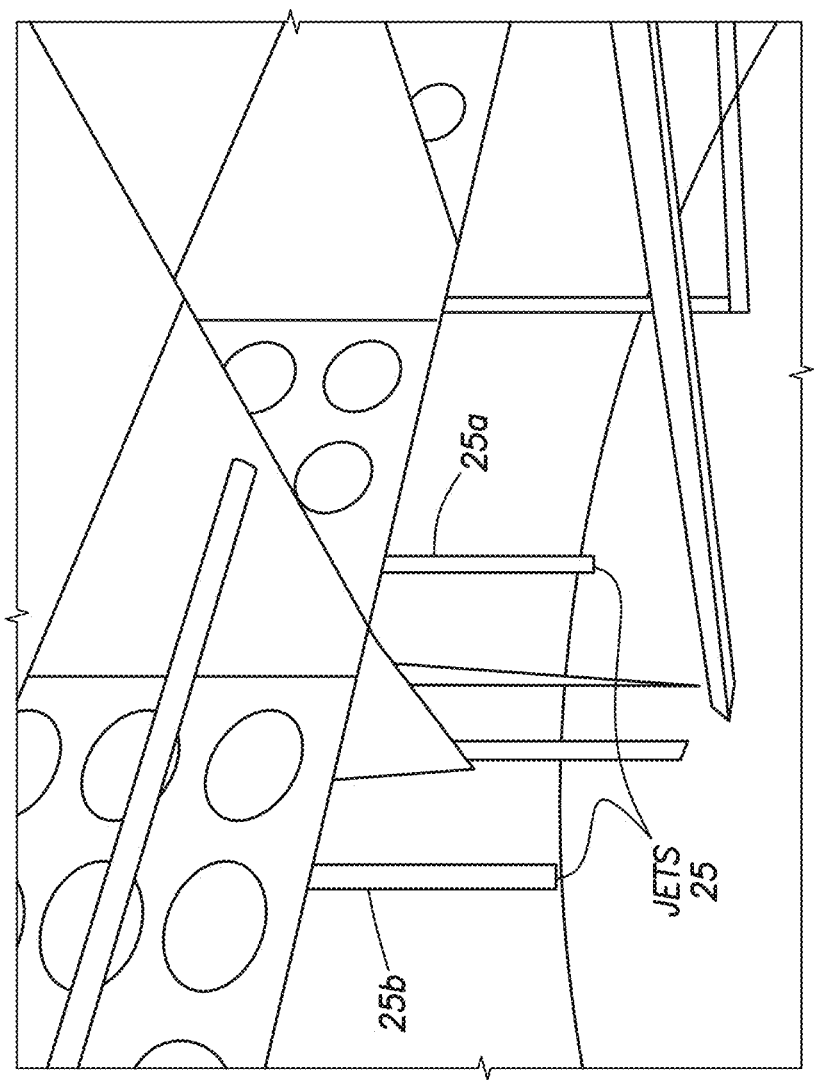
FIG. 28 shows the jets for removal of solids that stick to the walls.

The jets 25 remove solids found in the transition zone 14 from rectangular to circular. (See FIG. 28).

Skid 26

Figure 29:
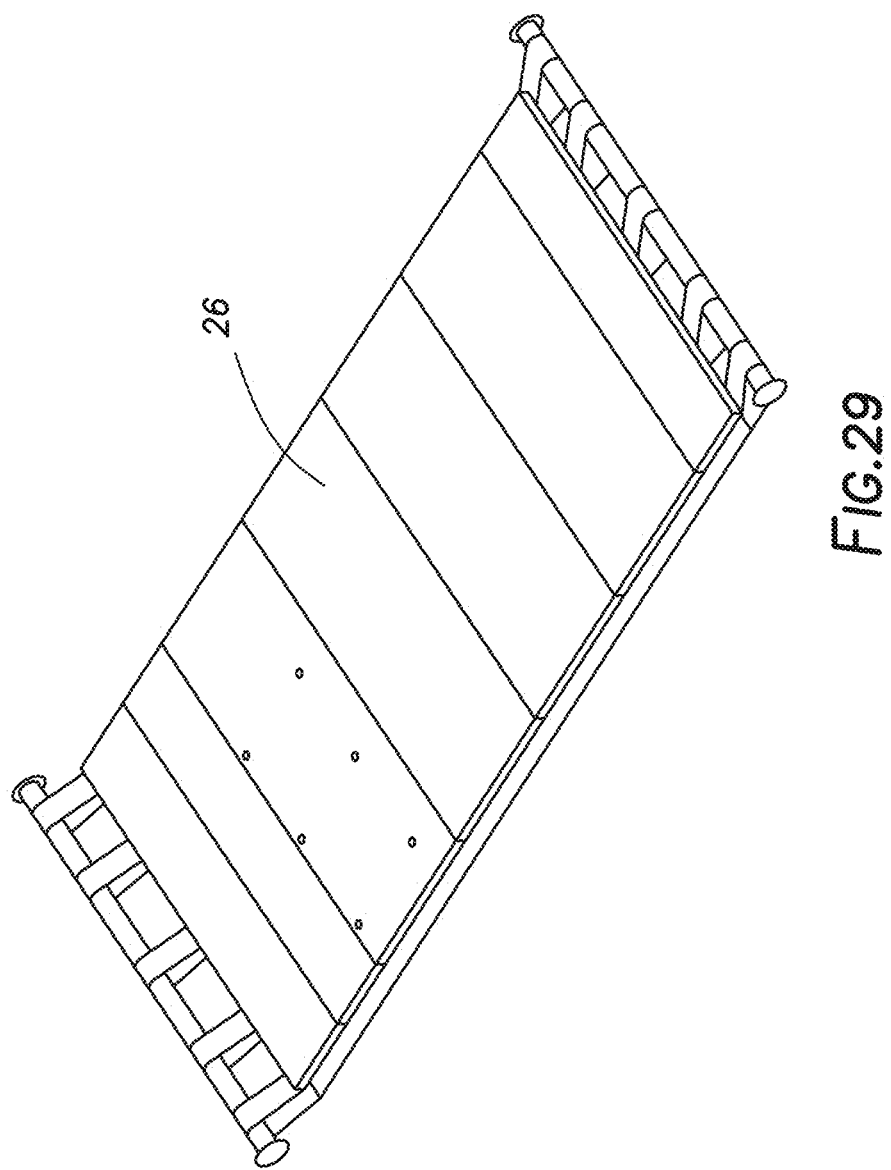
FIG. 29 depicts the skid to be lifted by a winch and to avoid the need for a crane.

In an aspect, the skid 26 supported 60 tons distributed: 30 tons in the central part and 15 Tons at each end. The skid 26 made up of five beams, eight crossbeams HEB 200 mm, round tube diameter 6" SCH 80 for skid puller, cover for platform 10 mm thick, steel 505, weight of 4200 Kg skid structure distributed (See FIG. 29).

Solids Discharge Pipe 29

Figure 32A:
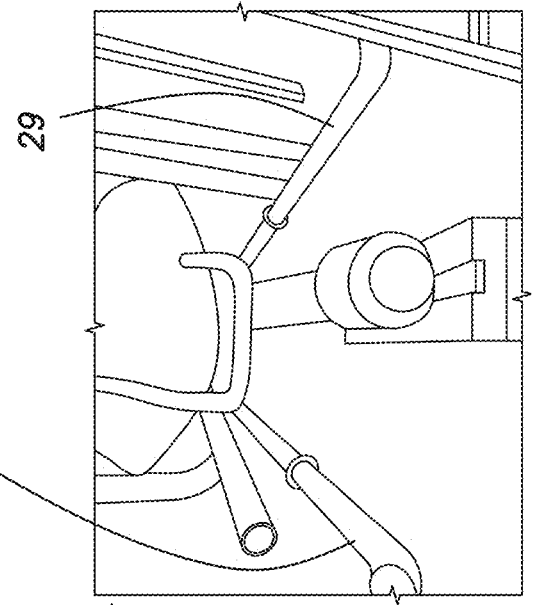
FIGS. 32A, 32B and 32C show discharge pipes simultaneously discharging solids with the positive displacement pump lobes.
Figure 32B:
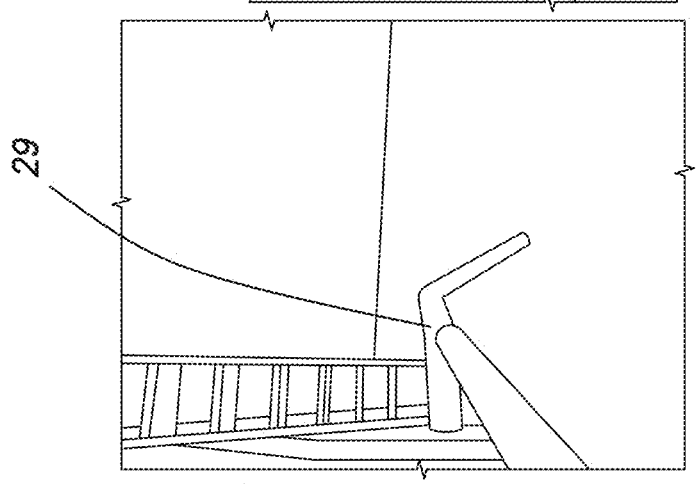
Figure 32C:
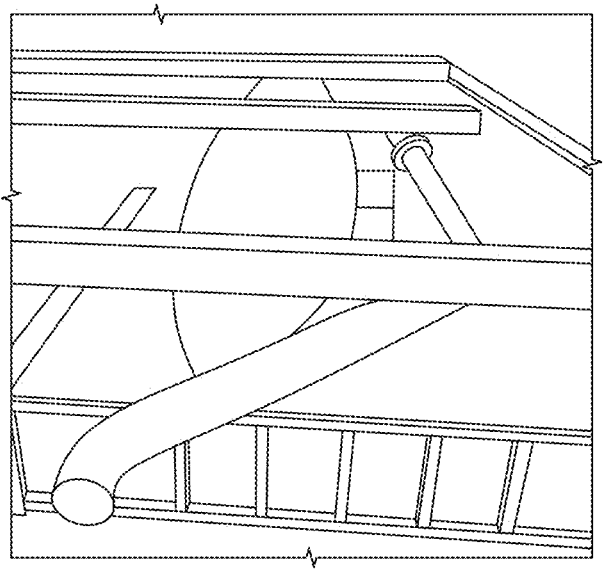

In an aspect, the pipe for solids discharge (solid discharge pipe 29) is made in SCH 80 to discharge solids, final product of dehydration. (See FIG. 32).

Emergency Exit 30

Figure 48:
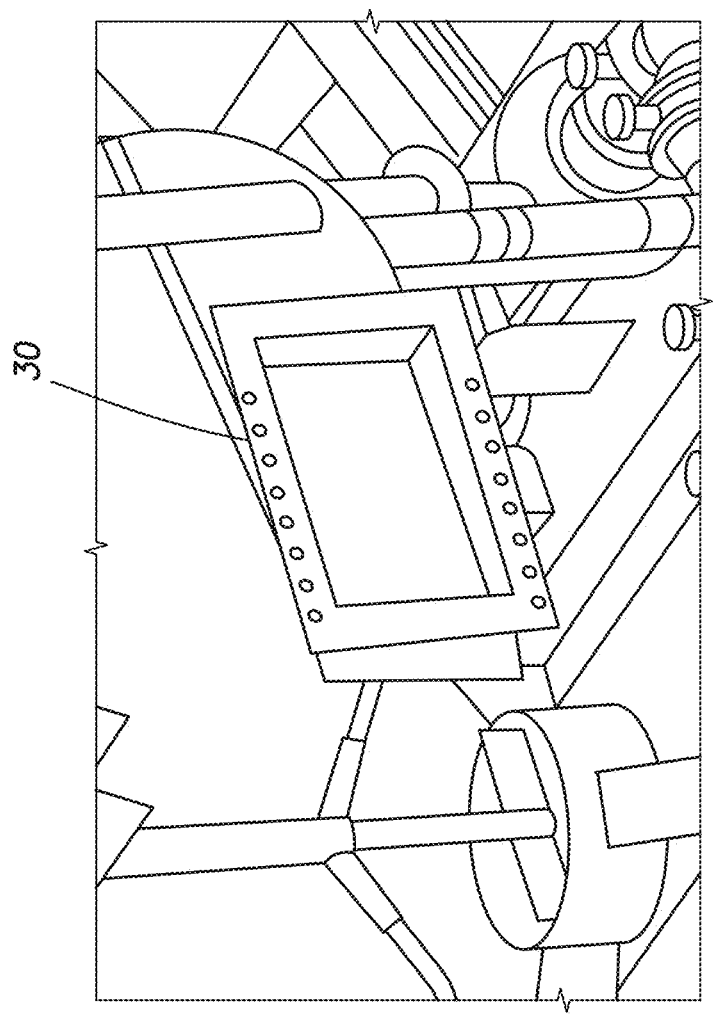
FIG. 48 shows an aspect of the emergency exit of the dehydrator system described herein.

An emergency exit 30 for personnel can be designed if required (See FIG. 48)

Supplementary Equipment

In addition to a core dehydrator, the dehydrator system 100 includes supplementary equipment comprising the mixing unit where chemicals and flocculant polymers are mixed to obtain a homogeneous mixture. In the mixing unit, the homogeneous mixture be can further mixed with the polymer solution and drilling fluids from oil wells. The mixing unit includes the following:

Flocculators Chambers 32

Figure 33:
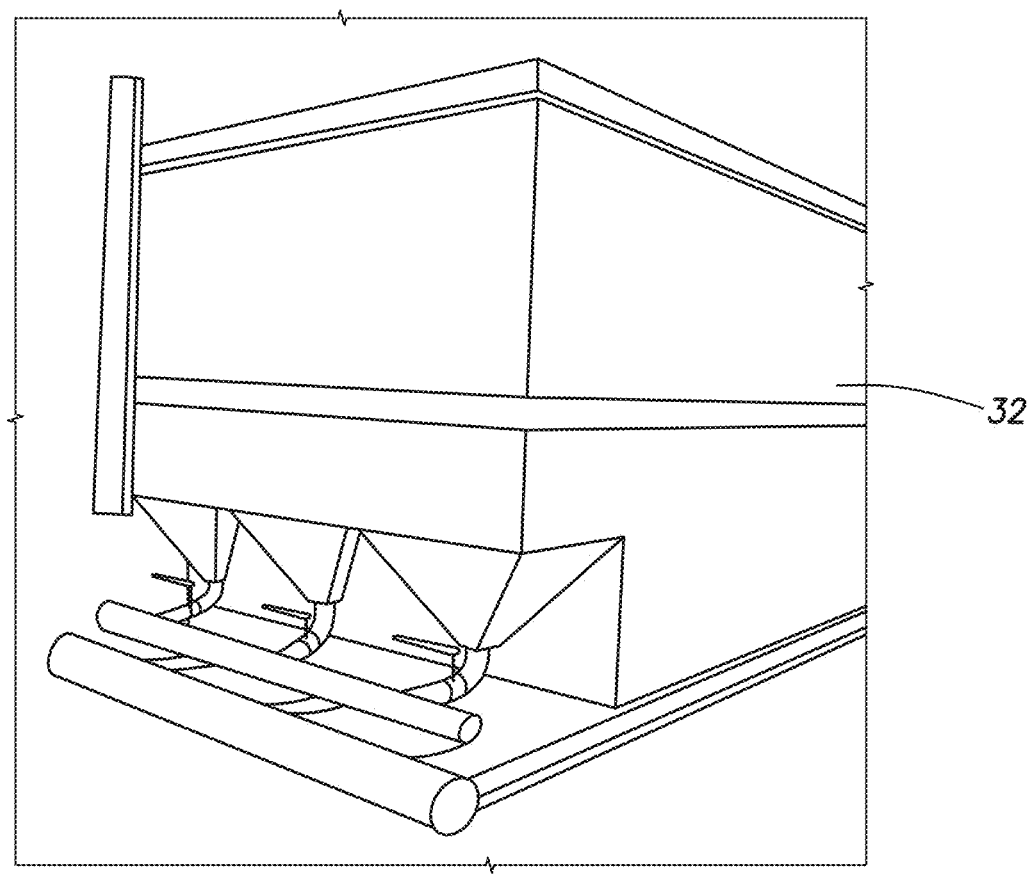
FIG. 33 shows the flocculate chamber having valves to discharge the floccules and re-use in a mixture with polymers.

In this example, there are three flocculator chambers. The material in which it is built is naval steel; the travel speed is less than 0.1 m/s, helping to aggregate the micro-floccules ("micro-flocs" or "microflocs") in larger flocs, and at the same time serves as an API trap to remove traces of crude; the sediment flocs are suctioned by the small positive displacement 15 HP pump, and returned to the dehydration process. The clear water passes to the collector tank. (See FIG. 33).

Water Collector Tank 33

Figure 34:
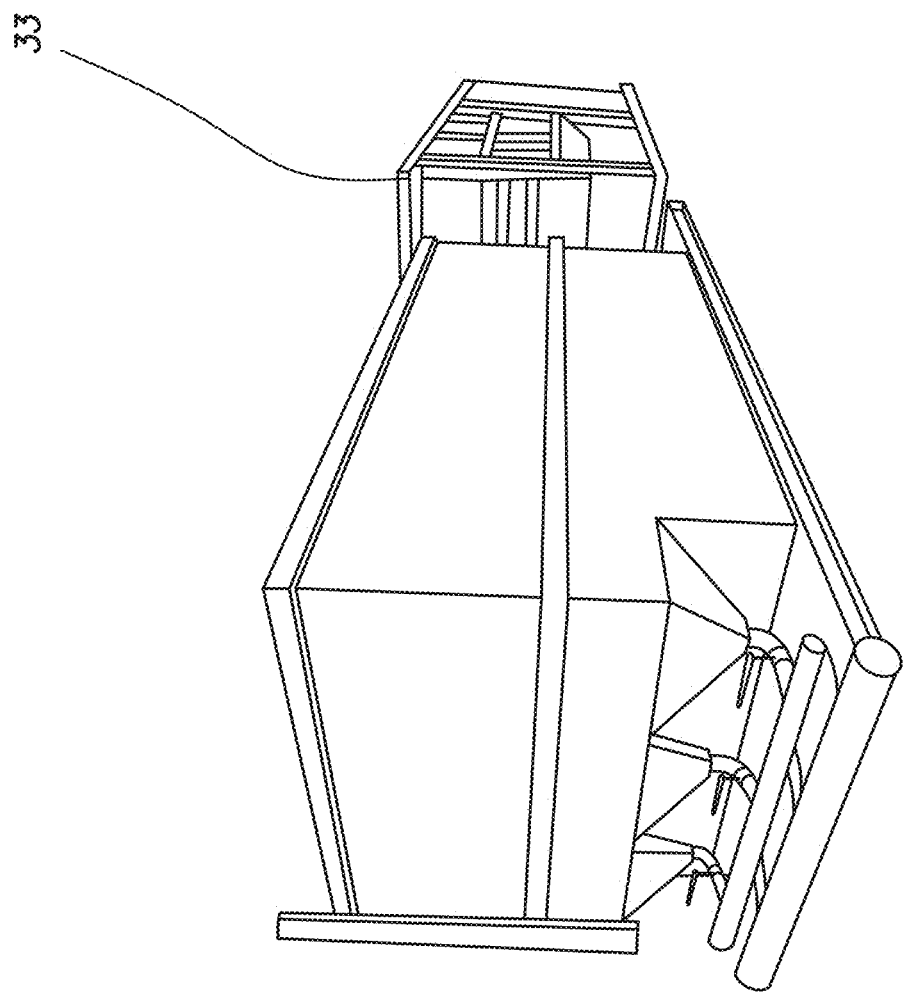
FIG. 34 shows the water collector tanks with same volume as the stir tank.

In the water collector tank 33, a polymer solution can be prepared or stored. A centrifuge pump of 4×3×13 having 25 HP engine and impeller of 10.5" or a 5×5×14 pump was used in an aspect. (See FIG. 34)

Polymer Dissolver Tanks or Stir Tanks 34

Figure 35:
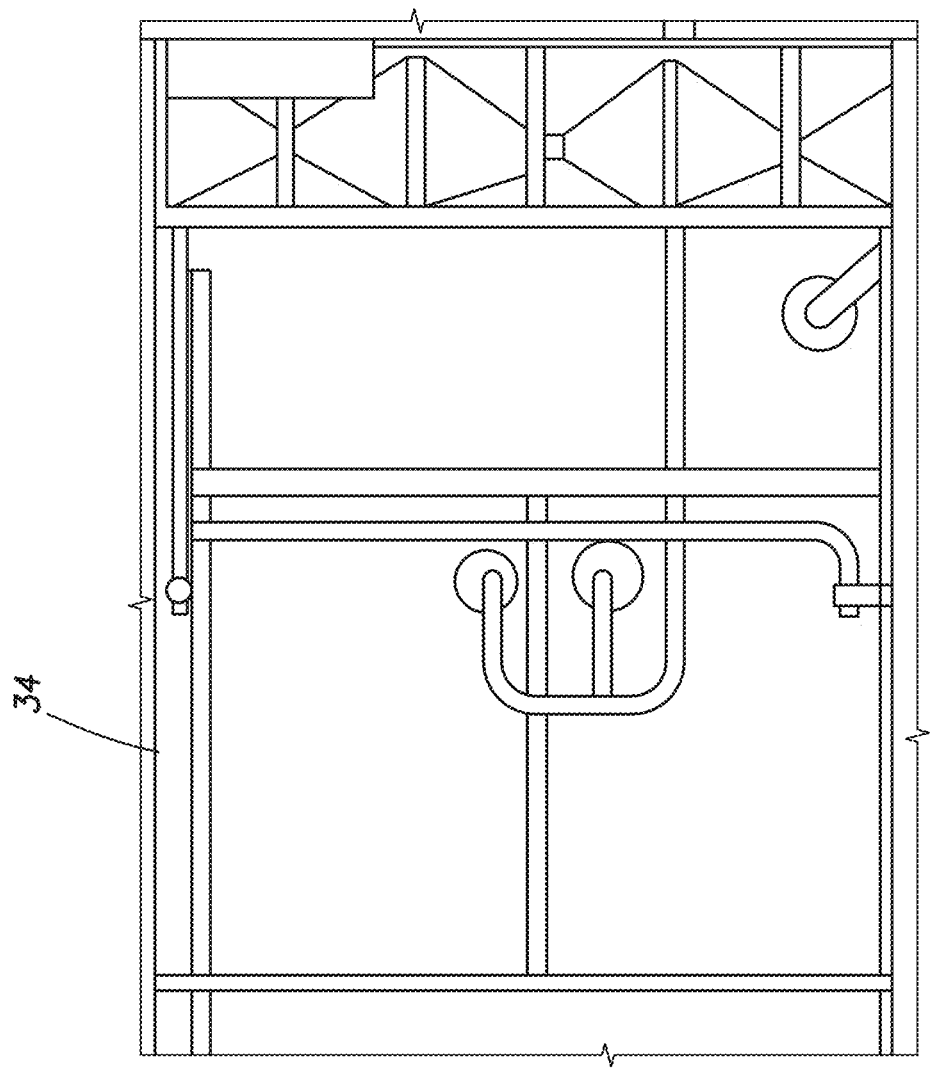
FIG. 35 depicts the stir tanks, each with its own inclined palettes of axial flow and four generators.
Figure 38:
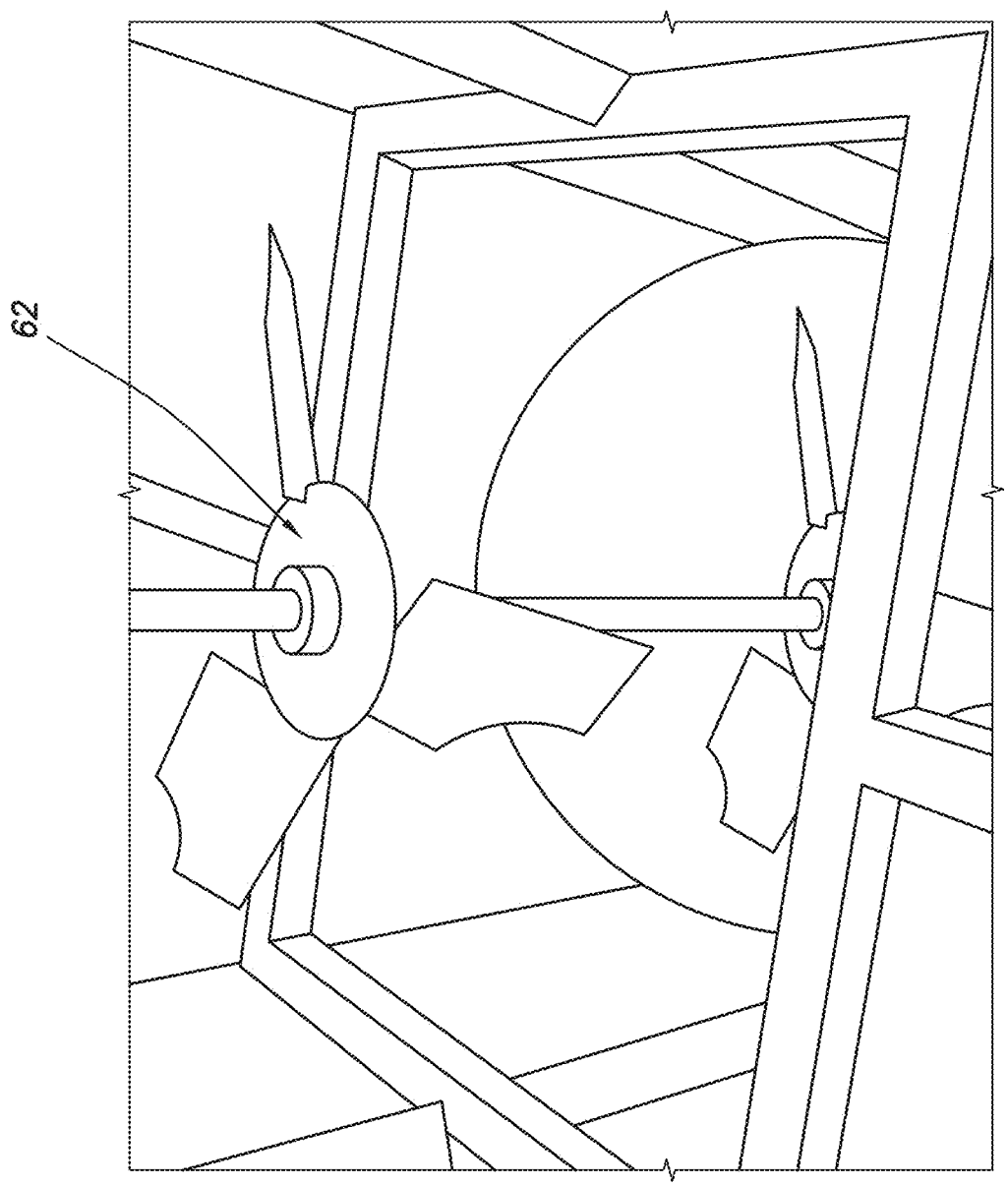
FIG. 38 shows the double palette shaker within the mixing unit that creates axil flow and increases turbulence in order to dissolve the flocculant.
Figure 39:
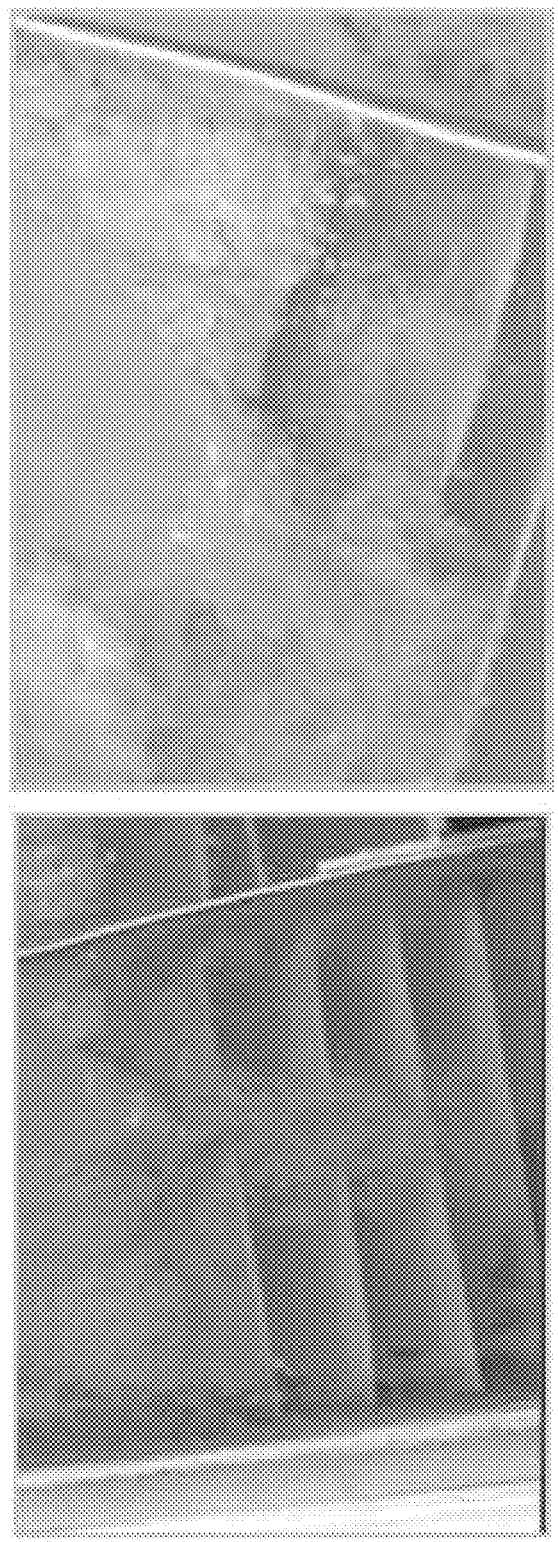
FIGS. 39A and 39B are a top view of the micro-swirls produced between deflector plaques that help precipitation of floccules and flow to circular cone.
Figure 40:
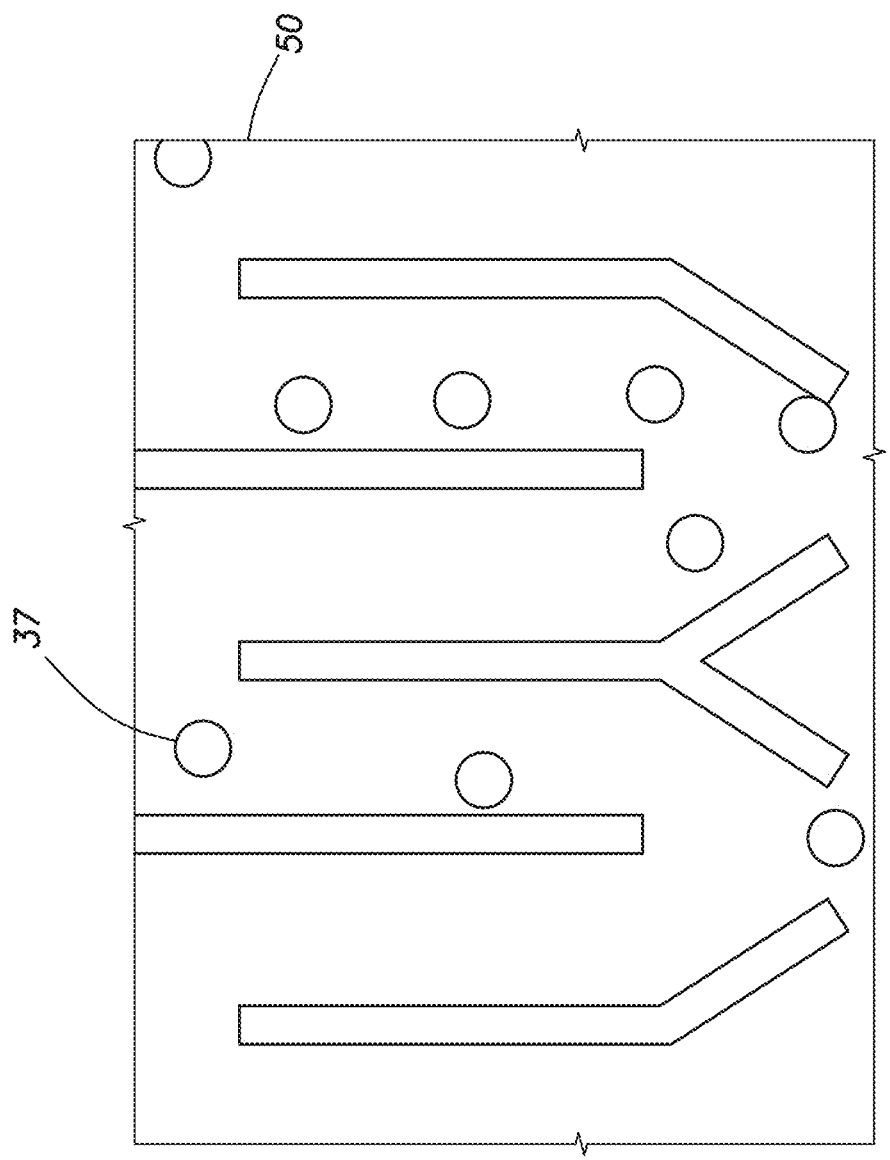
FIG. 40 is a depiction of the vertical flocculators located in the mixing unit to achieve a linear but minor speed.
Figure 41:
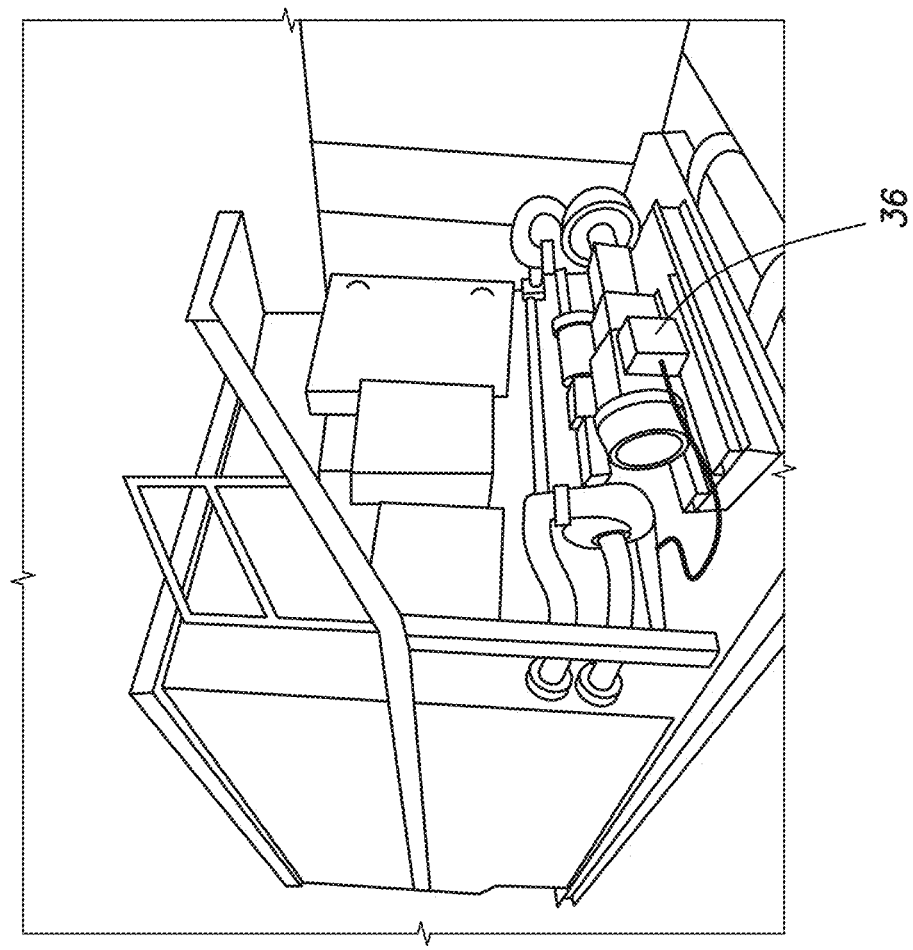
FIG. 41 is yet another depiction of the centrifugal pumps.
Figure 42:
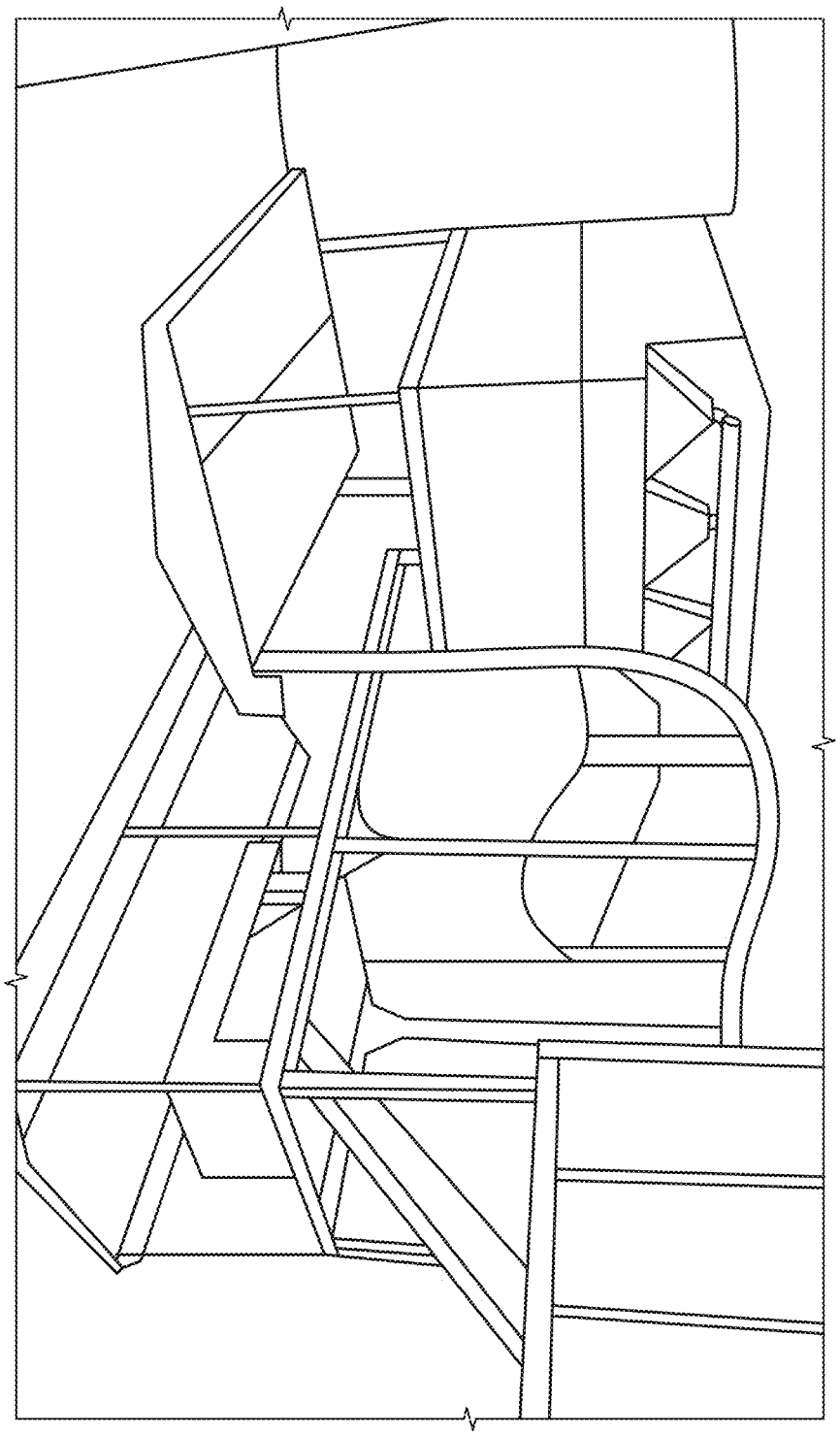
FIG. 42 shows the dehydrator on a centrifuge stand to place the centrifuge pumps.
Figure 43:
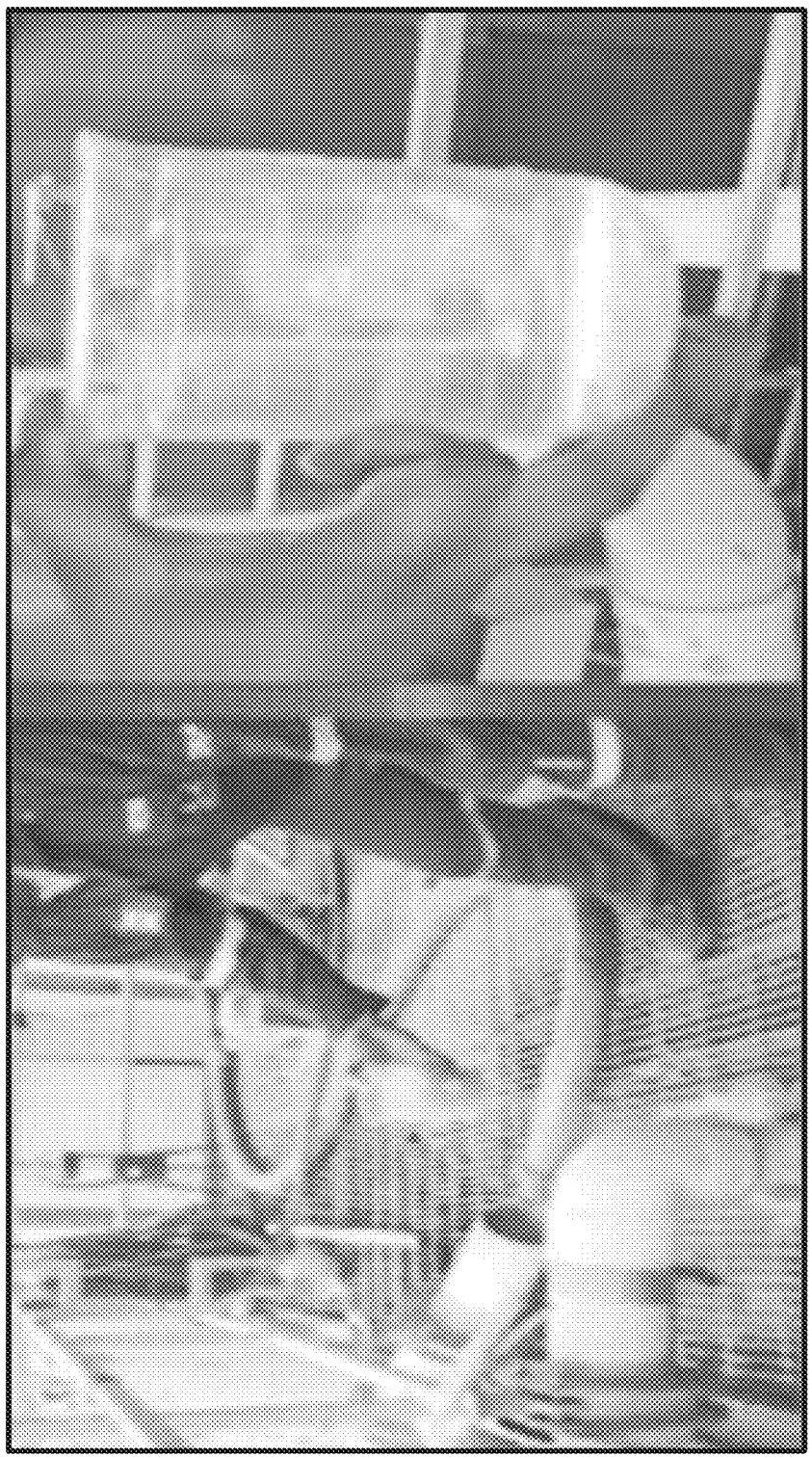
FIG. 43 is a picture comparing the differences of water after being treated on a conventional centrifugal decanter (suspended solids of 300 to 550 ppm) and in the present dehydrator system where suspended solids are about 20 ppm.
Figure 44A:
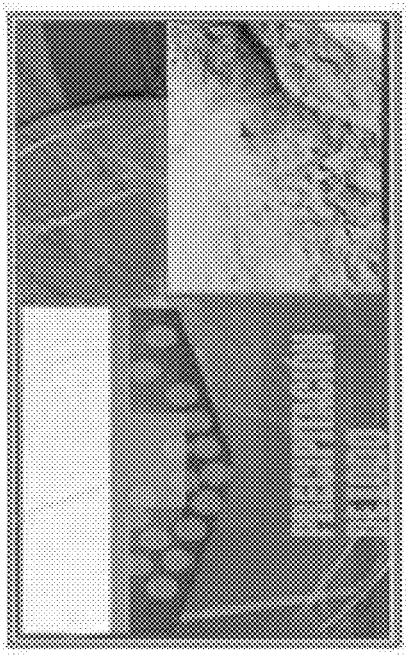
FIGS. 44A, 44B, 44C and 44D show different solids discharges.
Figure 44B:
Figure 44C:
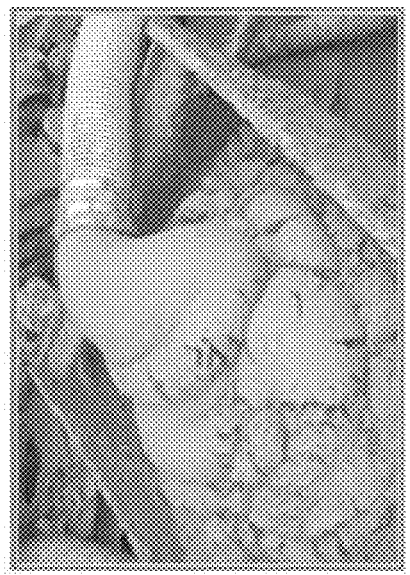
Figure 44D:
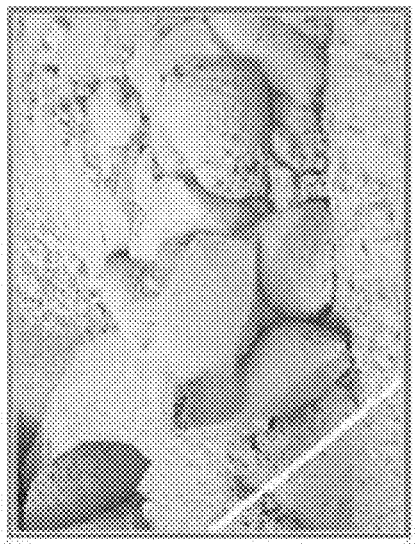
Figure 45A:
FIGS. 45A and 45B shows the solids discharges from the dehydrator system described in Example 1.
Figure 45B:
Figure 46:
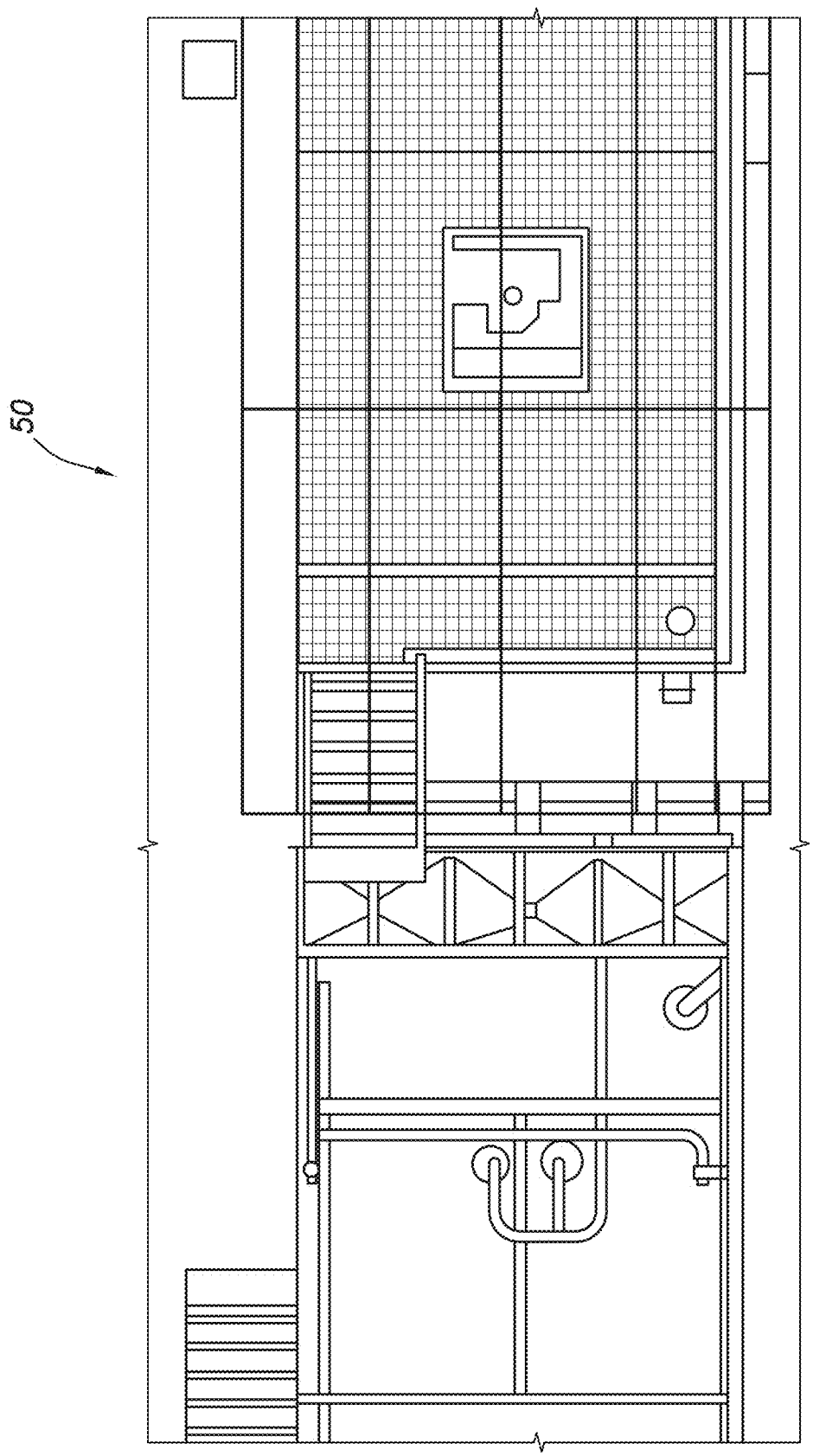
FIG. 46 shows a top view of the mixing unit where water flows through the gatherer and distributor water channel to the vertical flocculators and then to the water collector tank.

Each stir tank 34 has an agitator double palette axial fluid and four whirlpool generators. In an aspect, two stir tanks 34 for dissolving polymers were used; each one would have a double palette agitator (3 wings placed al 120° each) (See FIG. 38), with a 55 HP engine at 88 rpm. The residence time to dissolve the polymer would be from 20 to 35 minutes; to send the polymer solution to the fast mix manifold, a centrifuge pump 4×3×3 with a 25 HP engine, is needed. (See FIG. 35)

Mud Conditioner Tank 35, with its Respective Double Palette Agitator

Figure 36:
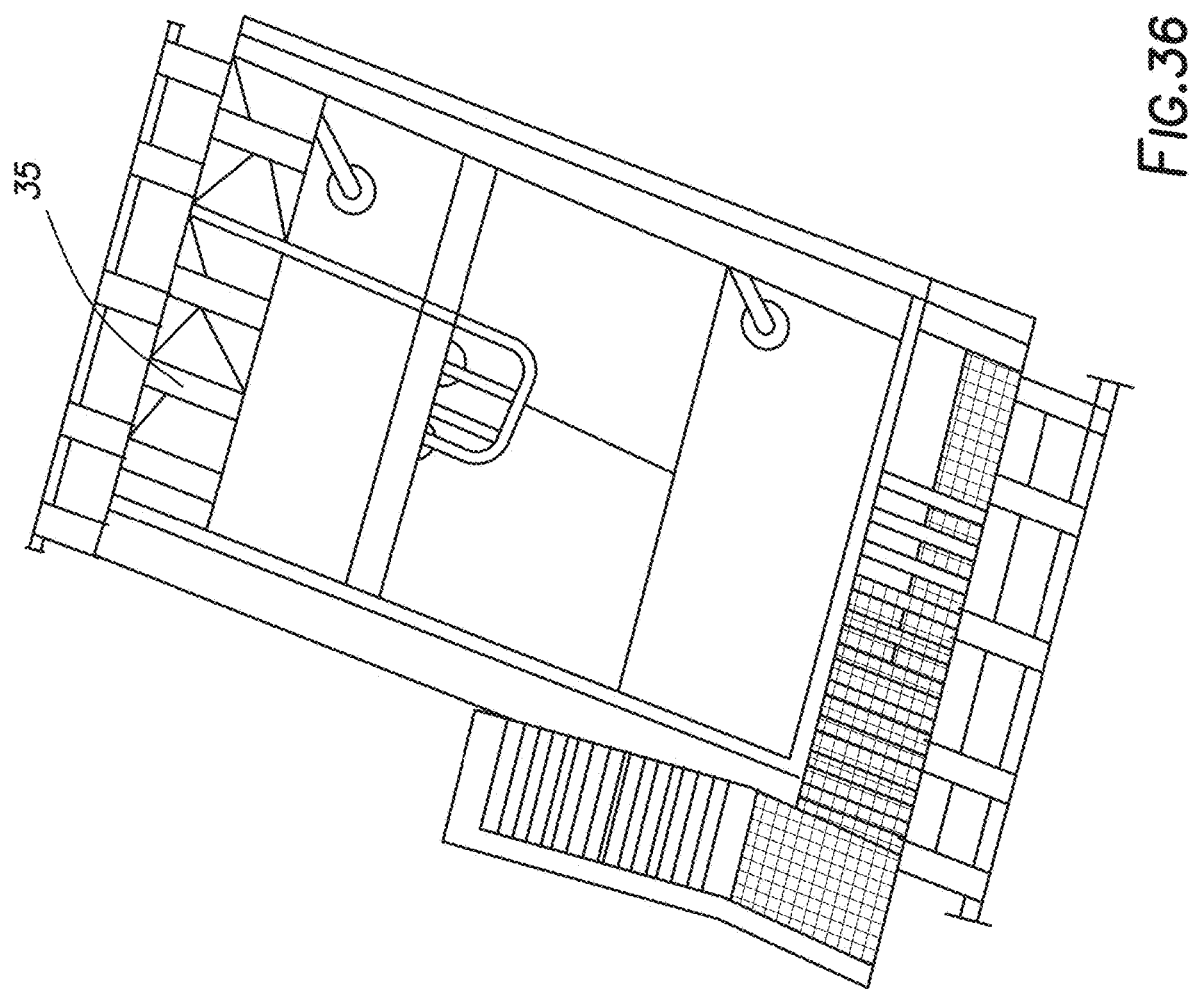
FIG. 36 shows the mud conditioning tank with its own shakers.

The mud conditioner tank 35 homogenizes drilling fluids (mud), regulates pH, and coagulates particles. The tank 35 comprises a double palette agitator (3 wings placed at 120° each) (See FIG. 38), with a 10 HP engine, at 88 rpm. Out of this tank 35, mud is sent to the rapid mixing manifold 1 where mud mixes with the polymer solution. For this purpose, a centrifuged pump can be used. (See FIG. 36)

Centrifuge Pumps 36

Figure 37:
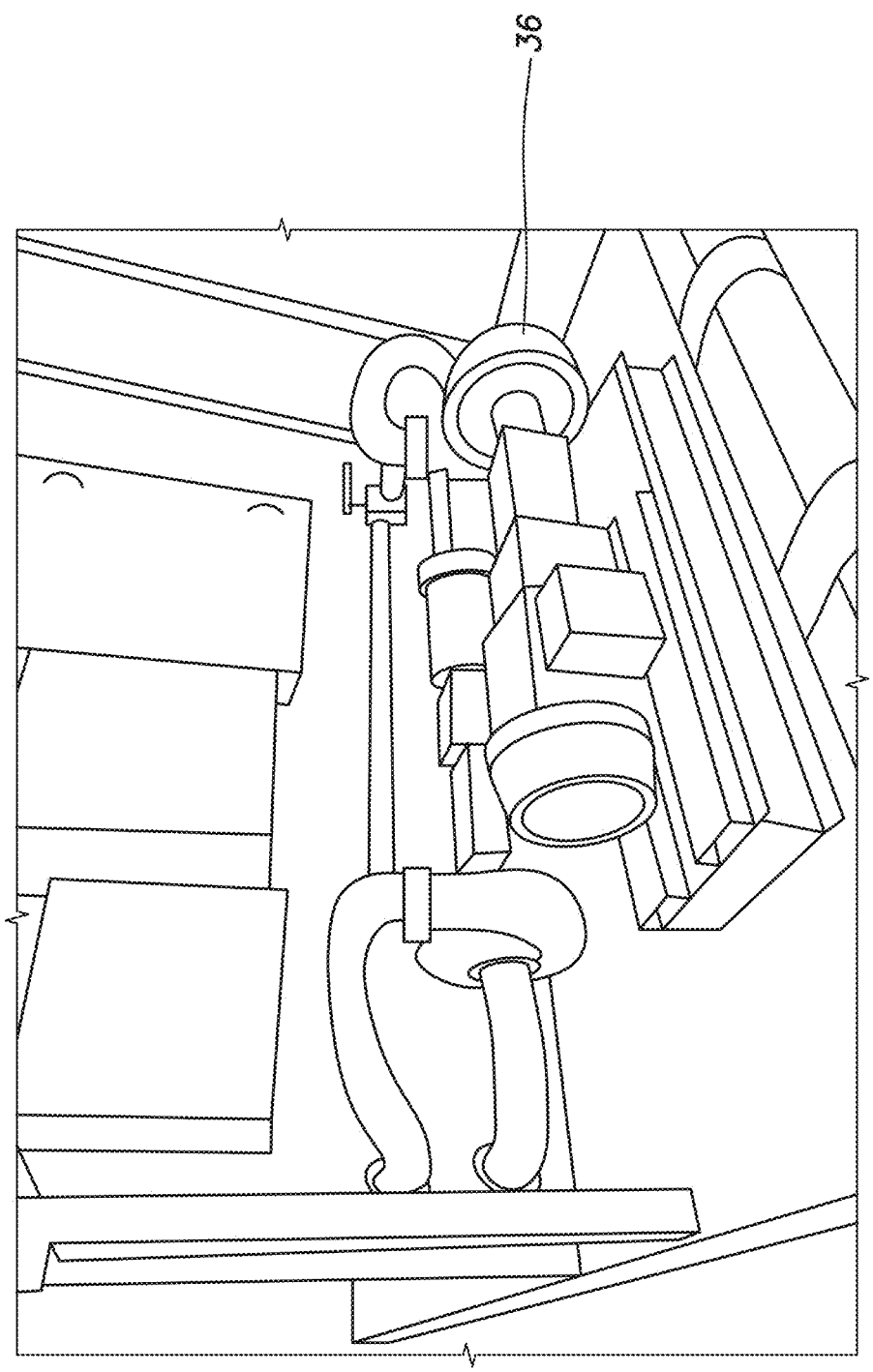
FIG. 37 shows the centrifuge pumps.

In an aspect, centrifuges pumps 36 are 4×3×13 with a 25 HP engine and 10.5" diameter. These pumps 36 allow transportation of mud flow or the polymer solution. (See FIG. 37).

Figure 5:
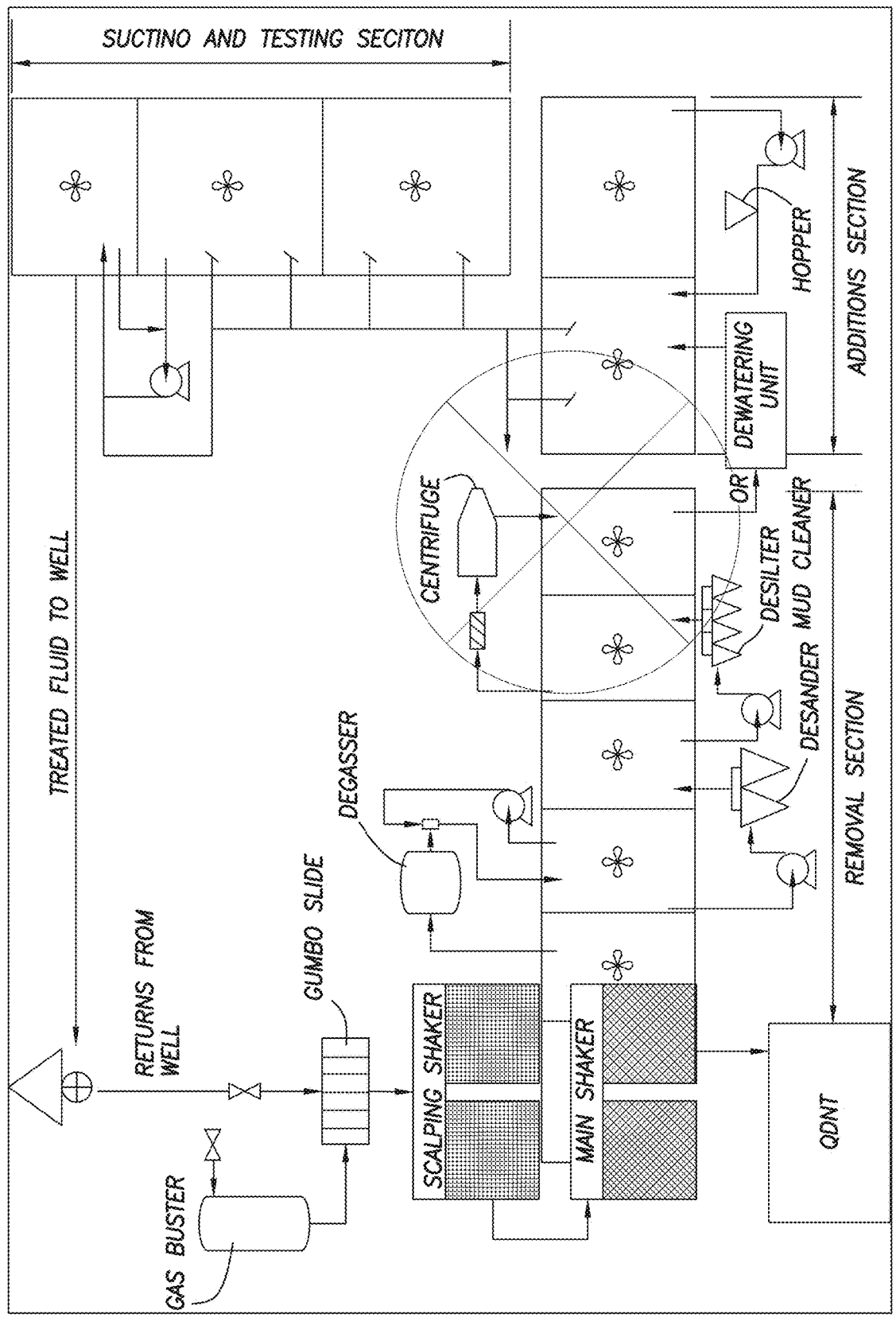
FIG. 5 is a layout of the dehydrator system as used on a drilling platform.

The present dehydration system dehydrates perforation flow (mud) having densities from about 8.6 to 12.5 lb/gl to obtain a liquid discharge (water) and solid (cuts). The products resulting by use of the dehydration system 100 can be forwarded to the active system or to water treatment tanks. (See FIG. 5). The present dehydration systems include the rapid mixing manifold having a plurality of inlet deflectors, where the drilling fluid (mud) and the solution of flocculant polymer is mixed. In this way, entering the core dehydrator, the drilling fluid is already flocculated. Through the first compartment, due to its shape, it allows to have a turbulent flow regime for better agitation and mixing of mud polymer. Subsequently, the fluid passes through circular holes in the turbulent flow transition zone (zone transition from turbulent flow to laminar flow) to the chamber where solids settle within the chambers having both small deflectors and large positioned at angles greater than 60 degrees and less than 90 degrees (for example 70 degrees has been shown to work well) by distribution, allowing laminar flow for proper sedimentation and clumping of heavier particles such as sand, clay and waste. As a result of this processing, water free of particles at the top and suspended solids vary according to each operation, but between about a range of 1 to 500 mg/L and the bottom solids with humidity lower than 50 percent, for example 47%.

Calculation of Drilling Fluids and Waste Inflow from Perforation Process for Positive Displacement Pump For calculation purposes, the following information was considered:

Total fluid flow of the system 100 is approximately twelve hundred gallons per minute (1200 gpm) of mud plus polymer solution. Solids generated can be transported by the larger capacity Borguer pump.

Calculation a Drop of 300 ft/hour, 16" Diameter and a 20% WS was Considered to Calculate Flow and Mass Flow $$V = \frac{3.1416 * D2}{4} * h$$

$$V = 1423\, m3 * \frac{6.28\, \text{bbls}}{1 m3} * \frac{42\, \text{gl}}{1\, \text{bbl}} = 3753\, \text{gl}$$

$$Q = \frac{V}{t}$$

$$Q = \frac{3753\, \text{gl}}{60\, \text{min}} = 62.6\, \text{gl/min}$$

Solids Generated by the Bit $$\text{CAPACITY} = \frac{0.98\, \text{bbl}}{300\, \text{ft}} * 0.0033 \frac{\text{bl}}{\text{ft}} = 1.71\, \text{L/m}$$

$$\frac{300\, \text{ft}}{h} = \frac{91.44\, m}{h}$$

$$\text{SOLIDS DENSITY} = 21.66 \frac{\text{LB}}{\text{GL}}$$

$$FLUJOMASICO = \frac{1.71\, L}{M} * \frac{91.44\, M}{H} * \frac{1\, \text{GL}}{3.7858} * \frac{21.66\, \text{LB}}{\text{GL}} * \frac{1\, \text{KG}}{2.2\, \text{LB}} =$$

$$404\, \text{KG} \,(50\%\, \text{humidity}) = 202\, \text{kg/h}$$

Additional Equipment

A Borger pump model FL 518 of 75 HP is used to evacuate solids of the sieves and of the mud conditioner, towards the cuttings pool (graph 28/31 and 29/31)

Drilling Cuts Management

Waste and cuttings produced by the DNT would be driven by two positive displacement pumps; they would be distributed throughout the pool since transport would be done on a 6" pipe that will be extended around the pool perimeter. One of the benefits is that conditioner cuttings are transported to the conical pocket shakers by a worm screw and from there they are collected and transported along the pool (graph 30/31 and 31/31).

Wastewater Management

Wastewater obtained from the DNT will recirculate through a closed circuit to the active system of tanks of the perforation drill and when it is no longer reused is will be sent to the Water Treatment System to be conditioned to comply with Environmental Law, for subsequent discharge or injection.

Tests

The results of our testing were partial in the first test well, the results by sections product of the perforation are listed in Table 3 below.

TABLE 3

| Tests for the Dehydrator System | | | | | | | | | | | | |
|---|---|---|---|---|---|---|---|---|---|---|---|---|
| Perforated | | | | | | Suspended Solid (TSS) And Turbidity (NTU) | | Mud Flows* | | Densities and Humidity of the Discharges | | |
| feet | Date | Time | Properties of Mud | | | | | Mud | | Solids or Cuts | | Water |
| Depth | Day/Mo/ | Hour/Min/ | μ | P | Intermediate | Final | | Q(G) | P | Retort A | | P |
| (ft) | Year | sec | cps | Ppg | Mgl | Mgl | NTU | Min | ppg | (ml) | Humidity | ppg |
| 450 | 1 Jun. 2012 | 7:20:00 | 30 | 8.9 | 7.4 | 31 | 31 | 18 | 0 | 0 | | |
| 555 | | 8:45:00 | 30 | 8.9 | 7.4 | 9 | 5 | 4.09 | 18 | 28 | 4.31 | |
| 700 | | 10:17:00 | 30 | 8.9 | 7.4 | 5 | 5 | 2.8 | 11.4 | | | |

TABLE 3-continued

Tests for the Dehydrator System

| Perforated feet Depth (ft) | Date Day/Mo/ Year | Time Hour/Min/ sec | Properties of Mud | | | Suspended Solid (TSS) And Turbidity (NTU) | | Mud Flows* | Densities and Humidity of the Discharges | | Water |
|---|---|---|---|---|---|---|---|---|---|---|---|
| | | | μ cps | P Ppg | Intermediate Mgl | Final Mgl | NTU | Mud Q(G) Min | Solids or Cuts | | |
| | | | | | | | | | Retort A (ml) | Humidity | P ppg |
| 950 | | 13:40:00 | 30 | 8.9 | 7.4 | 2 | 0 | 0.73 | 11.5 | | |
| 1055 | | 15:10:00 | 30 | 8.9 | 7.4 | 2 | 0 | 0.8 | 11.6 | | |
| 1200 | | 16:41:00 | 30 | 8.9 | 7.12 | 4 | 0 | 0.61 | 11.3 | | |
| 1450 | | 20:05:00 | 30 | 9.1 | 7.1 | 2 | 0 | 1.13 | 11.4 | | |
| 2060 | | 2:00:00 | 30 | 9.2 | 7.3 | 1 | 0 | 0.76 | 11.5 | 24.5 | |
| 2535 | | 8:00:00 | 30 | 9.3 | 7.4 | 5 | 0 | 2.77 | 11.7 | | |
| 2750 | | 10:05:00 | 30 | 9.3 | 7.4 | 11 | 1 | 1.59 | 11.5 | 25 | 36.2 | 8.33 |
| 3000 | | 12:30:00 | 30 | 9.3 | 7.4 | 5 | 1 | 1.97 | 11.4 | | |
| 3250 | | 14:05:00 | 30 | 9.3 | 7.4 | 14 | 6 | 4.19 | 11.7 | | |
| 3500 | | 16:18:00 | 30 | 9.5 | 7.4 | 16 | 7 | 2.64 | 11.7 | 27 | 38.4 | 8.33 |
| 3750 | | 19:03:00 | 31 | 9.5 | 7.4 | 12 | 0 | 1.17 | 11.7 | | |
| 4000 | 2 Jun. 2012 | 21:12:00 | 31 | 9.5 | 7.4 | 9 | 0 | 1.02 | 11.5 | | |
| 4600 | | 2:00:00 | 32 | 9.7 | 7.4 | 6 | 5 | 4.12 | 11.7 | | |
| 4989 | | 18:00:00 | 30 | 9.8 | 7.23 | 4 | 4 | 4.12 | 11.6 | 33 | 47.3 | 8.33 |
| 5200 | | 20:00:00 | 30 | 9.8 | 7.25 | 5 | 3 | 5.1 | 11.6 | | |
| 5550 | 3 Jun. 2012 | 23:10:00 | 31 | 9.8 | 7.31 | 7 | 4 | 5.83 | | | |
| 5700 | | 13:00:00 | 33 | 10.2 | 7.35 | 15 | 8 | 5.18 | | | |
| 5977 | 4 Jun. 2012 | 17:00:00 | 35 | 10.4 | 7.39 | 8 | 2 | 3.21 | 11.7 | 25 | 37 | 8.33 |
| AVERAGE AT LOW FLOW | | | | | | 8.24 | 3.90 | 3.41 | | | |
| | | 19:30:00 | 35 | 10.4 | 8.24 | 38 | 30 | 19.3 | 11.4 | | | 8.33 |
| | | 20:21:00 | 35 | 10.4 | 8.24 | 29 | 19 | 10.9 | | | |
| 5977.0 | 5 Jun. 2012 | 21:35:00 | 35 | 10.4 | 8.24 | 35 | 24 | 15.1 | | | |
| | | 22:00:00 | 35 | 10.4 | 8.24 | 37 | 12 | 9.02 | | | |
| 5977.0 | 6 Jun. 2012 | 17:30:00 | 35 | 10.4 | 7.51 | 49 | 40 | 16.5 | 11.2 | | | 8.33 |
| | | 18:00:00 | 35 | 10.4 | 7.51 | 66 | 43 | 16.2 | | | |
| AVERAGE AT HIGH FLOW | | | | | | 42.33 | 28.00 | 11.75 | | | |

*polymer and water solution

TABLE 4

RESULTS OF DRILL MUD PROCESSING OF FIRST SECTION

| Perforated Feet Depth (ft) | Date Day/Mo Year | Time Hour/Min/ Sec | Properties of Mud | | | Suspended Solids (TTS) And Turbidity | | Mud flows, polymer and water Solids or Cuts P (ppg) | Densities and Humidity of The discharge Water P(ppg) |
|---|---|---|---|---|---|---|---|---|---|
| | | | μ cps | P (ppg) | Intermediate mgl | Final mgl | NTU | | |
| 10530 | | 14:40:00 | 20 | 10.40 | 8.5 | 98 | 54.5 | | |
| 10530 | | 15:00:00 | 20 | 10.40 | 8.5 | 92 | 51.5 | | |
| 10530 | | 15:20:00 | 20 | 10.40 | 8.5 | 88 | 42.9 | | |
| 10530 | 17 Jun. 2012 | 15:40:00 | 20 | 10.40 | 8.5 | 195 | 91.4 | | |
| 10530 | | 16:00:00 | 20 | 10.40 | 8.5 | 240 | 143.2 | | |
| 10530 | | 17:00:00 | 20 | 10.40 | 8.5 | 57 | 31.8 | | |
| 10530 | | 17:20:00 | 20 | 10.40 | 8.5 | 69 | 26.3 | | |
| 10530 | | 17:40:00 | 20 | 10.40 | 8.5 | 86 | 38.6 | | |
| AVERAGES | | | | | 115.63 | 87.75 | 60.03 | 12.5 | 8.33 |
| 11160 | | 13:00:00 | 12 | 9.2 | 9.0 | 574 | 458 | | |
| 11160 | | 13:30:00 | 12 | 9.2 | 9.0 | 524 | 446 | | |
| 11160 | 20 Jun. 2012 | 14:00:00 | 12 | 9.2 | 9.0 | 463 | 414 | | |
| 11160 | | 14:30:00 | 12 | 9.2 | 9.0 | 392 | 300 | | |
| 11160 | | 15:00:00 | 12 | 9.2 | 9.0 | 378 | 294 | | |
| 11160 | | 15:30:00 | 12 | 9.2 | 9.0 | 435 | 305 | | |
| AVERAGES | | | | | | 461 | 369.5 | | 8.33 |

TABLE 5

RESULTS OF DRILL MUD PROCESSING OF SECOND AND THIRD SECTION

| | CONVENTIONAL EQUIPMENT FOR SOLID CONTROL | INVENTION IN THE AREA OF SOLID CONTROL |
|---|---|---|
| ENERGY CONSUMPTION | | 30% LESS THAN CONVENTIONAL EQUIPMENT |
| SOLID TRANSPORT | USE OF TRUCK EQUIPMENT | ELIMINATION OF TRUCK EQUIPMENT |
| DIESEL CONSUMPTION | | 27% LESS THAN CONVENTIONAL EQUIPMENT |
| SUSPENDED SOLIDS FIRST SECTION | 240 UP TO 400 MG/L | LESS THAN 20 MG/L |
| SUSPENDED SOLIDS SECOND AND THIRD SECTION | 2500 TO 8000 MG/L | LESS THAN 390 MG/L |
| FLOWS | VARIABLE | CONSTANT |
| SUCTION CAPACITY | CLEAN FLUID | FLUIDS WITH CONTENT OF SOLIDS, SANDS, CLAY |
| OIL ELIMINATION | DOES NOT ELIMINATE | ELIMINATES 98% |
| PROCESSING FLOW | LESS THAN 450 GPM | 1200 GPM |
| MAINTENANCE | HIGH COST | LOW COST |
| CAPACITY FOR PROCESSING | LIMITED | CONTINUOUS |
| CONTAMINATION DUE TO NOISE | 89 DB | 0 DB |

I claim:

1. A dehydrator system comprising a mixing unit, a core dehydrator and a solids removal system, wherein the mixing unit comprises a rapid mixing manifold positioned and a plurality of flocculator chambers;

the core dehydrator comprises a clarifying sediment chamber having a plurality of small deflector plaques and a plurality of large deflector plaques and a drag solid transition zone, each of the plurality of small deflector plaques being positioned at different heights, wherein the rapid mixing manifold is positioned in the mixing unit and is in fluidic communication with the plurality of flocculator chambers, the clarifying sediment chamber is in fluidic communication with the drag solid transition zone, the drag solid transition zone is in fluidic communication with the plurality of flocculator chambers; and the solids removal system is fluidic communication with the drag solid transition zone of the core dehydrator, the solids removal system comprises a large rotating paddle, a small rotating paddle, and a drive shaft, the drive shaft is configured to rotate the large rotating paddle and the small rotating paddle, and the large rotating paddle and the small rotating paddle are configured to move solids out of the core dehydrator.

2. The dehydrator system of claim 1, wherein the mixing unit further comprises a plurality of stir tanks.

3. The dehydrator system of claim 1, wherein the mixing unit further comprises a mud conditioning tank.

4. The dehydrator system of claim 1, wherein the core dehydrator further comprises a large cylindrical section and a small cylindrical section in fluidic communication with the large cylindrical section.

5. The dehydrator system of claim 4, wherein the large rotating paddles are positioned with the large cylindrical section.

6. The dehydrator system of claim 4, wherein the small rotating paddle is positioned within the small cylindrical section.

7. The dehydrator system of claim 1, further comprising a solids pump in fluidic communication with the core dehydrator.

8. A method of removing solids from drilling fluids comprising the steps of:

providing drilling fluids to a dehydrator system comprising a solids removal system in fluidic communication with a core dehydrator, wherein the core dehydrator comprises a clarifying sediment chamber comprising a plurality of small deflector plaques and a plurality of large deflector plaques, each of the plurality of small deflector plaques being positioned at different heights, the solids removal system comprises a large cylindrical section, a large rotating paddle, a small cylindrical section, a small rotating paddle and a drive shaft, the drive shaft is connected to the large rotating paddle and the small rotating paddle, and the large cylindrical section and the small cylindrical section are in fluidic communication with the plurality of small deflector plaques and the plurality of large deflector plaques;

mixing drilling fluids with polymer solution in a mixing unit to produce flocculated drilling fluids comprising micro-floccules;

collecting micro-floccules with the small deflector plaques and the large deflector plaques wherein micro-floccules agglutinate and enlarge producing solids;

separating the solids from the flocculated drilling fluids; and removing solids from the dehydrator system, wherein the large rotating paddle and the small rotating paddle are configured to move solids from the large cylindrical section to the small cylindrical section and out of the dehydrator system.

9. The method of claim 8, wherein the drilling fluids are rapidly mixed creating a turbulent fluid flow.

10. The method of claim 8, wherein drilling fluids and polymer solution are mixed under turbulent fluid flow.

11. The method of claim 8, wherein the turbulent fluid flow transitions to a laminar flow.

12. A solids removal system for a dehydrator system, the dehydrator system having a core dehydrator and a mixing unit, the core dehydrator comprising a clarifying sediment chamber comprising a plurality of small deflector plaques in fluidic communication with a plurality of large deflector plaques, each of the plurality of small deflector plaques being positioned at different heights, and the mixing unit comprising a rapid mixing manifold in fluidic communication with a plurality of vertical flocculators, the solids removal system comprising:
- a large rotating paddle;
- a small rotating paddle; and
- a drive shaft, wherein the large rotating paddle and the small rotating paddle are connected to the drive shaft and in fluid communication with core dehydrator to dispose solids from the dehydrator system.

13. The solids removal system of claim 12, wherein the large rotating paddle is positioned within a large cylindrical section of the core dehydrator.

14. The solids removal system of claim 11, wherein the small rotating paddle is position with a small cylindrical section of the core dehydrator.

15. The solids removal system of claim 11, further comprising a solids pump connected to the core dehydrator.

* * * * *